(12) United States Patent
Yano et al.

(10) Patent No.: US 6,720,743 B2
(45) Date of Patent: Apr. 13, 2004

(54) LIGHTING SYSTEM

(75) Inventors: Tadashi Yano, Kyoto (JP); Katsushige Amano, Kyoto (JP); Yoshinori Tanabe, Hirakata (JP); Hiroki Noguchi, Burlington, MA (US); Manabu Inoue, Misato (JP); Wataru Iwai, Nagareyama (JP)

(73) Assignees: Matsushita Electric Industrial Co., Ltd., Kadoma (JP); Matsushita Electric Works, Ltd., Kadoma (JP)

( * ) Notice: Subject to any disclaimer, the term of this patent is extended or adjusted under 35 U.S.C. 154(b) by 0 days.

(21) Appl. No.: 10/254,871

(22) Filed: Sep. 26, 2002

(65) Prior Publication Data

US 2003/0062856 A1 Apr. 3, 2003

(30) Foreign Application Priority Data

Sep. 28, 2001 (JP) .......................... 2001-301702
Dec. 10, 2001 (JP) .......................... 2001-375554
Dec. 17, 2001 (JP) .......................... 2001-383825

(51) Int. Cl.$^7$ .................. A61G 10/100; A61G 10/02
(52) U.S. Cl. ............................ 315/291; 600/21; 11/27
(58) Field of Search .................. 315/291, 219, 315/209; 600/27, 21; 607/90, 89, 88, 93

(56) References Cited

U.S. PATENT DOCUMENTS

| | | | | |
|---|---|---|---|---|
| 5,047,006 A | * | 9/1991 | Brandston et al. | 600/21 |
| 5,301,090 A | * | 4/1994 | Hed | 362/558 |
| 5,518,497 A | * | 5/1996 | Widjaja et al. | 600/27 |
| 5,562,719 A | * | 10/1996 | Lopez-Claros | 607/88 |
| 5,645,578 A | * | 7/1997 | Daffer et al. | 607/91 |
| 5,824,024 A | * | 10/1998 | Dial | 607/88 |

FOREIGN PATENT DOCUMENTS

| | | |
|---|---|---|
| JP | 9-251893 | 9/1997 |
| JP | 10-3991 | 1/1998 |
| JP | 10-27691 | 1/1998 |
| JP | 11-96809 | 4/1999 |
| JP | 2000-357591 | 12/2000 |

* cited by examiner

*Primary Examiner*—James Clinger
*Assistant Examiner*—Chuc Tran
(74) *Attorney, Agent, or Firm*—Oblon, Spivak, McClelland, Maier & Neustadt, P.C.

(57) ABSTRACT

In a lighting system capable of varying luminance of the light emitting surface periodically used for adjusting rhythm of breathing of an observer when he wishes to fall asleep, a light source is controlled in a manner so that variation of the luminance "L" per a unit time in the vicinity at a time $t_{MAX}$ when the luminance "L" takes the largest value in one period becomes larger than the variation of the luminance "L" per the unit time in the vicinity at a time $t_{MIN}$ when the luminance "L" takes the smallest value.

29 Claims, 34 Drawing Sheets

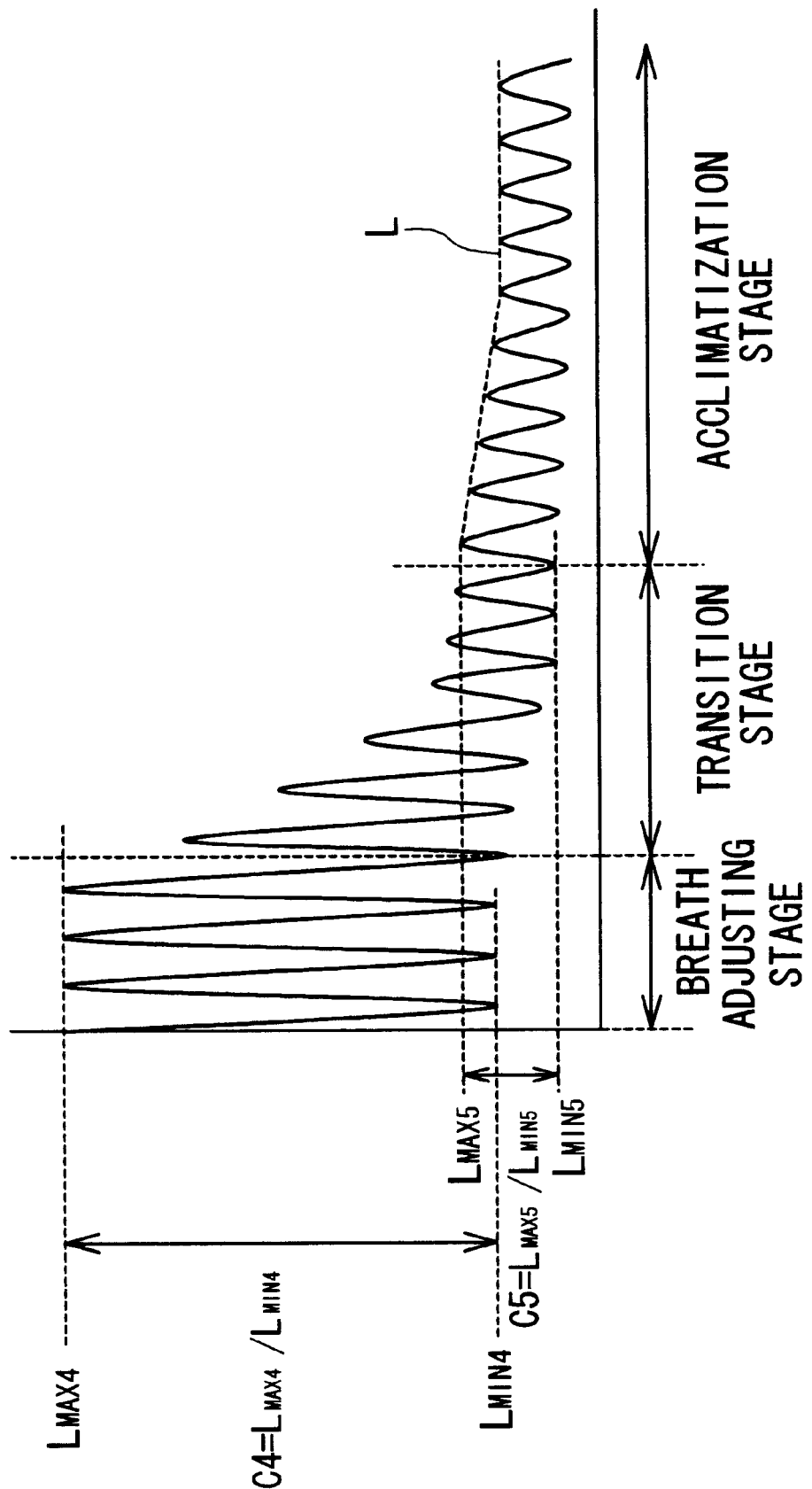

LIGHTING SYSTEM

BACKGROUND OF THE INVENTION

1. Field of the Invention

This invention relates to a lighting system, a lighting controller and a lighting control method, by which illumination is periodically varied for realizing a lighting environment comfortable in human terms.

2. Description of the Related Art

A lighting system varying illumination corresponding to aperiodic flicker (for example, having a flickering characteristic of 1/f) or periodic rhythm is conventionally known for realizing a comfortable lighting environment.

Periodic rhythms of human body such as rhythms of breathing, heartbeat, pulsation, brain waves such as α wave, β wave, and so on, and the circadian rhythm with respect to the sleep are important factors for maintaining normal condition of human body. Thus, it is considered that the amenity has a strong tie for the rhythms of human body.

Especially, the rhythm of breathing can consciously be controlled on some level. Furthermore, the rhythm of breathing responds to mental situation. When a person feels stress, his breath becomes shallow and the rhythm of breathing becomes faster. Alternatively, when the person feels relaxed with contented mind, his breath becomes deep and the rhythm of breathing becomes slower.

When the breath is shallower, not only the effect of breathing becomes lower, but also the fresh air reaches only to a part of the lungs. As a result, the blood carbon dioxide level becomes higher, and the quantity of oxygen carried to the brain becomes insufficient, so that the person is in a state of tension.

When the breath is deeper, a hormone called Endorphins having sedative action is secreted in human body, so that the person is in a state of relaxation.

Accordingly, it is considered effective to control the rhythm of breathing for making the person be in the state of relaxation.

The inventors have researched the lighting system and the lighting control method for varying the illumination corresponding to a frequency near to the rhythm of breathing so as to realize a comfortable lighting environment (see Publication Gazettes of Japanese Patent Applications H11-96809 and 2000-357591). In our research, the lighting system had been controlled for varying the luminance of the light emitting surface corresponding to a sinusoidal curve. When the research has advanced, it is found that the variation of the luminance of the light emitting surface corresponding to the sinusoidal curve is not the best mode.

Accordingly, it becomes a new problem how the illumination light be varied so as to make the person (the user of the lighting system) fit his breathing rhythm to the variation of the illumination light, and be in the state of relaxation.

Furthermore, the inventors has found that an impression which the person receives from the illumination light becomes different corresponding to the difference of the variation of the illumination light in one period when the person observes the variation of the illumination light, directly. The variation of the luminance of the light emitting surface in one period is defined as a ratio of the highest luminance with respect to the lowest luminance in one period.

The conventional lighting system is designed so that the person observes the variation of the illumination light under opening his eyes. However, the person wishes to feel the relaxation under closing his eyes. When the person closes his eyes, the quantity of the light reaching his pupil is reduced by the eyelids. Since the transmittance of the eyelid is several %, the quantity of the light reaching to the pupil under closing his eyes becomes smaller about several % than the quantity of the light reaching the pupil under opening his eyes.

If the person observes the variation of the illumination light under closing his eyes, the quantity of the light reaching his pupil becomes too small to aware the variation of the illumination light, when the variation of the illumination light by the conventional lighting system is smaller than a predetermined level. Thus, the person cannot adjust the rhythm of breathing, so that he cannot be in the state of relaxation.

Furthermore, it is necessary to be in the state of relaxation while the person sleeps. If the person is not in the state of relaxation in sleeping, he cannot take adequate sleep, and he suffers from insomnia depending on the circumstances. The lighting system varying the illumination light can be used for adjusting the rhythm of breathing of the person so as to sleep easily.

It is natural that the person closes his eyes in sleeping. Furthermore, it is preferable to avoid the dazzling illumination in sleeping, so that necessary to make the illumination light dark as possible.

When the lighting system varying the illumination light is used for adjusting the rhythm of breathing so as to fall asleep, it is required that not only the illumination light can be observed through the eyelids, but also the illumination light be maintained sufficiently dark. It is further necessary to take into consideration of adaptation of darkness of human visual perception. The adaptability of darkness is defined that the sensitivity of human eyes becomes higher so as to aware an object at a dark position where the intensity of the illumination light is smaller. When the person falls asleep, his eyes are generally closed under a very dark circumstance, so that the adaptability of darkness of his eyes fairly advances as time go on. As a result, an intensity of an illumination light which was proper at a certain point becomes dazzling by increasing the sensitivity of visual perception as time go on, so that it becomes a bafflement of falling asleep.

The conventional lighting system used for adjusting the rhythm of breathing for falling asleep has not be considered the above-mentioned adaptation of darkness of human visual perception.

SUMMARY OF THE INVENTION

The present invention solves the above-mentioned problems by basing on the results of analysis of the visual characteristics and the breathing exercise of a human body.

A purpose of the present invention is to provide a lighting system, a lighting controller and a lighting control method by which a person can easily adjust the rhythm of breathing corresponding to the variation of the luminance of the light emitting surface so as to be in the state of relaxation.

A lighting system in accordance with an aspect of the present invention comprises a light source and a lighting controller for controlling the light source periodically for varying luminance "L" on a light emitting surface of the light source. The lighting controller controls the light source in a manner so that variation of the luminance "L" per a unit time in the vicinity at a time $t_{MAX}$ when the luminance "L" takes the largest value in one period of the variation of the luminance becomes larger than that in the vicinity at a time $t_{MIN}$ when the luminance "L" takes the smallest value.

By such a configuration, it is possible to lead the observer to the state of relaxation without making the observer uncomfortable. Thus, the lighting control system is effective even when the observer does not adjust the rhythm of breathing to the variation of the illumination, purposefully.

BRIEF DESCRIPTION OF THE DRAWINGS

FIG. 37 is a graph showing an example of a lighting control method in the fourth embodiment;

DETAILED DESCRIPTION OF THE EMBODIMENTS

First Embodiment

A first embodiment of a lighting system, a lighting controller and a lighting control method in accordance with the present invention is described.

Figure 1:
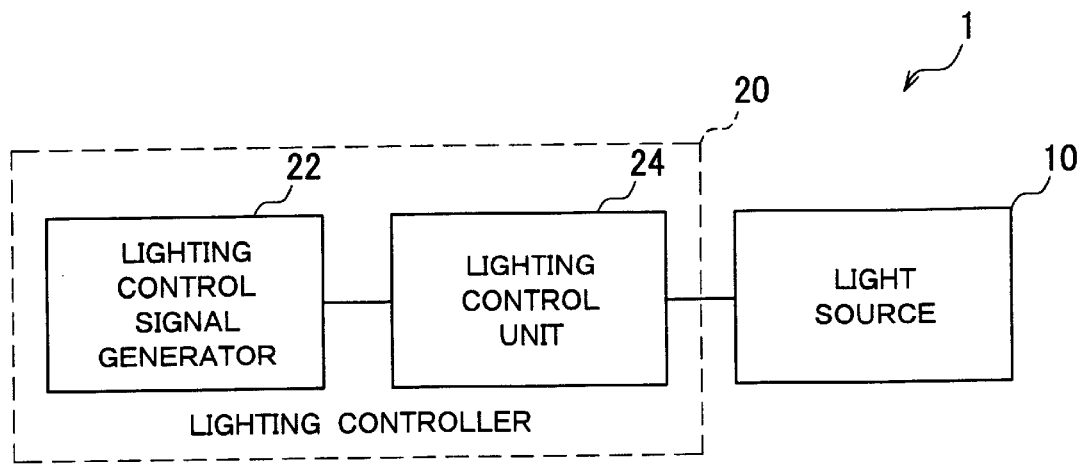
FIG. 1 is a block diagram showing a configuration of a lighting system in accordance with a first embodiment of the present invention.

FIG. 1 shows configuration of a lighting system 1. The lighting system 1 comprises a light source 10 and a lighting controller 20 for controlling light emission of the light source 10 in a manner so that luminance of a light emitting surface of the light source 10 periodically varies.

The lighting controller 20 comprises a lighting control signal generator 22 for generating a lighting control signal and a lighting control unit 24 for controlling the luminance on the light emitting surface of the light source 10 with using the lighting control signal. The function of the lighting control signal generator 22 can be realized, for example, by a computer system including a CPU (central processing unit).

The voltage of the lighting control signal outputted from the lighting control signal generator 22 is varied, for example, between 0V to 5V as time passes. The lighting control unit 24 converts the variation of the voltage of the lighting control signal to a variation of a value of current which is supplied to the light source 10 for lighting the light source 10. The luminance on the light emitting surface of the light source 10 is varied corresponding to the variation of the value of the current supplied from the lighting control unit 24. In other words, the variation of the luminance on the light emitting surface of the light source 10 corresponds to the variation of the voltage of the lighting control signal generated by the lighting control signal generator 22.

The light source 10 is, for example, a incandescent lamp. Since the kind of the light source 10 is not restricted by the incandescent lamp, another light source such as an LED (light emitting diode), an EL (electro-luminescence), an HID (high-intensity discharge lamp), a fluorescent lamp, a compact self-ballasted fluorescent lamp, or the like can be used.

Figure 2:
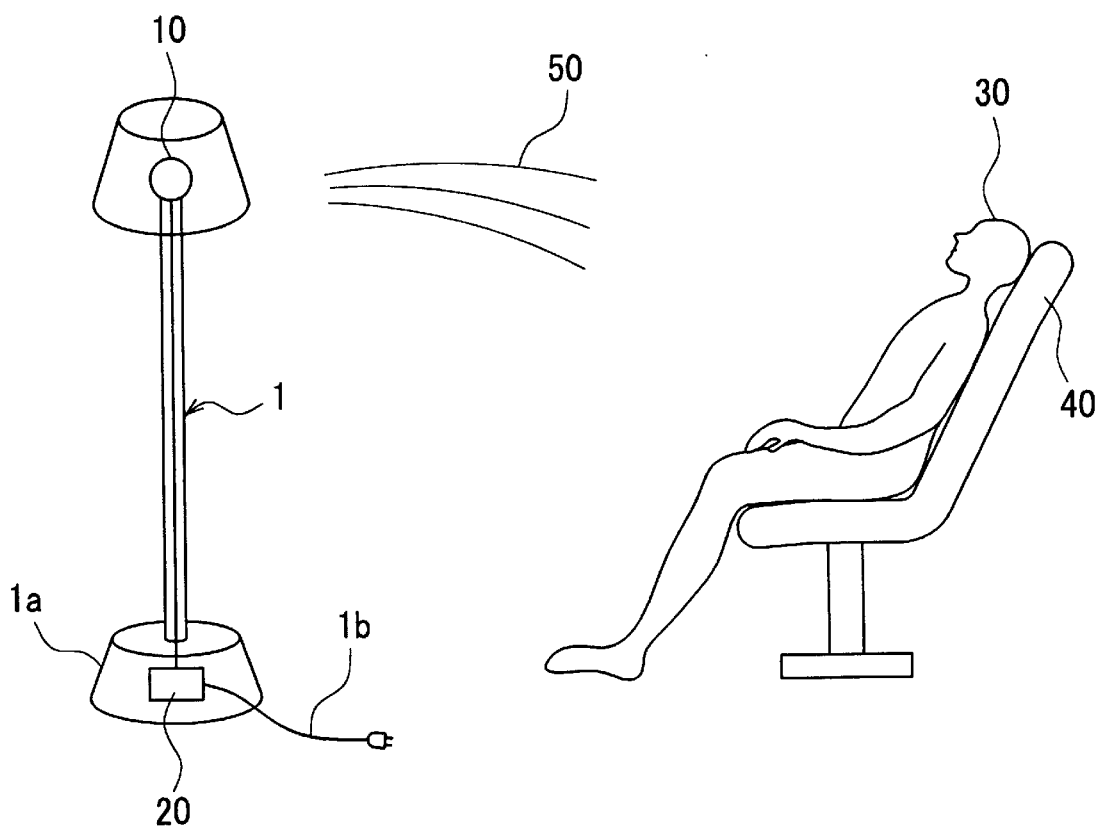
FIG. 2 is a perspective figure showing an appearance that a user of the lighting system observes illumination light emitted from the lighting system in accordance with the present invention.

FIG. 2 shows an appearance that a user 30 of the lighting system 1 (hereinafter, the user 30 is called "observer") sitting on a chair 40 observes illumination light 50 emitted from the lighting system 1. The illumination light 50 varies periodically corresponding to the periodic variation of the luminance on the light emitting surface of the light source 10.

Hereupon, it is assumed that the observer 30 breathes corresponding to the variation of the illumination light 50. For example, the observer 30 draws the breath in a term from a time when the illumination light 50 is the darkest to a time when the illumination light 50 is the brightest, and the observer 30 exhales the breath in another term from the time when the illumination light 50 is the brightest to the time when the illumination light 50 is the darkest.

By drawing and exhaling the breath corresponding to the variation of the illumination light 50, the observer 30 can adjust the rhythm of breathing. When the breath becomes deep and the rhythm of breathing becomes slower, the sate of relaxation of the observer 30 increases. In this description, the terms "relax" and "relaxation" includes not only the meaning of stress-relieving but also the meaning of comfortable sleeping. The lighting system 1 can be used when the observer 30 falls asleep easily.

In the example shown in FIG. 2, the lighting controller 20 is provided in a pedestal 1a of the lighting system 1. It is possible that the lighting controller 20 is contained in a housing (not shown in the figure) provided in mid flow of a power cable 1b of the lighting system 1. Furthermore, it is possible to form the light source 10 and the lighting controller 20 integrally like a compact self-ballasted fluorescent lamp. Alternatively, it is possible to form the light source 10 and the lighting controller 20 independently. In such the case, the lighting controller 20 can be used for controlling the luminance of an optional light source selected by the user.

Furthermore, the lighting system 1 is a floor lamp illustrated in the example shown in FIG. 2. The type of the lighting system 1 is not restricted by the example. It is possible to form the lighting system 1 as a standing type one such as a desk lamp having a short footstalk, a wide-ranging lighting type one such as a ceiling area lighting installation or a pendant lamp which is fixed on a ceiling, or a localized lighting type one such as a down light. Furthermore, it is possible to form the lighting system 1 as a personal ornament type one such as a head-mounted display or a goggle which directly illuminates the eyes of the observer.

A principle of a lighting control in the first embodiment is described. The lighting control method-in accordance with the present invention controls the luminance of a light emitting surface of a light source periodically varying in consideration of characteristics of visual perception and breathing exercise of a human body.

The illumination light is controlled in a manner so that the variation of the luminance of the light emitting surface per a unit time in the vicinity at a time when the luminance of the light emitting surface takes the largest value in one period of the periodical variation of the luminance of the light emitting surface becomes larger than that in the vicinity at a time when the luminance of the light emitting surface takes the smallest value by the lighting control method.

Since the intensity of the illumination light 50 corresponds to the luminance on the light emitting surface of the light source 10, and the variation of the luminance on the light emitting surface of the light source 10 corresponds to the variation of the voltage of the lighting control signal, it is possible to realize the above-mentioned lighting control of the illumination light by generating the lighting control signal having the variation of the voltage correspondingly that the variation of the luminance on the light emitting surface of the light source 10 per a unit time in the vicinity at a time when the luminance takes the largest value in one period of the periodic variation of the luminance becomes larger than that in the vicinity at a time when the luminance takes the smallest value.

The reason why the observer 30 can be adjusted the rhythm of breathing to the variation of the illumination light and the state of relaxation can be increased is described in detail.

Figure 3:
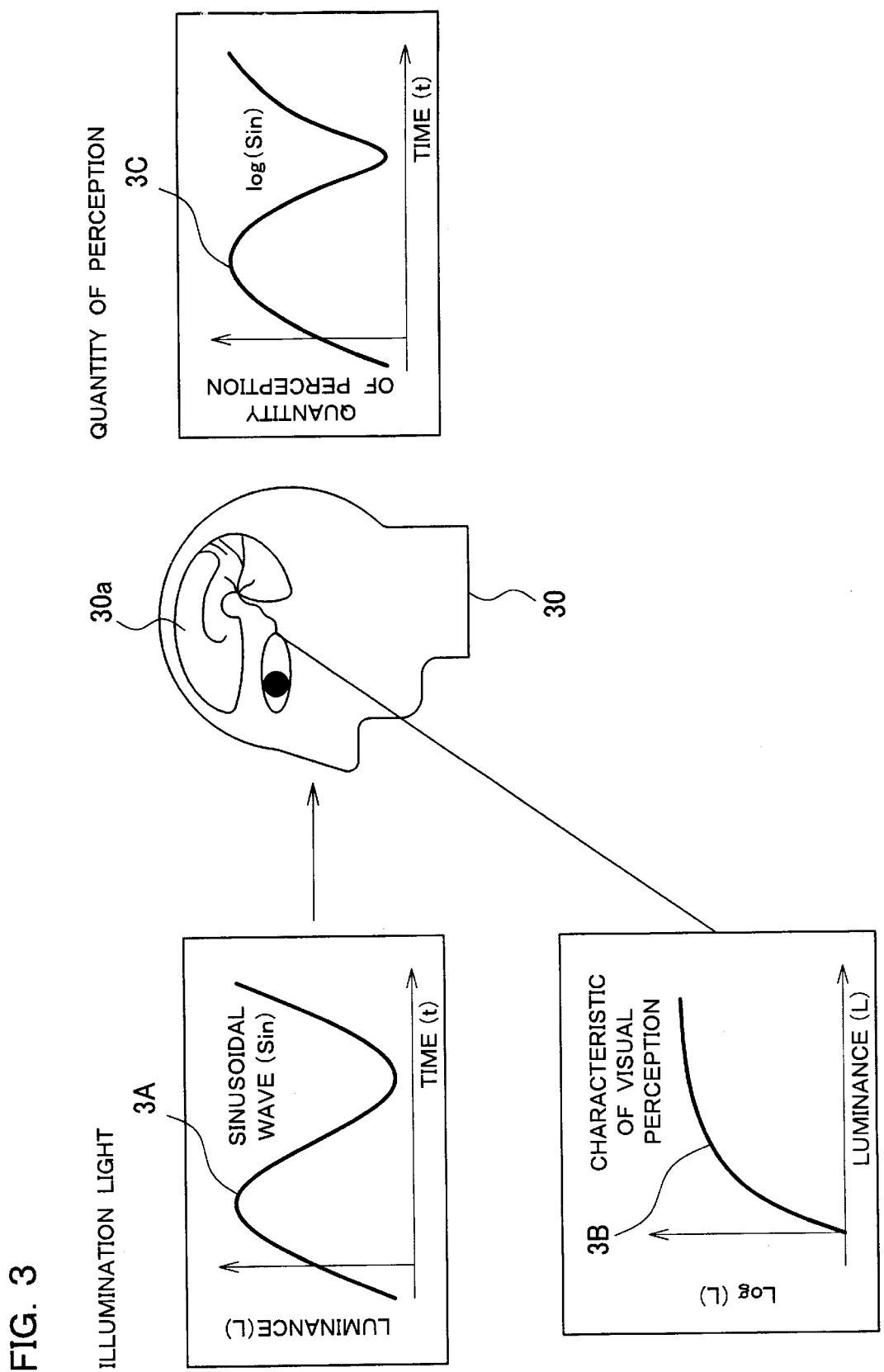
FIG. 3 is a schematic diagram showing characteristics of human visual perception.

FIG. 3 schematically shows the characteristics of the human visual perception. When the human visual perception is stimulated by the light, the stimulation will be transmitted to the brain through the nerve. The intensity of the stimulation transmitted to the brain is not in proportion to the intensity of the light (luminance) but in proportion to the value of the logarithm of the intensity of the light.

FIG. 3 shows the processes of the perception when the observer observes an illumination light having a variation of luminance corresponding to a sinusoidal curve 3A. The brain 30a of the observer 30 perceives the illumination light as if the luminance varies corresponding to a logarithm curve 3B of the sinusoidal curve 3A. Thus, the luminance of the light emitting surface perceived by the brain 30a varies corresponding to a curve 3C in which the variation of the luminance in the vicinity of a time when the luminance takes the largest value becomes gentle than the variation of the luminance in the vicinity of a time when the luminance takes the smallest value. Actually, when the magnitudes of the variations of the luminance are the same, the observer 30 feels the variation under a high luminance state gentler than that under a low luminance state.

When the observer 30 observes the illumination light in which the luminance is varied corresponding to the sinusoidal curve, the observer feels that the variation of the luminance in the vicinity of the time when the luminance becomes the largest is gentler than that in the vicinity of the time when the luminance becomes the smallest. As a result, it is difficult for the observer 30 to perceive the time when the luminance becomes the largest, so that the observer 30 cannot exactly take the timing for starting the drawing the breath. For adjusting the rhythm of breathing corresponding to the variation of the illumination light, it is necessary that the largest luminance time when the luminance becomes the largest in one period of the periodical variation of the luminance and the smallest luminance time when the luminance becomes the smallest are easily perceived. Especially, it is important that the largest luminance time is easily perceived than the smallest luminance time.

Thus, it is necessary to control the luminance "L" on the light emitting surface of the light source 10 in a manner so that the variation of the luminance in the vicinity of the largest luminance time becomes larger than that in the vicinity of the smallest luminance time.

Figure 4:
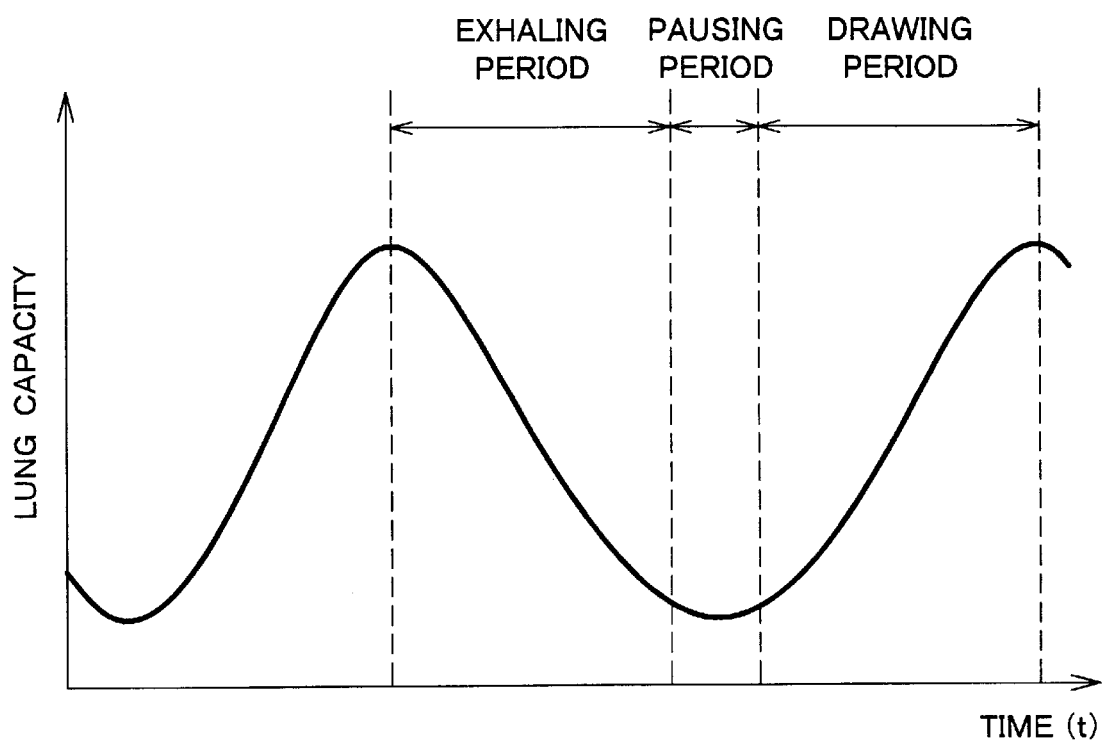
FIG. 4 is a graph showing a characteristic of human breathing exercise.

FIG. 4 shows a characteristic of human breathing exercise. In FIG. 4, the abscissa designates a time "t", and the ordinate designates a quantity of the breath in the lungs which is called "lung capacity". In FIG. 4, an exhaling period in which the lung capacity is reduced as time passes is called "exhaling period" while the observer has been exhaling the breath, and a time period in which the lung capacity is increased as time passes is called "drawing period" while the observer has been drawing the breath.

As can be seen from FIG. 4, a pausing period generally occurs between the end of the exhaling period and the start of the drawing period in the human breathing exercise. The pausing period becomes longer responding to the increase of the degree of relaxation of the observer 30. In some cases, the pausing period occupies about 20% to 25% in one period of the breathing cycle. Alternatively, when the observer 30 is out of the state of relaxation, the pausing period becomes shorter. In some cases, the pausing period will be disappeared practically. In this way, the length of the pausing period depends on the degree of relaxation of the observer 30. Thus, it is preferable to have a margin in a transition period between the exhaling period and the drawing period so as to make the observer 30 adjust his rhythm of breathing easily.

On the other hand, even when the degree of relaxation is increased, the pausing period rarely occurs between the end of the drawing period and the start of the exhaling period. Thus, it is preferable that the exhaling of breath starts just after the end of the drawing of breath so as to make the observer 30 adjust his rhythm of breathing easily with no relation to the degree of relaxation.

In consideration of the characteristics of human breathing exercise, it is necessary that the variation of the luminance on the light emitting surface of the light source 10 in the vicinity at a time when the luminance becomes the largest in one period of periodic variation of the luminance is equal to or larger than the variation of the luminance in the vicinity at a time when the luminance becomes the smallest, so as to make the observer 30 adjust his rhythm of breath to the variation of the illumination light without effort. Alternatively, it is preferable to take substantially no variation of the luminance in the vicinity at the time when the luminance becomes the smallest (that is, the luminance becomes constant) so as to take a margin in the transition period between the exhaling period and the drawing period. In the latter case, the time when the luminance becomes the smallest cannot be appointed at one pint. The variation of the luminance in the vicinity at the time when the luminance becomes the smallest will be regarded as "0" in the present invention. Accordingly, the variation of the luminance in the vicinity at the time when the luminance becomes the largest is always larger than the variation of the luminance in the vicinity at the time when the luminance becomes the smallest.

According to the results of analysis of the characteristics of human visual perception and breathing exercise, it is preferable to control the luminance on the light emitting surface of the light source 10 in a manner so that the variation of the luminance in the vicinity at the time when the luminance takes the largest value becomes larger than the variation of the luminance in the vicinity at the time when the luminance takes the smallest value.

In the above-mentioned description, the observer 30 observes the illumination light 50 while he opens the eyes. The observer 30, however, does not necessarily open the eyes. When the luminance of the light emitting surface of the light source 10 is sufficiently large, it is obvious that the observer 30 can observe the illumination light 50 through the eyelids while he closes the eyes experientially. The eyelids serve as filters for reducing the quantity of the light passing through the eyelids. The waveform of the variation of the quantity of the light passing through the eyelids, however, is relatively the same as that of the light observed without closing the eyelids. As mentioned above, the essential feature of the present invention is the relative waveform of the variation of the illumination light, and the observer 30 can be fallen in the state of relaxation by adjusting the rhythm of breathing corresponding to the variation of the luminance. Thus, it is possible to obtain the same effect of the present invention when the observer 30 observes the illumination light while he closes his eyelids. The same goes for the following description.

Figure 5A:
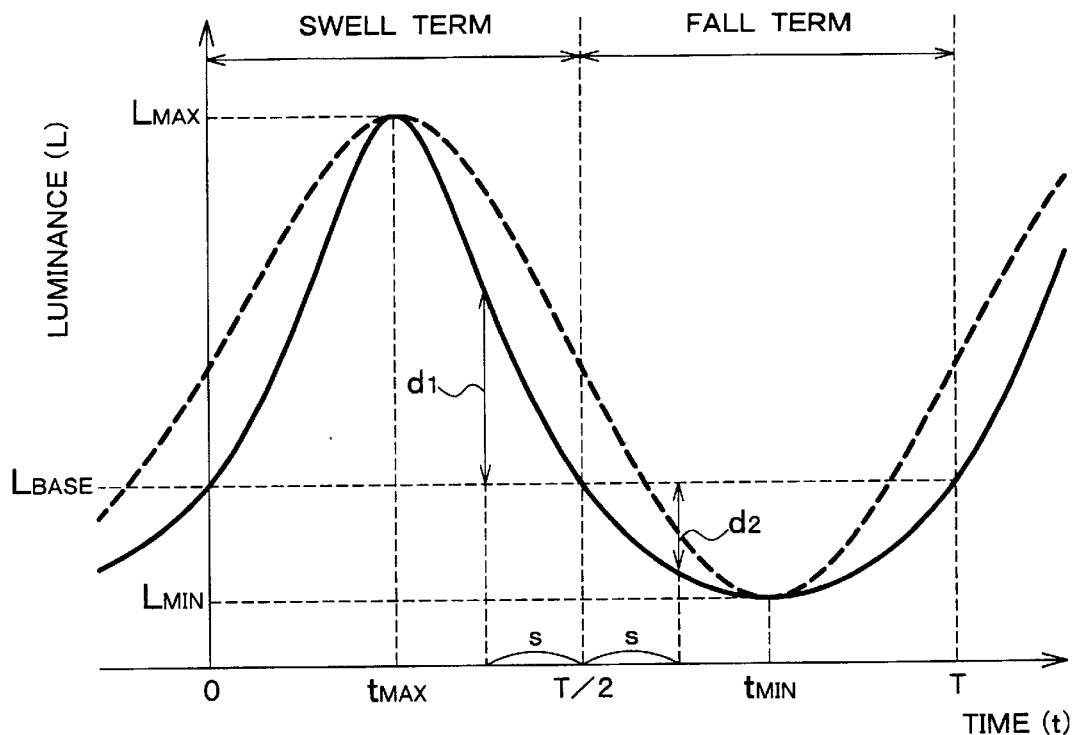
FIG. 5A is a graph showing an example of variation of luminance on a light emitting surface of a light source controlled by the lighting control system in the first embodiment.

A preferred example of the lighting control of the luminance "L" on the light emitting surface of the light source 10 is described with reference to FIG. 5A. In FIG. 5A, the abscissa designates a time "t" and the ordinate designates the value of the luminance "L" on the light emitting surface of the light source 10.

The lighting controller 20 controls the light source 10, or varies the value of electric current supplied to the light source 10 in a manner so that the luminance "L" on the light emitting surface of the light source 10 varies corresponding to the solid line illustrated in FIG. 5A. Since the breathing exercise is repeating as time passes, it is necessary the value of the luminance is controlled periodically to vary as time passes, so as to synchronize the variation of the luminance "L" with the rhythm of exhaling and drawing of breath.

Since the frequency of the breathing exercise is about 0.1 Hz to 0.4 Hz, the luminance "L" on the light emitting surface of the light source 10 is periodically varied in a range from a lower end equal to or larger than 0.1 Hz to an upper end equal to or smaller than 0.4 Hz.

One breath consists of one exhale and one draw. When the luminance "L" varies from the maximum luminance value $L_{MAX}$ to the minimum luminance value $L_{MIN}$, the luminance "L" is monotonously decreased. When the luminance "L" varies from the minimum luminance value $L_{MIN}$ to the maximum luminance value $L_{MAX}$, the luminance "L" is monotonously increased. The maximum luminance value $L_{MAX}$ is the largest value of the luminance "L" and the minimum luminance value $L_{MIN}$ is the smallest value of the luminance "L" in one period of the variation of the luminance "L".

The period of the periodic variation of the luminance "L" is defined as "T". When the starting time of the period is defined t=0, the value of the luminance "L" coincides with a predetermined constant value $L_{BASE}$ at the times t=0, t=T/2 and t=T. In the term 0<t<T/2, the value of the luminance "L" is larger than the constant value $L_{BASE}$. In the term T/2<t<T, the value of the luminance "L" is smaller than the constant value $L_{BASE}$. The luminance "L" on the light emitting surface of the light source 10 is controlled in a manner so that the value of the luminance "L" is larger than the constant value $L_{BASE}$ in the first half of the period "T", and the value of the luminance "L" is smaller than the constant value $L_{BASE}$ in the last half of the period "T".

Hereupon, the first half of the period "T" in which the luminance "L" is larger than the constant value $L_{BASE}$ (L>$L_{BASE}$) is called "swell term", and the last half of the period "T" in which the luminance "L" is smaller than the constant value $L_{BASE}$ (L<$L_{BASE}$) is called "fall term".

In the swell term, the value of the luminance "L" is controlled to be smaller than the value on an assumed sinusoidal curve illustrated by dotted line in FIG. 5A, except the crest of the waves at the maximum luminance time $t_{MAX}$. The maximum luminance time $t_{MAX}$ is the time when the luminance "L" takes the largest value (L=$L_{MAX}$).

In FIG. 5A, the sinusoidal curve illustrated by the dotted line is called "standard sinusoidal curve", which is defined as follows. The standard sinusoidal curve has the same period as the period "T" of the periodical variation of the luminance "L", the same value as the maximum luminance value $L_{MAX}$ of the luminance "L" at the maximum luminance time $t_{MAX}$, and the same value as the minimum luminance value $L_{MIN}$ of the luminance "L" at the minimum luminance time $t_{MIN}$. As mentioned above, there are some cases that the luminance "L" takes the smallest value $L_{MIN}$ not only at the time $t_{MIN}$ but also in the vicinity at the time $t_{MIN}$. In such the case, the time when the luminance "L" takes the smallest value $L_{MIN}$ cannot be defined at one time, so that the center of the term in which the luminance "L" takes the smallest value $L_{MIN}$ is regarded as the minimum luminance time $t_{MIN}$. Furthermore, the variation of the luminance "L" in the vicinity at the center of the term in which the luminance "L" takes the smallest value $L_{MIN}$ is regarded as the variation of the luminance "L" in the vicinity at the minimum luminance time $t_{MIN}$, that is, the luminance "L" takes a constant value.

As just described, the value of the luminance "L" is controlled to be smaller than the value on the standard sinusoidal curve except the crest at the maximum luminance time $t_{MAX}$ in the swell term, so that the variation of the luminance "L" per a unit time in the vicinity at the maximum luminance time $t_{MAX}$ becomes larger than the variation of the value on the standard sinusoidal curve in the vicinity at the maximum luminance time $t_{MAX}$. By such the lighting control, the observer 30 can easily perceive the maximum luminance time $t_{MAX}$ than the case that the luminance is varied corresponding to the standard sinusoidal curve.

In the fall term, the value of the luminance "L" is controlled in a manner so that an absolute value "d1" of a difference between the value of the luminance "L" and the constant value $L_{BASE}$ at a time t=T/2−s is larger than an absolute value "d2" of a difference between the value of the luminance "L" and the constant value $L_{BASE}$ at a time t=T/2+s. Hereupon, "s" is an optional number satisfying a condition 0<s<T/2. As a result, the value of the luminance "L" is controlled to be smaller than the value on the standard sinusoidal curve except the bottom at the minimum luminance time $t_{MIN}$ in the fall term.

As just described, the luminance "L" is controlled to satisfy the condition d1>d2 in the fall term, so that the variation of the luminance "L" per a unit time in the vicinity at the maximum luminance time $t_{MAX}$ becomes larger than the variation of the luminance "L" per the unit time in the vicinity at the minimum luminance time $t_{MIN}$. By such the lighting control, the variation of the luminance "L" can be approximated to the rhythm of breathing exercise.

The curve illustrated by solid line in FIG. 5A can be shown, for example, by the following equation (1).

$$L = L_{BASE} \times r^{sin(t)} \quad (1)$$

Hereupon, the symbols $L_{BASE}$ and "r" respectively designate constant values.

As can be seen from FIG. 5A, the curve shown by the equation (1) always varies in one period. The luminance "L" on the light emitting surface of the light source 10, however, can be controlled in a manner so that the luminance "L" takes the minimum luminance value $L_{MIN}$ in a predetermined time period in the vicinity at the minimum luminance time $t_{MIN}$.

Figure 5B:
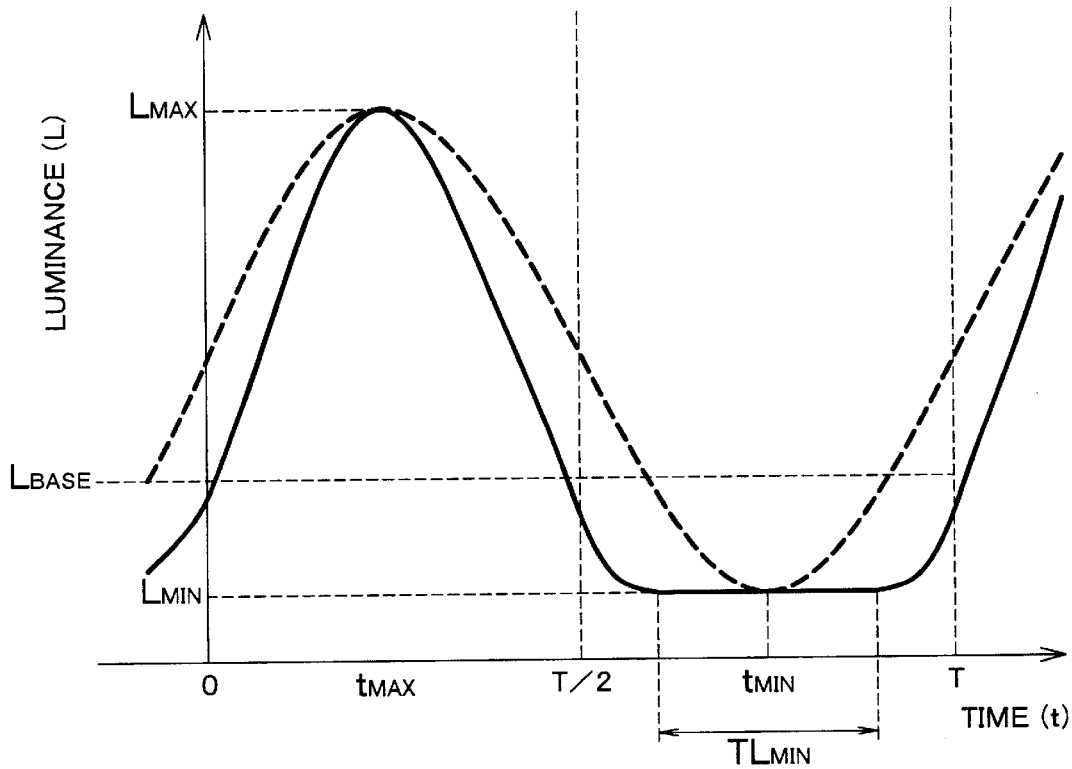
FIG. 5B is a graph showing another example of variation of luminance on a light emitting surface of a light source controlled by the lighting control system in the first embodiment.

FIG. 5B shows another preferred example of the lighting control of the luminance "L" on the light emitting surface of the light source 10, in which the luminance "L" takes the minimum luminance value $L_{MIN}$ in a predetermined time period $TL_{MIN}$ in the vicinity at the minimum luminance time $t_{MIN}$. As can be found from the above-mentioned description of the characteristics of human breathing exercise with reference to FIG. 4, it is preferable that the length of the time period $TL_{MIN}$ is made shorter than 25% of the period T, that is, $TL_{MIN} \leq T/4$ so that the variation of the luminance "L" is approximated to the rhythm of breathing exercise.

Figure 6:
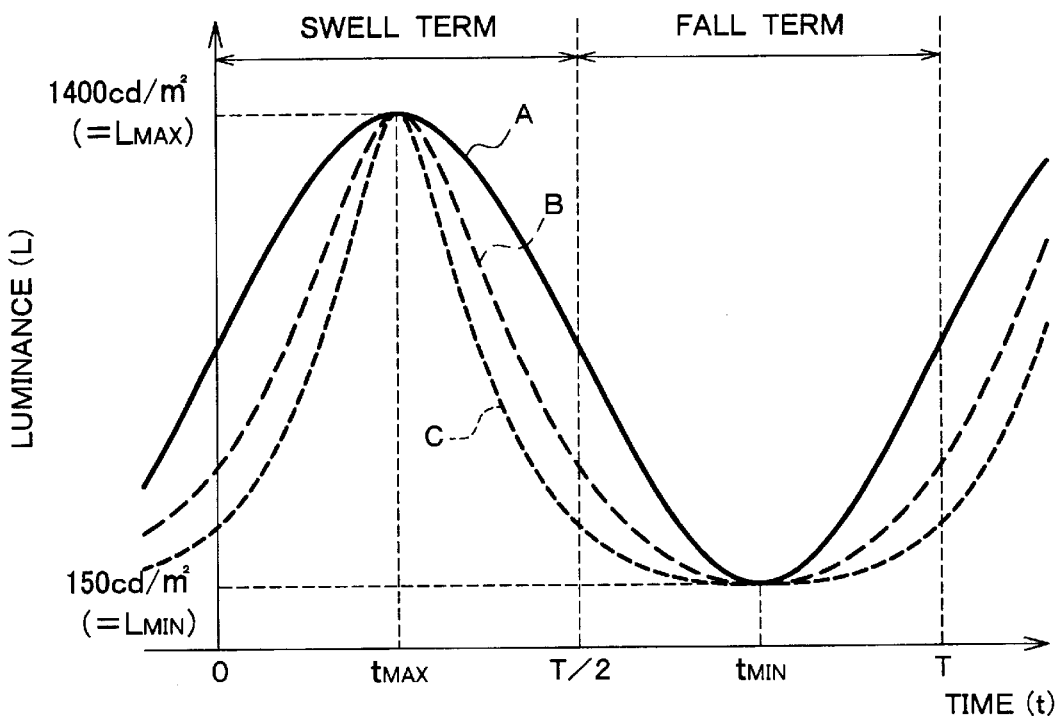
FIG. 6 is a graph showing waveforms of curves "A" to "C" corresponding to which the luminance of the light emitting surface was varied in experiments.
Figure 7:
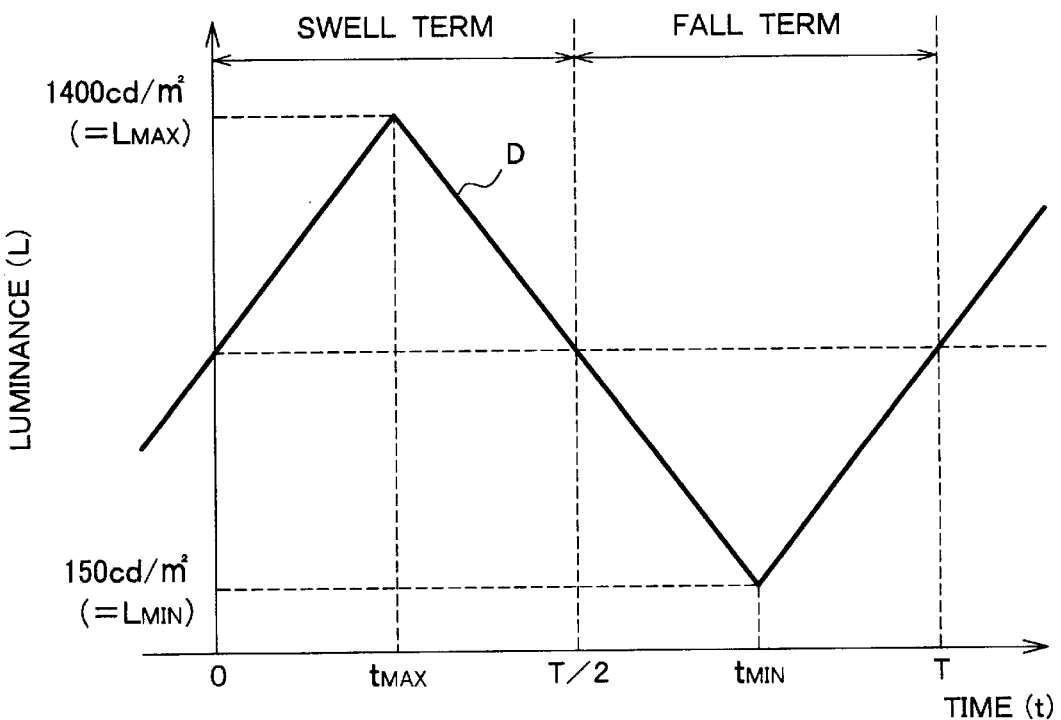
FIG. 7 is a graph showing a waveform of curve "D" corresponding to which the luminance of the light emitting surface was varied in an experiment.

The inventors have experimented for validating the effect by the above-mentioned lighting control. In the experiment, the following four curves "A" to "D" were used. FIG. 6 shows the waveforms of the curves "A" to "C", and FIG. 7 shows the waveform of the curve "D". In FIGS. 6 and 7, the abscissas designate the time "t", and the ordinates designate the values of the luminance "L" on the light emitting surface of the light source 10. The luminance "L" was controlled to vary corresponding to each curve "A" to "D".

In the experiments, the maximum luminance value $L_{MAX}$ was selected to be 1400 cd/m², and the minimum luminance value $L_{MIN}$ was selected to be 150 cd/m².

The curve "A" illustrated by solid line in FIG. 6 is the sinusoidal curve. The curve "A" is shown by the following equation (2).

$$L=L_A+r_A\times\sin(t) \qquad (2)$$

Hereupon, the symbols $L_A$ and $r_A$ respectively designate constant values.

The curve "B" illustrated by rough dotted line in FIG. 6 is shown by the following equation (3).

$$L=L_B\times r_B^{\sin(t)} \qquad (3)$$

Hereupon, $L_B=(L_{MAX}\times L_{MIN})^{1/2}$, and $r_B=(L_{MAX}/L_{MIN})^{1/2}$. The symbol $L_{MAX}$ designates the largest value of the luminance "L" in one period, and the symbol $L_{MIN}$ designates the smallest value of the luminance "L" in one period.

The curve "C" illustrated by fine dotted line in FIG. 6 is shown by the following equation (4).

$$L=L_C/(1-r_C\times\sin(t)) \qquad (4)$$

Hereupon, $L_C=2\times(L_{MAX}\times L_{MIN})/(L_{MAX}+L_{MIN})$, and $r_C=(L_{MAX}-L_{MIN})/(L_{MAX}+L_{MIN})$. The symbol $L_{MAX}$ designates the largest value of the luminance "L" in one period, and the symbol $L_{MIN}$ designates the smallest value of the luminance "L" in one period.

The curve "D" illustrated by solid line in FIG. 7 is the triangular wave binding the maximum luminance value $L_{MAX}$ at the maximum luminance time $t_{MAX}$ and the minimum luminance value $L_{MIN}$ at the minimum luminance time $t_{MIN}$ by straight lines.

As can be seen from FIG. 6, in the vicinity at the maximum luminance time $t_{MAX}$, the variation of the luminance "L" per a unit time which is varied corresponding to the curve "C" is larger than the variation of the luminance "L" corresponding to the curve "B". In the vicinity at the minimum luminance time $t_{MIN}$, the variation of the luminance "L" per a unit time which is varied corresponding to the curve "C" is smaller than the variation of the luminance "L" corresponding to the curve "B".

The curves "B" and "C" respectively satisfy the condition that the variation of the luminance "L" per the unit time in the vicinity at the maximum luminance time $t_{MAX}$ is larger than that in the vicinity at the minimum luminance time $t_{MIN}$.

Figure 8:
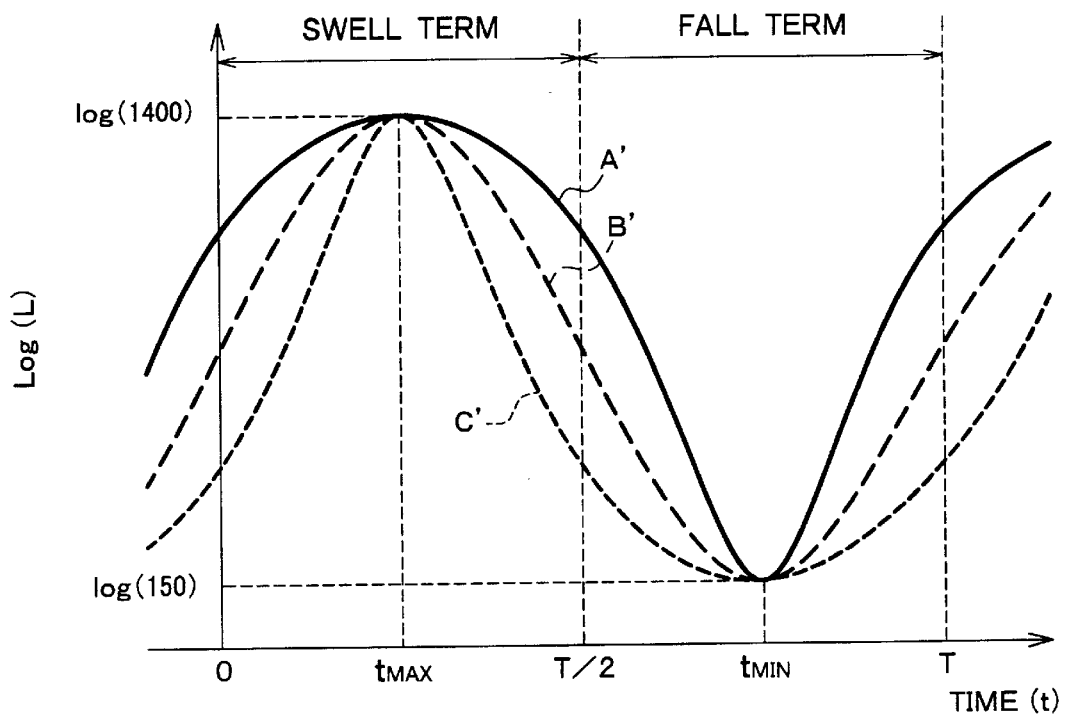
FIG. 8 is a graph showing waveforms of curves A' to C', which are respectively the logarithms of the curves "A" to "C" illustrated in FIG. 6.

FIG. 8 shows other waveforms of the curves A' to C', which are respectively the logarithms of the curves "A" to "C" illustrated in FIG. 6. The ordinate in FIG. 8 designates the logarithm (Log(L)) of the luminance "L", instead that the ordinate in FIG. 6 designates the value of the luminance.

Figure 9:
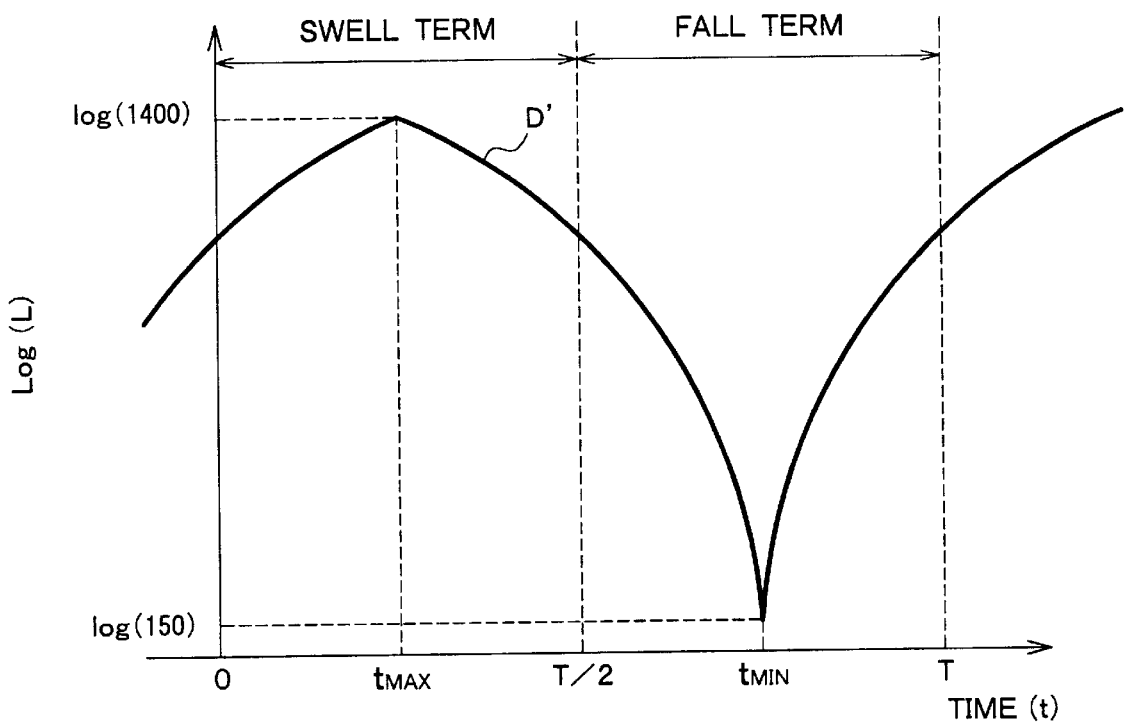
FIG. 9 is a graph showing a waveform of curve D' which is the logarithm of the curve "D" illustrated in FIG. 7.

FIG. 9 shows still another waveform of the curve D', which is the logarithm of the curve "D". The ordinate in FIG. 9 designates the logarithm (Log(L)) of the luminance "L", instead that the ordinate in FIG. 7 designates the value of the luminance.

The variation of the luminance "L" corresponding to the curve "A" illustrated in FIG. 6 is perceived as if it were varied corresponding the curve A' illustrated in FIG. 8 by the characteristics of human visual perception. The same holds true for the curves "B" to "D".

The curve B' illustrated in FIG. 8 is the sinusoidal curve, so that the variation of the luminance "L" corresponding to the curve "B" illustrated in FIG. 6 is perceived as if it were varied corresponding the sinusoidal curve by the characteristics of human visual perception.

The curve C' illustrated in FIG. 8 has the waveform which is inverted upside down the waveform of the curve A'. The quantity of the variation on the curve A' in the swell term is substantially the same as the quantity of the variation on the curve C' in the fall term, and vice versa.

The variation of the luminance "L" corresponding to the curve "C" illustrated in FIG. 6 is perceived as if it were varied corresponding the curve C' which satisfies the condition that the variation of the luminance "L" per the unit time in the vicinity at the maximum luminance time $t_{MAX}$ is larger than that in the vicinity at the minimum luminance time $t_{MIN}$, by the characteristics of human visual perception.

In the experiments, the four illumination lights from the light source, which were controlled to vary corresponding to the curves "A" to "D", were observed by a plurality of the observers, and subjectively evaluated with respect to two items whether the observer could easily adjust the rhythm of breathing corresponding to the variation of the illumination light, or not, and whether the observer could easily be relaxed by observing the illumination light, or not.

The item with respect to the easiness to adjust the rhythm of breathing corresponding to the variation of the illumination light was evaluated by seven evaluation gradations of "very easy", "appreciably easy", "easy", "no preference", "difficult", "appreciably difficult", and "very difficult". Points +3, +2, +1, 0.—1, −2 and −3 were respectively applied to the evaluation gradations. Evaluation points of the illumination lights varying corresponding to the curves "A" to "D" were the mean values of the total points which the observers voted for respective illumination lights.

The item with respect to the easiness of relaxation was evaluated by seven evaluation gradations of "very relaxed", "appreciably relaxed", "relaxed", "no preference", "difficult to be relaxed", "appreciably difficult to be relaxed", and "very difficult to be relaxed". Points +3, +2, +1, 0.−1, −2 and −3 were respectively applied to the evaluation gradations. Evaluation points of the illumination lights varying corresponding to the curves "A" to "D" were the mean values of the total points which the observers voted for respective illumination lights.

Accordingly, the larger the points voted to the illumination light becomes, the higher the evaluation of the illumination light is.

Figure 10:
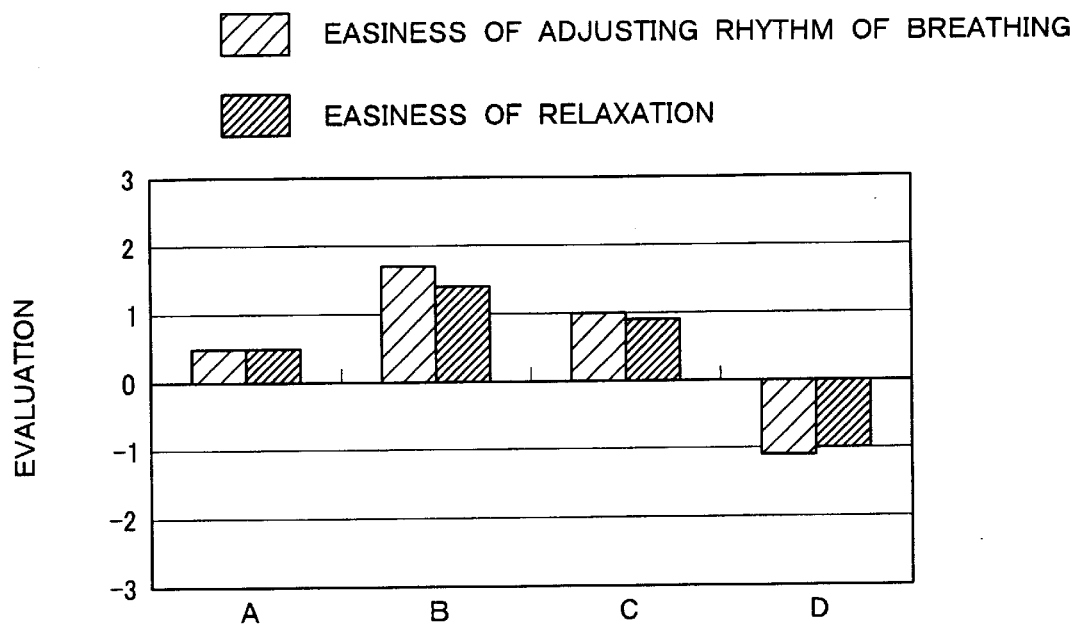
FIG. 10 is a bar graph for showing the results of evaluation of the experiments with respect to the items of easiness to adjust rhythm of breathing and easiness of relaxation.

FIG. 10 shows the results of evaluation of the experiments. In FIG. 10, the symbols "A", "B", "C" and "D" on the abscissa respectively designate the illumination lights, luminance of which were varied corresponding to the curves "A" to "D". The rough hatched bars respectively designate the evaluation values of the item with respect to the easiness of adjusting the rhythm of breathing, and the fine hatched bars respectively designate the evaluation values of the item with respect to the easiness of relaxation. The ordinate of FIG. 10 designates the evaluated points.

The evaluated points of the illumination lights varying corresponding to the curves "A" to "D" with respect to the easiness of adjusting rhythm of breathing were respectively +0.5, +1.6, +1.0 and −1.1.

The evaluated points of the illumination lights varying corresponding to the curves "A" to "D" with respect to the easiness of relaxation were respectively +0.5, +1.4, +0.9 and −1.0.

As can be seen from FIG. 10 showing the results of the experiments, when the luminance "L" is varied corresponding to one of the curves "A" to "C", the observer can easily adjust the rhythm of breathing to the variation of the luminance. When the luminance "L" is varied corresponding to the curve "D", the observer cannot easily adjust the rhythm of breathing to the variation of the luminance. Furthermore, in series of the curves "B", "C" and "A", the illumination lights varied corresponding to these curves becomes easier to be adjusted the rhythm of the breathing by the observers.

With respect to the item of the easiness of relaxation, substantially the same result as that of the easiness to adjust the rhythm of breathing was obtained. When the luminance "L" is varied corresponding to one of the curves "A" to "C", the observer can easily be relaxed. When the luminance "L" is varied corresponding to the curve "D", the observer cannot easily be relaxed. Furthermore, in series of the curves "B", "C" and "A", the illumination lights varied corresponding to these curves becomes easier to make the observer be relaxed.

Still furthermore, it is found improper to vary the illumination light (or the luminance "L" on the light emitting surface of the light source) linearly corresponding to the curve "D" illustrated in FIG. 7, since the observer cannot easily adjust the rhythm of breathing to the variation of the luminance "L". In other words, it is necessary to vary the illumination light roundly.

Since the curves "B" and "C" satisfy the condition that the variation of the luminance "L" per the unit time in the vicinity at the maximum luminance time $t_{MAX}$ is larger than that in the vicinity at the minimum luminance time $t_{MIN}$, the illumination light varying corresponding to the curve "B" or "C" is suitable to be used for adjusting the rhythm of breathing of the observer to the variation of the illumination light and for falling the observer in state of relaxation than the illumination light varying corresponding to the curve "A".

Subsequently, an experiment for validating the easiness to perceive the maximum luminance time $t_{MAX}$ was executed. In the experiment, the curves "A" to "C" illustrated in FIG. 6 were used.

A plurality of observers was requested to push on a switch when they perceived the luminance of the light emitting surface became the largest. The times TS when the observers switched on were recorded. Furthermore, the time TL when the luminance of the light emitting surface takes the largest value was measured, and the differences $\Delta T = |TS-TL|$ were calculated.

Figure 11:
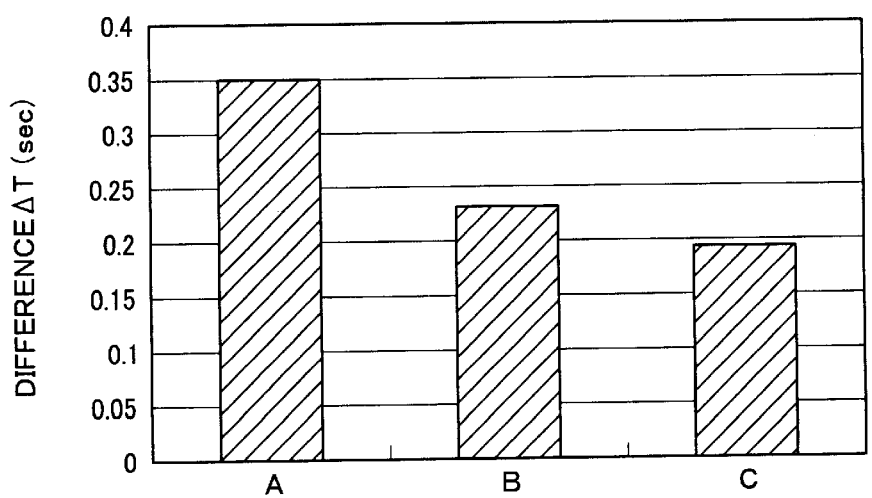
FIG. 11 is a bar graph showing the results of the experiments with respect to a difference ΔT between times TS when observers perceived the luminance of the light emitting surface became the largest and an actual time TL when the luminance of the light emitting surface took the largest value.

FIG. 11 shows the result of the experiment. In FIG. 11, the symbols "A", "B" and "C" on the abscissa respectively designate the illumination lights, luminance of which were varied corresponding to the curves "A" to "C", and the ordinate designates mean values of $\Delta T$. The mean values of $\Delta T$ of the illumination lights varying corresponding to the curves "A" to "C" were respectively 0.35 sec, 0.23 sec and 0.19 sec.

As can be seen from FIG. 11, the easiness of the perception of the maximum illumination time $t_{MAX}$ by the illumination lights varying corresponding to the curves "B" to "C" were largely increased than that by the illumination light varying corresponding to the curve "A".

It was confirmed that the illumination light which was controlled to vary the luminance thereof smaller than the luminance varying corresponding to the sinusoidal curve was suitable for perceiving the maximum luminance time $t_{MAX}$ than the illumination light varying corresponding to the sinusoidal curve.

As mentioned above, the illumination lights varying corresponding to the curves "B" and "C" among four illumination lights corresponding to the curves "A" to "D" are evaluated higher than the illumination light corresponding to the curve "A" with respect to the items of the easiness to adjust the rhythm of breathing, the easiness of relaxation and the easiness of perception of the maximum luminance time $t_{MAX}$.

Figure 12:
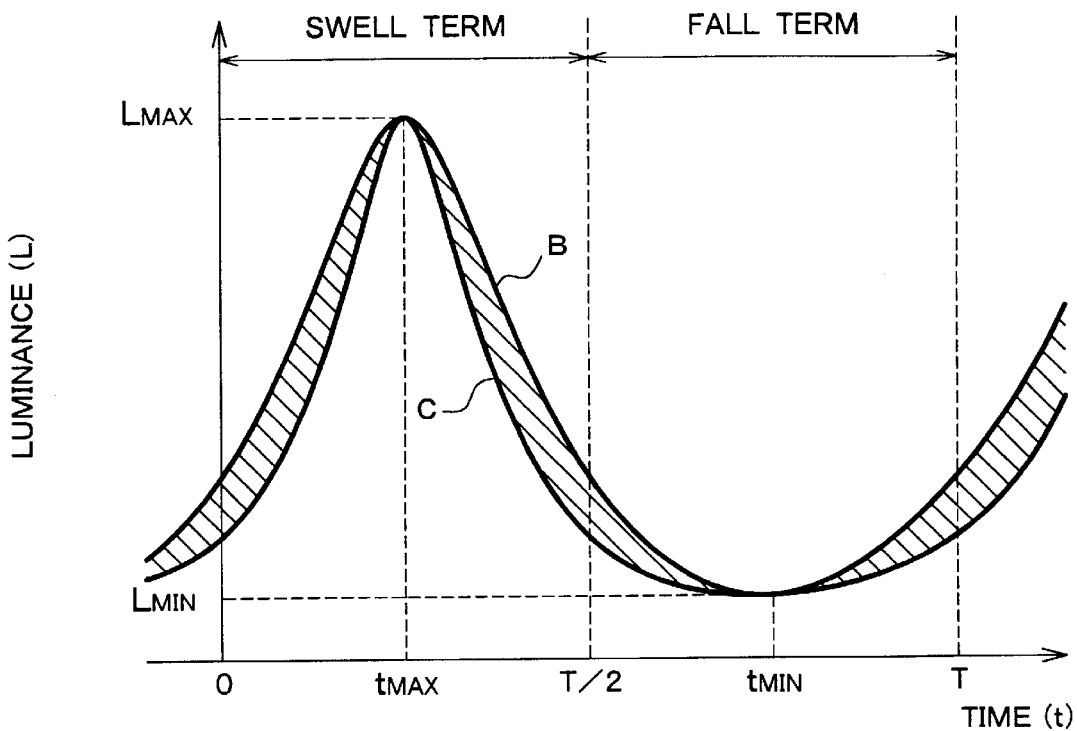
FIG. 12 is a graph showing a region enclosed between the curves "B" and "C", when an optional curve is included in the region, an illumination light varying corresponding to the optional curve will be evaluated higher.

FIG. 12 shows a hatched region enclosed between the curves "B" and "C". An illumination light varying corresponding to a curve included in the hatched region will be evaluated higher, similar to the illumination lights varying corresponding to the curves "B" and "C".

The hatched region in FIG. 12 is shown by the following inequality (5).

$$L_C/(1-r_C \times \sin(t)) \leq L \leq L_B \times r_B^{\sin(t)} \qquad (5)$$

Hereupon, the symbols $L_B$ and $r_B$ are the same constant values as those in the above-mentioned equation (3), and the symbols $L_C$ and $r_C$ are the same constant values as those in the above-mentioned equation (4).

The illumination light varying corresponding to the curve "B" was evaluated the highest among the illumination lights varying corresponding to the curves "A" to "D" with respect to the items of the easiness to adjust the rhythm of breathing and the easiness of relaxation.

The reason why the illumination light varying corresponding to the curve "B" was the highest was considered as the result from the symmetry of the variations of the curve B' in the swell term and in the fall term (see FIG. 8). When an optional curve "X" satisfies a condition that a variation in the swell term and a variation in the fall term of a logarithm curve X' of the curve "X" is symmetrical, an illumination light varying corresponding to the curve "X" will be evaluated higher, similar to the illumination light varying corresponding to the curve "B".

In the above-mentioned embodiment, the luminance of the light emitting surface is varied corresponding to the equations (3) and (4). It, however, is not necessarily to correspond to the equations (3) and (4) strictly. When a difference between an actual luminance of the light emitting surface and an implicit luminance following the equations (3) and (4) is included in ±10% of the actual luminance, the actual variation of the luminance of the light emitting surface is observed by the observer as if it corresponds to the equations (3) and (4). Thus, such the variation of the luminance of the light emitting surface included in the error span is included in the aspect of the present invention.

Furthermore, in the above-mentioned embodiment, a first term while the luminance of the light emitting surface increases and a second term while the luminance of the light emitting surface decreases in one period of the periodic variation are selected to be the same. These terms, however, are not necessarily the same.

When the first term is designated by a symbol $T_1$ and the second term is designated by a symbol $T_2$, the luminance of the light emitting surface can be varied corresponding to the following equation (6).

$$L = L_B \times r_B^{\sin(x)} \qquad (6)$$

Hereupon, when $0 \leq t \leq T_1/2$, $x=(2\pi/2T_1)t$;
when $T_1/2 \leq t \leq T_1/2+T_2$, $x=(2\pi/2T_2)(t-T_1/2)+\pi/2$; and
when $T_1/2+T_2 \leq t \leq T$ $x=(2\pi/2T_1)(t-T_1/2-T_2)+3\pi/2$.
The symbols $L_B$ and $r_B$ designates the same constant values in the equation (3).

There is an upper limit of the luminance of the light emitting surface above which the observer feels dazzling. The lower the color temperature becomes, the higher the upper limit of the luminance becomes. For example, when the color temperature is 2000 K, which is the color temperature of the frame of candle, the upper limit of the luminance of the light emitting surface is 5000 cd/m². Since the frame of candle is one having the lowest color temperature among the illuminators, it is preferable that the upper limit of the luminance of the light emitting surface be equal to or lower than 5000 cd/m². On the other hand, when the luminance of the light emitting surface is too low to observe, the observer feels uneasy. Thus, it is preferable that the lowest luminance of the light emitting surface is higher than 0 cd/m². The luminance of the light emitting surface should be varied in a range higher than 0 cd/m² and equal to or lower than 5000 cd/m².

In the above-mentioned embodiment, the period T of the variation of the luminance of the light emitting surface is constant. The period T, however, is not necessarily constant. It is possible to vary the period "T" of the variation of the luminance of the light emitting surface as time passes.

Figure 13:
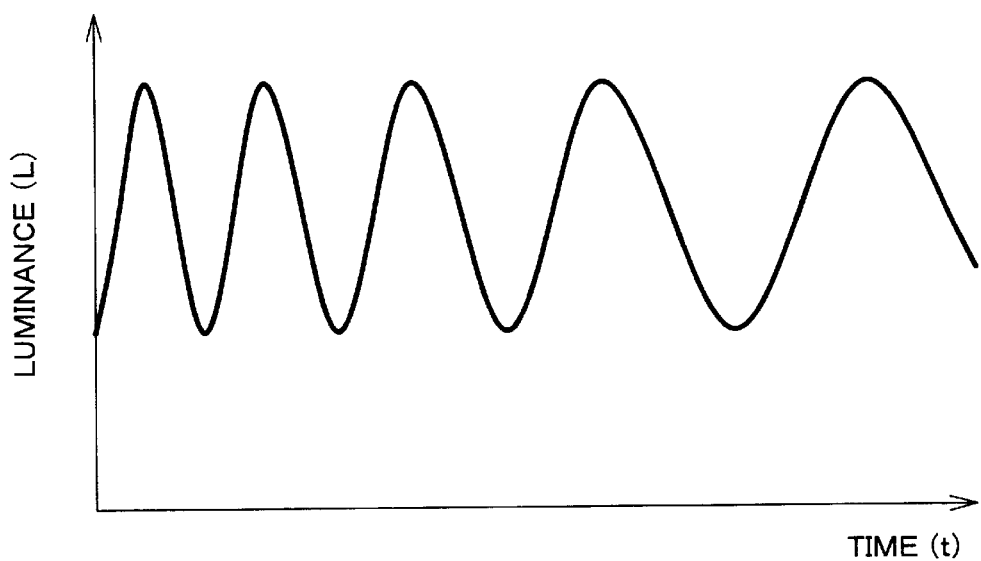
FIG. 13 is a graph showing a modification that period of periodic variation of luminance of a light emitting surface is gradually expanded as time passes.

FIG. 13 shows an example that the period "T" of the variation of the luminance of the light emitting surface is gradually expanded as time passes. Such the lighting control is suitable for expanding the rhythm of breathing exercise gradually to a long period.

By the above-mentioned lighting system, lighting controller and lighting control method, it is possible to lead the observer to the state of relaxation without making the user uncomfortable. Thus, the lighting control system is effective even when the observer does not adjust the rhythm of breathing to the variation of the illumination light, purposefully.

Second Embodiment

A second embodiment of a lighting system, a lighting controller and a lighting control method in accordance with the present invention is described. Heard wares of the lighting system and the lighting controller in the second embodiment are substantially the same as those illustrated in FIGS. 1 and 2 in the first embodiment, so that the description of them is omitted.

Figure 14:
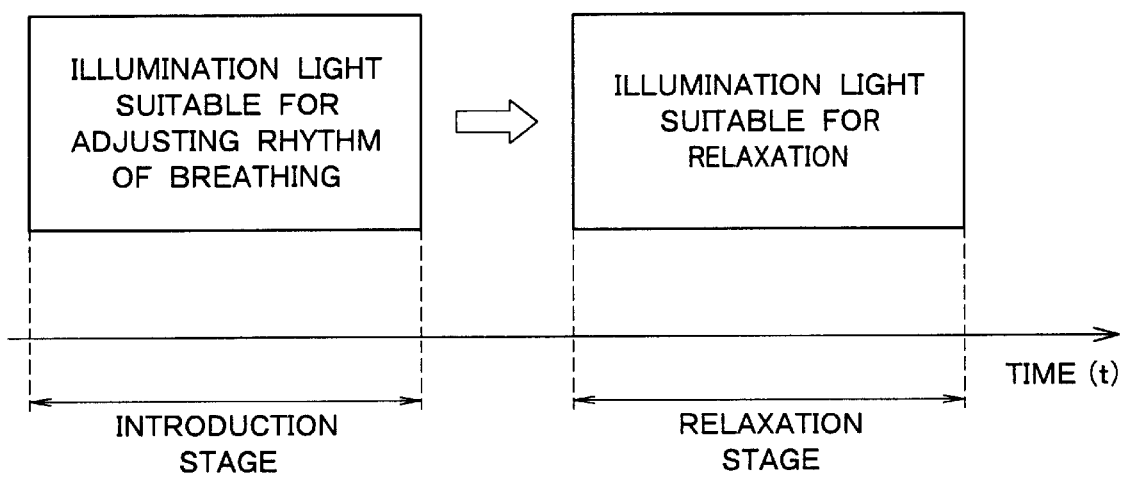
FIG. 14 is a schematic diagram showing a principle of lighting control in a second embodiment of the present invention.

FIG. 14 schematically shows a principle of lighting control in the second embodiment. In the second embodiment, a lighting term is divided into at least an introduction stage and a relaxation stage. The relaxation stage is provided after the introduction stage temporally. In FIG. 2 showing the appearance of the observation of the illumination light, the observer 30 observes the illumination light 50 with closing the eyes. In the introduction stage, the luminance "L" on the light emitting surface of the light source 10 is controlled in a manner so that the illumination light 50 is suitable for adjusting the rhythm of breathing to the observer 30 closing the eyelids. On the other hand, the luminance "L" on the light emitting surface of the light source 10 is controlled in a manner so that the illumination light 50 is suitable for falling the observer 30 in state of relaxation.

It is possible to provide the relaxation stage just after the introduction stage. It, however, is preferable to provide a transition stage between the introduction stage and the relaxation stage. In the transition stage, the luminance "L" on the light emitting surface of the light source 10 is controlled in a manner so that the illumination light 50 is gradually varied from the state suitable for adjusting the rhythm of breathing to the state suitable for falling the state of relaxation.

In the second embodiment, the observer 30 adjusts the rhythm of breathing to the variation of the illumination light 50 in the introduction stage under closing the eyelids, first. After that, the observer 30 can be relaxed in the relaxation stage.

The judgment whether the illumination light 50 is suitable for adjusting the rhythm of breathing or not is based on psychological effect of the observer 30, so that it can only be shown by statistical method such as probability. In this embodiment, when a number of observers equal to or larger than 50% of the total number of observers reply that an illumination light is suitable for adjusting the rhythm of breathing, the illumination light is defined suitable for adjusting the rhythm of breathing. For example, a number of observers equal to or larger than five among ten observers reply that the illumination light is suitable for adjusting the rhythm of breathing, the illumination light is defined "suitable for adjusting the rhythm of breathing".

Similarly, when a number of observers equal to re larger than 50% of the total number of the observers reply that the illumination light is suitable for falling the state of relaxation, the illumination light is defined "suitable for relaxation".

Subsequently, a control of a luminance ratio "C" of the maximum luminance value $L_{MAX}$ against the minimum luminance value $L_{MIN}$ ($C=L_{MAX}/L_{MIN}$) on the light emitting surface of the light source 10 is described. When the observer 30 closing the eyelids perceives the variation of the illumination light (hereinafter, abbreviated as "eyelid closing state"), the quantity of light reaching to the pupil passing trough the eyelids is reduced to several % than the quantity of light directly reaching the pupil when the observer opening the eyelids perceives the variation of the luminance of the same illumination light (hereinafter abbreviated as "eyelid opening state"). Thus, the variation of the brightness can be perceived sensitively than the luminance of the light emitting surface or absolute brightness in the eyelid closing state. It has been found that the variation of the brightness corresponds to the illuminance ratio on the eyes when the periodically varying illumination light is irradiated on the eyes. The illuminance ratio on the eyes is defined as the ratio of the maximum illuminance on the eyes when the luminance of the light emitting surface becomes the highest in one period of the periodic variation against the minimum illuminance on the eyes when the luminance of the light emitting surface becomes the lowest. Since the illuminance ratio on the eyes of the observer 30 who sits on at a position with a predetermined distance from the light source 10 corresponds to the luminance ratio "C" on the light emitting surface of the light source 10, so that the luminance ratio $C(=L_{MAX}/L_{MIN})$ on the light emitting surface of the light source 10 is referred in the following description.

When the minimum luminance value $L_{MIN}$ is 0, it is impossible to calculate the luminance ratio. Furthermore, when the minimum luminance value is near to 0, it is impossible to perceive the illumination light, so that it will be insignificant to argue the luminance ratio with respect to the human visual perception. Generally, the luminance values are not argued with respect to the human visual perception at three digits after the decimal point. Thus, when the minimum luminance value $L_{MIN}$ is smaller than 0.01, the minimum luminance value $L_{MIN}$ is assumed to be 0.01 for calculating the luminance ratio. For example, when the maximum luminance value $L_{MAX}$ is 0.1 and the minimum luminance value $L_{MIN}$ is 0, the luminance ratio "C" will be calculated as 10 since the minimum luminance value $L_{MIN}$ is assumed to be 0.01. When the maximum luminance value $L_{MAX}$ is 0.1 and the minimum luminance value $L_{MIN}$ is 0.005, the luminance ratio "C" will be calculated as 10 since the minimum luminance value $L_{MIN}$ is assumed to be 0.01.

It is preferable to make the luminance ratio "C" larger so as to make the observer who closes the eyelids adjust the rhythm of breathing to the variation of the illumination light. Generally, the larger the luminance ratio becomes, the easier the observer adjusts the rhythm of breathing. When the luminance ratio "C" becomes too high, the burden of the eyes of the observer becomes larger, so that the observer feels uncomfortable. Accordingly, it is preferable to increase the luminance ratio not to make the observer feel uncomfortable.

For increasing the degree of relaxation of the observer closing the eyelids, it is necessary to reduce the burden of the eyes of the observer. Generally, the smaller the luminance ratio "C" becomes, that is, the closer the luminance of the light emitting surface becomes to a constant value, the smaller the burden of the eyes of the observer become. However, when the luminance ratio "C" is too small, the observer cannot perceive the variation of the luminance of the light emitting surface. In the eyelid closing state, the quantity of light reaching to the pupil is reduced to several % of the original luminance of the light emitting surface, so that the luminance ratio "C" in one period, that is, the sense of bright or dark by the illuminance on the eyes becomes the unique means for sensing the variation of the luminance of the light emitting surface. Thus, it is preferable that the value of the luminance ratio "C" is assured to be large than a predetermined level by which the observer can perceive the variation of the luminance of the light emitting surface.

In the lighting control in the second embodiment, in the introduction stage, the luminance ratio $C1(=L_{MAX1}/L_{MIN1})$ of the maximum luminance value $L_{MAX1}$ against the minimum luminance value $L_{MIN1}$ in one period of the periodic variation of the luminance on the light emitting surface of the light source 10 is controlled to be substantially constant. In the relaxation stage, the luminance ratio $C2(=L_{MAX2}/L_{MIN2})$ of the maximum luminance value $L_{MAX2}$ against the minimum luminance value $L_{MIN2}$ in one period of the periodic variation of the luminance on the light emitting surface of the light source 10 is controlled to be substantially constant. In this description, the "substantially constant" includes not only the case that the value of the luminance ratio C1 or C2 perfectly coincides with a predetermined constant value, but also the case that the value luminance ratio C1 or C2 is different by predetermined error factor from a predetermined constant value.

Figure 15:
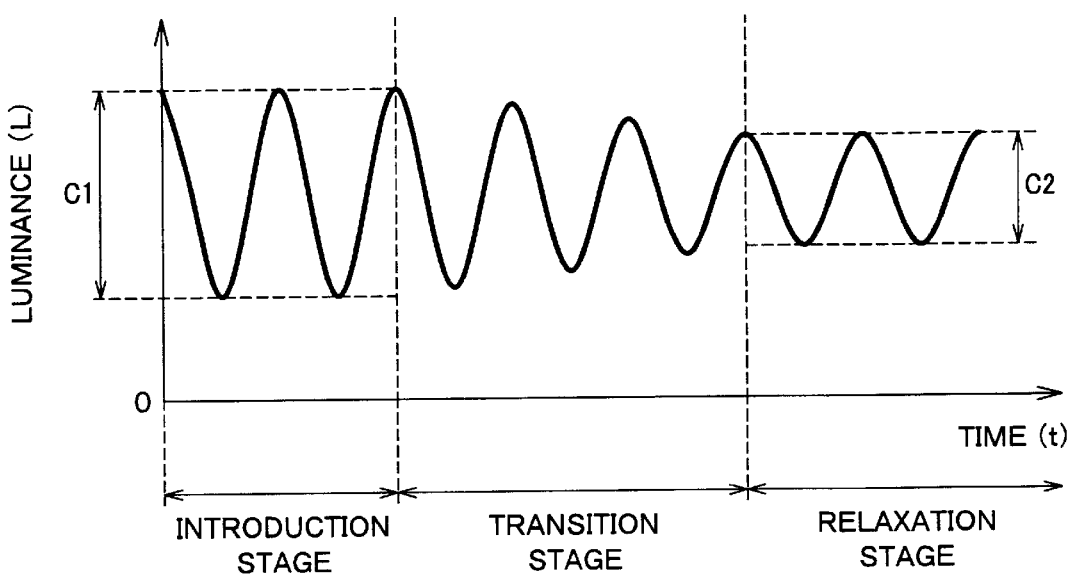
FIG. 15 is a graph showing an example of variation of luminance on a light emitting surface of a light source controlled by a lighting control method in the second embodiment.

FIG. 15 shows an example of the variation of the luminance on the light emitting surface of the light source 10 controlled by a lighting control method in accordance with the second embodiment. In FIG. 15, the abscissa designates the time "t", and the ordinate designates the luminance "L" on the light emitting surface of the light source 10.

In the example shown in FIG. 15, the luminance ratio $C1(=L_{MAX1}/L_{MIN1})$ in the introduction stage takes a constant value. The luminance value $C2(=L_{MAX2}/L_{MIN2})$ in the relaxation stage takes a constant value smaller than the value of the luminance ratio C1. In the transition stage between the introduction stage and the relaxation stage, the luminance ratio $C3(=L_{MAX3}/L_{MIN3})$ gradually decreases from the value of the luminance ratio C1 to the value of the luminance ratio C2.

For reducing the burden of the eyes of the observer who closes his eyelids, it is preferable to decrease the luminance "L" of the light emitting surface of the light source further to or instead of decreasing the luminance ratio "C" in one period of the variation of the luminance on the light emitting surface of the light source. When the luminance "L" of the light emitting surface of the light source is reduced, the quantity of the information reaching to the pupil of the observer will decrease.

Figure 16:
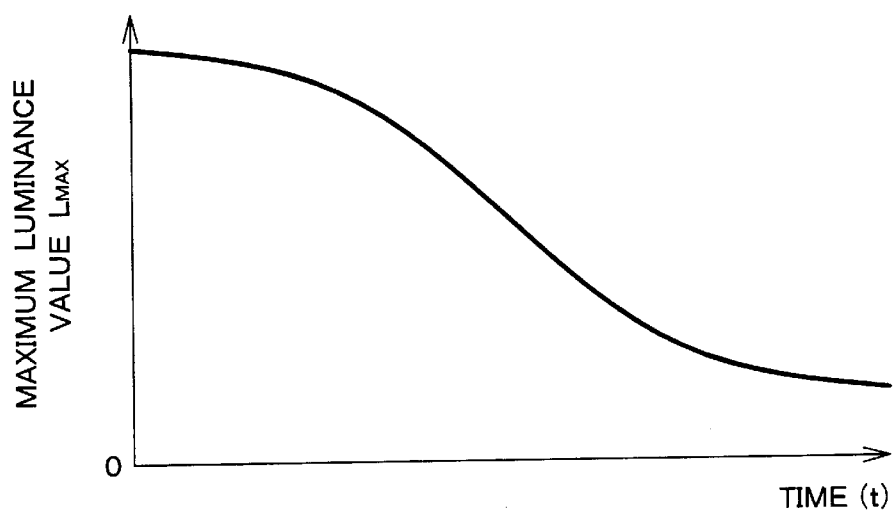
FIG. 16 is a graph showing an example of a variation of a maximum luminance value $L_{MAX}$ on the light emitting surface of the light source in the second embodiment.

FIG. 16 shows an example of the variation of the maximum luminance value $L_{MAX}$ on the light emitting surface of the light source 10. In FIG. 16, the abscissa designates the time "t", and the ordinate designates the value of the maximum luminance value on the light emitting surface of the light source 10. In this example, the maximum luminance value $L_{MAX}$ monotonously decreases as tile passes. It is preferable that the maximum luminance value $L_{MAX}$ takes a constant value while a predetermined term and monotonously decreases after taking the constant value. The term "monotonously" includes the meaning of "constant" and "decrease".

Furthermore, it is preferable that the minimum luminance value $L_{MIN}$ monotonously decreases as time passes further to or instead of decreasing the maximum luminance value $L_{MAX}$ monotonously as time "t" passes. By such a configuration, it is possible to reduce the burden of the eyes of the observer.

Figure 17:
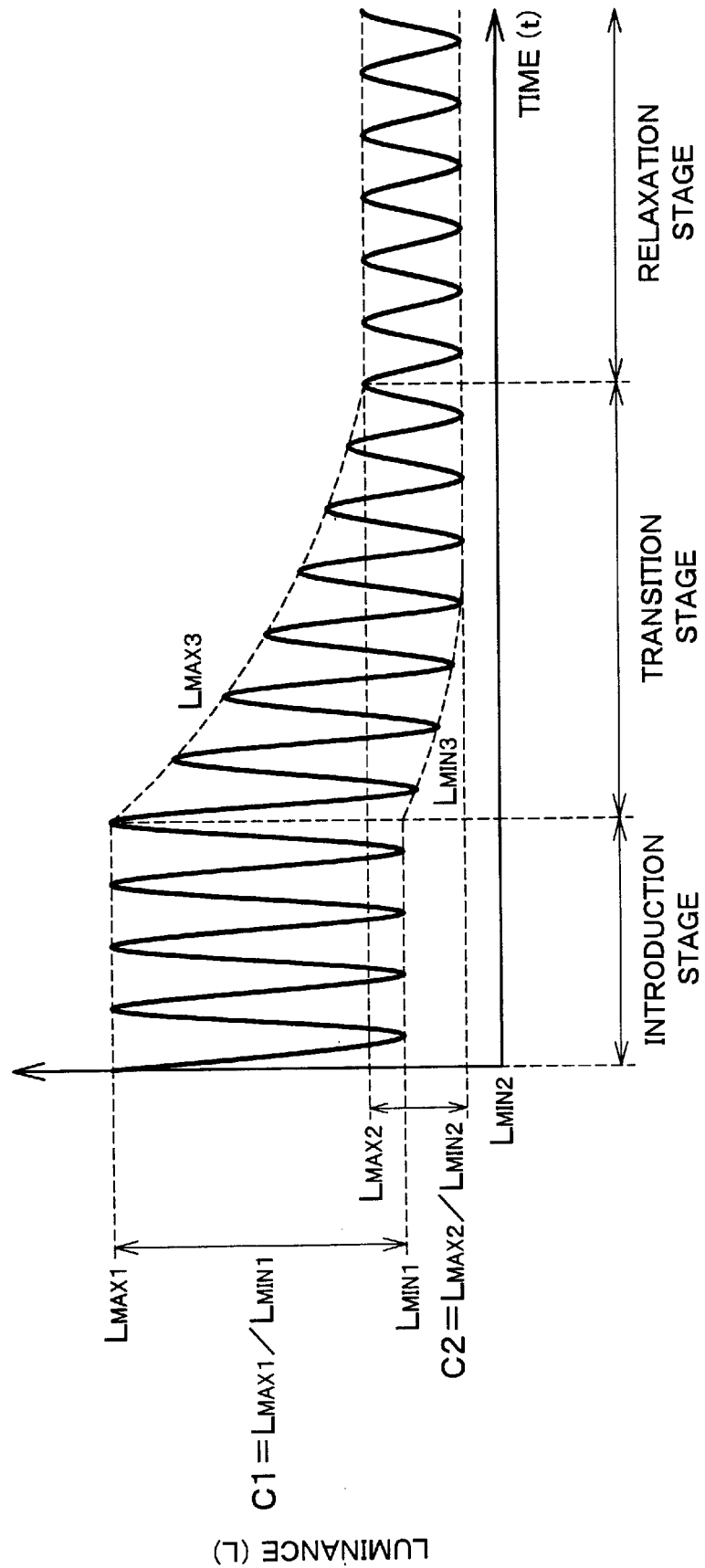
FIG. 17 is a graph showing another example of the variation of the luminance on the light emitting surface of the light source by another lighting control method in the second embodiment.

FIG. 17 shows another example of the variation of the luminance "L" on the light emitting surface of the light source 10 by another lighting control method in accordance with the second embodiment. In FIG. 17, the abscissa designates the time "t", and the ordinate designates the luminance "L" on the light emitting surface of the light source 10. In this example, the symbol $L_{MAX1}$ designates the maximum luminance value and the symbol $L_{MIN1}$ designates the minimum luminance in one period of the variation of the luminance in the introduction stage. The symbol $L_{MAX2}$ designates the maximum luminance value and the symbol $L_{MIN2}$ designates the minimum luminance in one period of the variation of the luminance in the relaxation stage. The symbol $L_{MAX3}$ designates the transition of the maximum luminance value and the symbol $L_{MIN3}$ designates the transition of the minimum luminance in one period of the variation of the luminance in the transition stage. In the introduction stage, the luminance ratio $C1(=L_{MAX1}/L_{MIN1})$ takes a constant value. In the relaxation stage, the luminance ratio $C2(=L_{MAX2}/L_{MIN2})$ takes a constant value. In the transition stage, the luminance ratio C3 gradually decreases from the vale of the luminance ratio C1 to the value of the luminance ratio C2.

Furthermore, in the example shown in FIG. 17, the value of the luminance ratio C1 is larger than the value of the luminance ratio C2(C1>C2), the maximum luminance value $L_{MAX2}$ in the relaxation stage is larger than the maximum luminance value $L_{MIN1}$ in the introduction stage ($L_{MAX2}>L_{MIN1}$), and the minimum luminance value $L_{MIN1}$ in the introduction stage is larger than the minimum luminance value $L_{MIN2}(L_{MIN1}>L_{MIN2})$.

For realizing the illumination light suitable for adjusting the rhythm of breathing to the observer closing the eyelids and the illumination light suitable for falling the observer in state of relaxation, it is important to design the lighting system in a manner so that the luminance ratios C1 and C2 shown in FIG. 17 correspond to the state of closing the eyelids.

Figure 18:
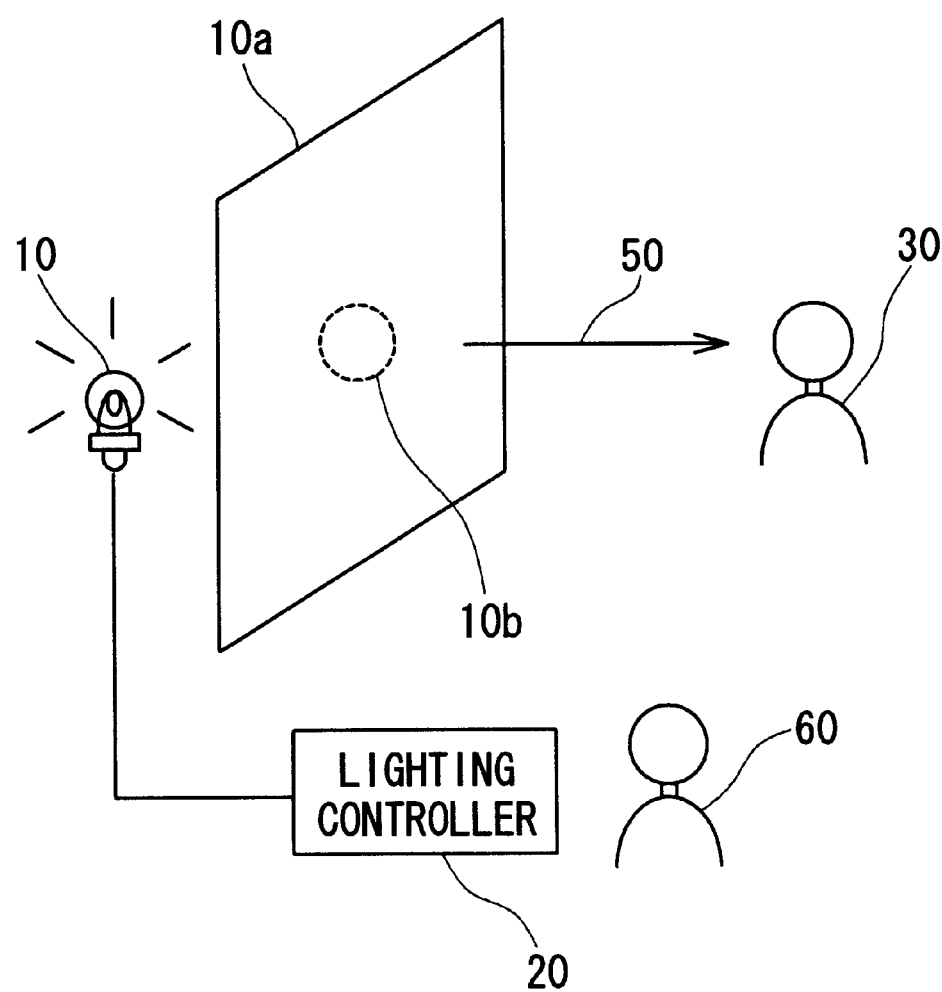
FIG. 18 is a schematic drawing showing an experimental circumference which was used for designing the lighting system for realizing the luminance ratios C1 and C2 illustrated in FIG. 17.

FIG. 18 shows an experimental circumference which was used for designing the lighting system for realizing the luminance ratios C1 and C2 illustrated in FIG. 17. The lighting controller 20 controlled the light source 10 in a manner so that the luminance "L" on the light emitting surface 10b of the light source 10 periodically varied. An operator 60 controlled the values of parameters which were set in the lighting controller 20 so as to vary the pattern of the variation of the luminance "L" on the light emitting surface 10b of the light source. The observer 30 observed the illumination light 50 while he had closed the eyelids. A light shielding plate 10a was disposed in front of the light source 10 for shielding the light emitted from the light source except the illumination light 50 emitted from the light emitting surface 10b. The light emitting surface 10b was sufficiently large, so that the eyelids of the observer 30 were uniformly illuminated under closing the eyelids.

For expanding a range between the maximum illuminance and the minimum illuminance on the eyes of the observer 30 as large as possible (for example from several lx to several thousands lx), the distance between the light emitting surface 10b and the observer 30 was varied, and the ND (neutral density) filters were used further to vary the electric power supplied to the light source 10. Especially, it was obvious that the observer felt comfortable when the luminance of the light emitting surface was lower. Thus, the minimum illuminance 0.001 lx on the eyes of the observer could be realized with using the ND filters.

The variation of the illuminance on the eyes of the observer 30 using the general lighting system for falling the observer 30 in the state of relaxation could be realizes by the experiment. Other light sources except the light source 10 are excluded, so that the circumference of the observer 30 was made dark. Seven subject persons who had normal visual perception and normal color sensation were committed in the experiments.

Method for designing the luminance ratios C1 and C2 shown in FIG. 17 is described in detail.

In the lighting control method of the second embodiment, it is the most important that the observer who closes his eyelids can adjust the rhythm of breathing to the variation of the illumination light. For adjusting the rhythm of breathing, it is at least necessary that the period of the variation of the luminance of the light emitting surface can be perceived while the observer closes the eyelids. For perceiving the period of the variation of the luminance of the light emitting surface, it is necessary to perceive the maximum luminance time and the minimum luminance time. In other words, it is important to find the lower limit value of the luminance ratio of the maximum luminance value against the minimum luminance value in one period of the variation of the luminance of the light emitting surface, by which the observer can perceive the maximum luminance and the minimum luminance while he closes the eyelids.

In the relaxation stage, it is necessary to reduce the burden of the eyes of the observer as smaller as possible for increasing the degree of relaxation. Thus, the lower limit of the luminance ratio C2 in the relaxation stage becomes the lower limit of the luminance ratio of the maximum luminance value against the minimum luminance value in one period of the variation of the luminance of the light emitting surface.

Under the condition illustrated in FIG. 18, the experiment for obtaining the lower limit value of the luminance ratio $C(=L_{MAX}/L_{MIN})$ by which the observer can perceive the maximum luminance time and the minimum luminance time was executed. The symbol $L_{MAX}$ designates the maximum luminance value, and the symbol $L_{MIN}$ designates the minimum luminance value in one period of the variation of the luminance on the light emitting surface of the light source 10. In the experiment, the four values 4 lx, 2 lx, 1 lx and 0.5 lx were prepared for the minimum luminance value $L_{MIN}$.

Eight subject persons were requested to response when they fell the luminance of the light emitting surface became the largest. Differences between the times when the subject persons perceived the luminance of the light emitting surface became the largest and the actual time when the luminance of the light emitting surface took the largest value were measured. Subsequently, the subject persons were requested to response when they fell the luminance of the light emitting surface became the smallest. The difference ΔT is considered the delay time between the time when the observer started the swell of breathing and the time when the luminance of the light emitting surface became the largest.

When the value of the difference ΔT becomes smaller, the difference ΔT between the time when the observer starts the swell of breathing and the time when the luminance of the light emitting surface becomes also becomes smaller. Thus, it is considered that the rhythm of breathing of the observer is in synchronism with the variation of the illumination light.

With respect to one subject person, the same experiment was repeated five times. There, however, were some cases that the observer could not perceive the time when the luminance of the light emitting surface became the largest and/or the time when the luminance of the light emitting surface became the smallest while the observer had been closing the eyelids. Since the numbers of measurements with respect to respective observers 30 were not constant, a mean value of the response times with respect to the same observer 30 was used as the result of the measurement with respect to the observer 30.

The operator 60 set the luminance ratio "C" of the light source 10. The observer 30 pushed on a switch when he felt that the luminance of the light emitting surface became the largest or the smallest. The time TS when the observer 30 had switched on the switch was recorded. The luminance "L" on the light emitting surface 10b of the light source 10 was measured and the time TL when the luminance of the light emitting surface had become the largest or the smallest was recorded. The difference ΔT=|TS−TL| was calculated.

Hereupon, the meanings of the times TS and the difference ΔT are described. The observer observes the variation of the illumination light and adjusts the rhythm of breathing while he closes the eyelids. Thus, the time TS showing the time when the observer felt the largest luminance of the light emitting surface is considered substantially the same as the time when he started the swell of breathing. Thus, the difference ΔT is considered the delay time between the time when the observer started the swell of breathing and the time when the luminance of the light emitting surface became the largest. When the value of the difference ΔT becomes smaller, the difference ΔT between the time when the observer starts the swell of breathing and the time when the luminance of the light emitting surface becomes the largest also becomes smaller. Thus, it is considered that the rhythm of breathing of the observer is in synchronism with the variation of the luminance of the light emitting surface.

Similarly, the time TS showing the timing that the observer felt the smallest luminance of the light emitting surface is considered substantially the same as the time when he started the draw of breathing. Thus, the difference ΔT is considered the delay time between the time when the observer started the draw of breathing and the time when the luminance of the light emitting surface became the smallest. When the value of the difference ΔT becomes smaller, the difference ΔT between the time when the observer starts the draw of breathing and the time when the luminance of the light emitting surface becomes the smallest also becomes smaller. Thus, it is considered that the rhythm of breathing of the observer is in synchronism with the variation of the luminance of the light emitting surface.

As mentioned above, there were some cases that the observer could not perceive the time when the luminance of the light emitting surface became the largest and/or the time when the luminance of the light emitting surface became the smallest while the observer had been closing the eyelids. Thus, the number of the responses has a high degree of relation with the perception of the observer for perceiving the largest luminance or the smallest luminance of the light emitting surface. A response ratio RS was calculated by multiplying 100 to the number of the responses.

Figure 19A:
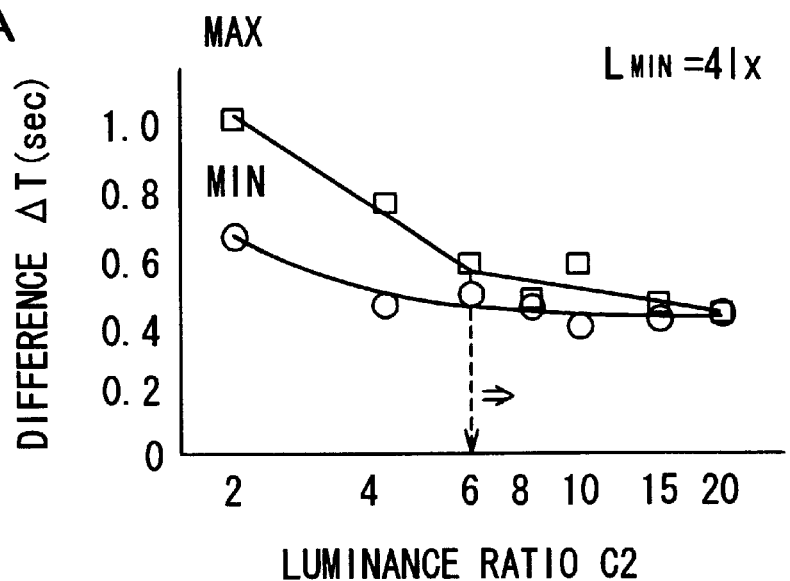
FIGS. 19A and 19B are graphs showing the results of experiments with respect to relations between the luminance ratio of the illumination light and the difference ΔT between time when subject person perceived the luminance of the light emitting surface became the largest and actual time when the luminance of the light emitting surface took the largest value in the second embodiment.
Figure 19B:
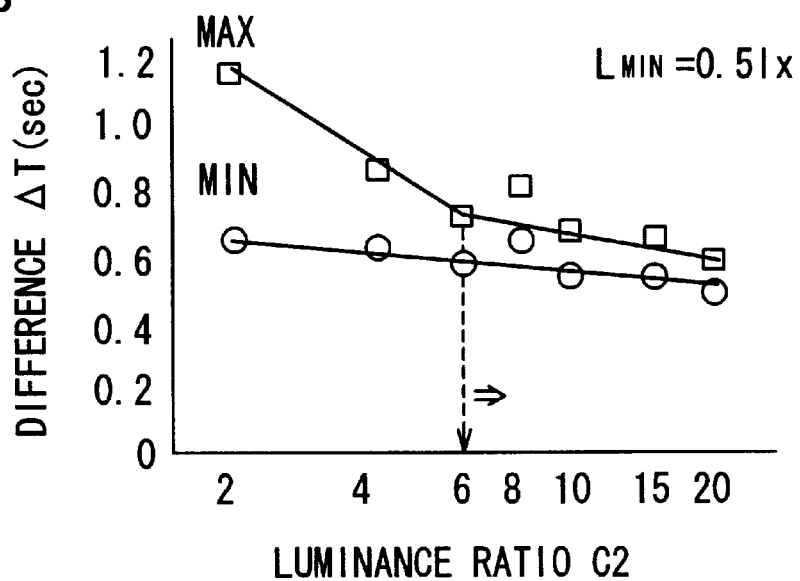
Figure 20A:
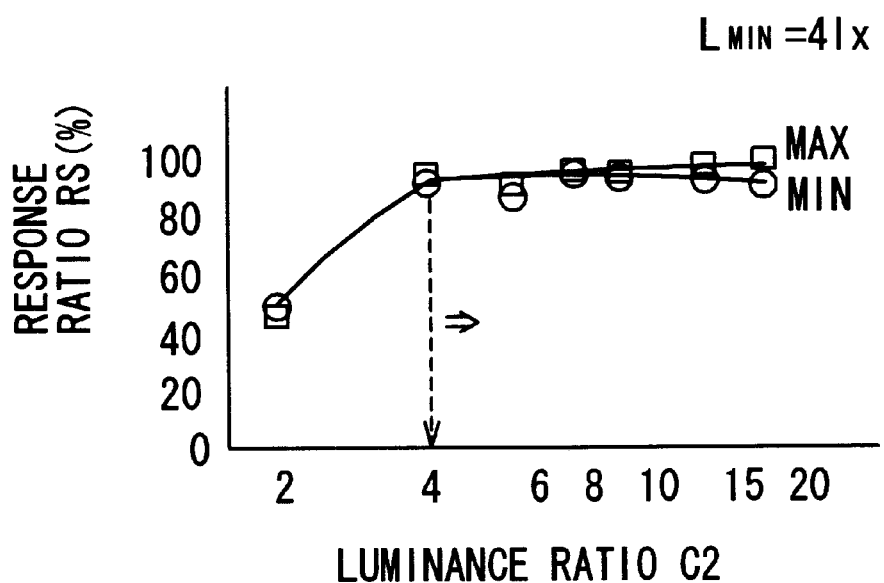
FIGS. 20A and 20B are graphs showing the results of experiments with respect to relations between the luminance ratio of illumination light and the response ratio RS in the second embodiment.
Figure 20B:
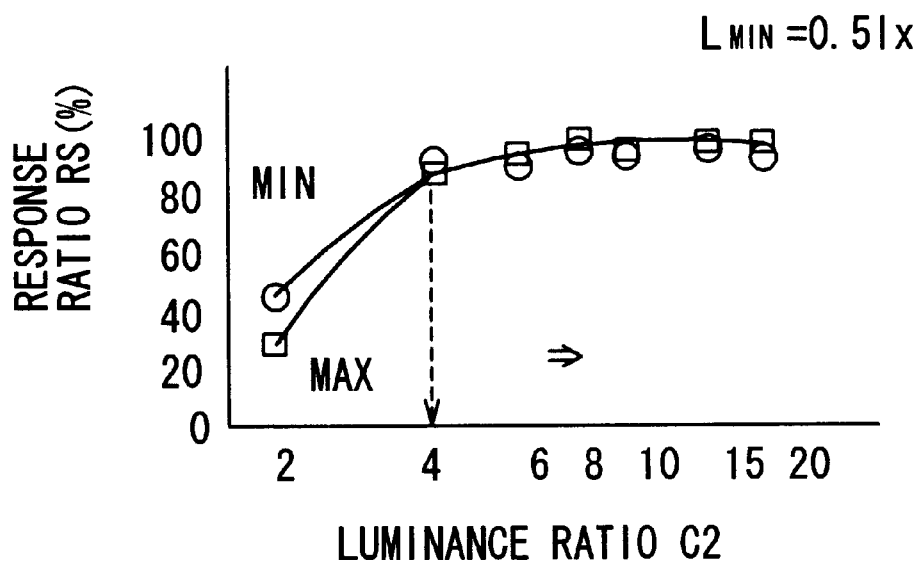
Figure 21A:
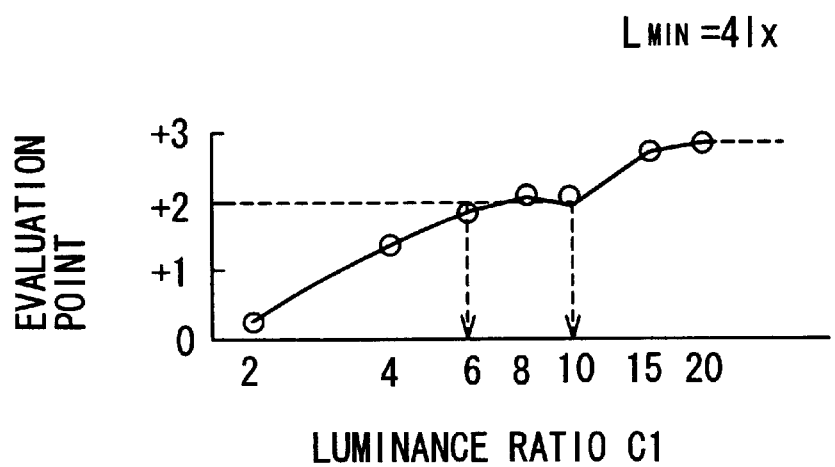
FIGS. 21A and 21B are graphs showing the results of subjective evaluation by the observers with respect to the intelligibility of the variation of the luminance of the light emitting surface in the second embodiment.
Figure 21B:
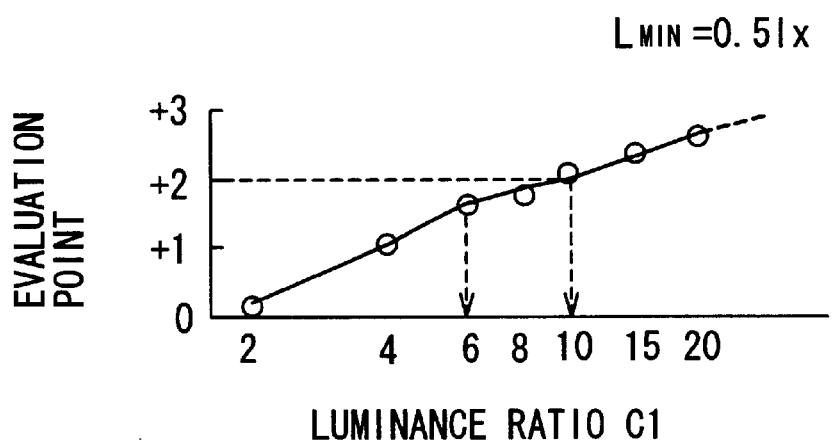

FIGS. 19A, 19B, 20A, 20B, 21A and 21B show the results of the experiments. There were no differences among the results of the experiments respectively using the lower limit of the luminance of the light emitting surface 4 lx, 2 lx, 1 lx and 0.5 lx, so that FIGS. 19A, 20A and 21A show the results of the experiments using the lower limit 4 lx, and FIGS. 19B, 20B and 21B show the results of the experiments using the lower limit 0.5 lx.

FIGS. 19A and 19B show the results of the experiments with respect to relations between the luminance ratio of the illumination light and the difference $\Delta T$. In FIGS. 19A and 19B, the abscissas designate the logarithm of the luminance ratios $C2(=L_{MAX2}/L_{MIN2})$, and the ordinates designate the difference $\Delta T$ (sec). The square marks designate the differences $\Delta T$ when the luminance of the light emitting surface took the largest value, and the circular marks designate the differences $\Delta T$ when the luminance of the light emitting surface took the smallest value.

As can be seen from FIGS. 19A and 19B, the differences $\Delta T$ in both cases monotonously decreased corresponding to the increase of the luminance ratio C2, when the luminance of the light emitting surface took not only the largest value but also the smallest value. With respect to the case that the luminance of the light emitting surface took the smallest value, the differences $\Delta T$ became substantially constant in a region that the luminance ratio C2 was equal to or larger than 4. With respect to the case that the luminance of the light emitting surface took the largest value, an inflection point occurred on the curve on the differences $\Delta T$, and the differences $\Delta T$ gradually reduced to a constant value. Thus, when the luminance ratio C2 became larger than 6, the time delay which is necessary for judging that the luminance of the light emitting surface became the largest or the smallest by the observer closing the eyelids became constant.

FIGS. 20A and 20B show the results of the experiments with respect to relations between the luminance ratio of the illumination light and the response ratio RS. In FIGS. 20A and 20B, the abscissas designate the logarithm of the luminance ratio C2, and the ordinates designate the response ratio RS (%). The square marks designate the response ratio RS when the luminance of the light emitting surface took the largest value, and the circular marks designate the response ratio RS when the luminance of the light emitting surface took the smallest value. As can be seen from FIGS. 20A and 20B, when the luminance ratio C2 became equal to or larger than 4, the response ratio RS became substantially constant about 90% in both cases.

In the above-mentioned results, it is found that the observer closing the eyelids can perceive the times when the luminance of the light emitting surface becomes the largest and the smallest, and the response ratio RS is equal to or larger than 90% when the luminance ratio C2 is equal to or larger than 6. Thus, the observer closing the eyelids can adjust the rhythm of breathing to the variation of the illumination light when the luminance ratio C2 is equal t or larger than 6. It is necessary that the luminance ratio $C2(=L_{MAX2}/L_{MIN2})$ of the maximum luminance value $L_{MAX2}$ against the minimum luminance value $L_{MIN2}$ in one period of the variation of the luminance of the light emitting surface satisfies $C2 \geq 6$ in the relaxation stage.

Subsequently, the results of consideration with respect to the minimum value of the luminance ratio in the introduction stage are described. For designing the constant value C1 in the introduction stage, it is important that the variation of the illumination light is easier to be adjusted the rhythm of breathing of the observer closing the eyelids.

Eight subject persons were requested subjectively to evaluate whether the variation of the illumination lights 50 respectively having the luminance ratios C1=2, 4, 6, 8, 10, 15 and 20 emitted from the light source 10 were intelligible or not when the observed the illumination light under closing the eyelids. The evaluation items with respect to the intelligibility of the illumination lights were evaluated by four evaluation gradations of "very intelligible", "intelligible", "unintelligible" and "very unintelligible". Points +3, +2, +1 and 0 were respectively applied to the evaluation gradations. Evaluation points of the illumination lights having the luminance ratios C1=2, 4, 6, 8, 10, 15 and 20 were the mean values of the total points which the observers voted for respective illumination lights. The illumination lights having the evaluation points equal to or larger than 2 are equivalent to be evaluated that more than 50% of the observer evaluated intelligible. In this description, the illumination light having the evaluation point equal to or larger than 2 is defined as the intelligible illumination that the variation of the illumination light is intelligible under closing the eyelids.

FIGS. 21A and 21B show the results of subjective evaluation of the observers with respect to the intelligibility of the variation of the illumination light. In FIGS. 21A and 21B, the abscissas designate the logarithm of the luminance ratios C1, and the ordinates designate the evaluation point. As can be seen from FIGS. 21A and 21B, when the luminance ratio C1 was 10, the evaluation point became equal to or larger than +2. It was found that the variation of the illumination light was intelligible to the observer closing the eyelids when the luminance ratio C1 was larger than 10. It is necessary that the luminance ratio $C1(=L_{MAX1}/L_{MIN1})$ of the maximum luminance value $L_{MAX1}$ against the minimum luminance value $L_{MIN1}$ in one period of the variation of the luminance of the light emitting surface satisfies C1>10 in the introduction stage.

Furthermore, it is necessary to exclude the discomfort affecting to the observer for increasing the degree of relaxation of the observer in the introduction stage and in the relaxation stage.

The experiments for obtaining the upper limit of the luminance ratio $C(=L_{MAX}/L_{MIN})$ at which the observer closing the eyelids does not feel uncomfortable under the experimental circumference shown in FIG. 18 were executed. Eight subject persons were requested to reply the upper limit of the luminance ratio "C" at which they did not feel uncomfortable while the luminance ratio "C" of the light source 10 was varied in a predetermined range.

Figure 22:
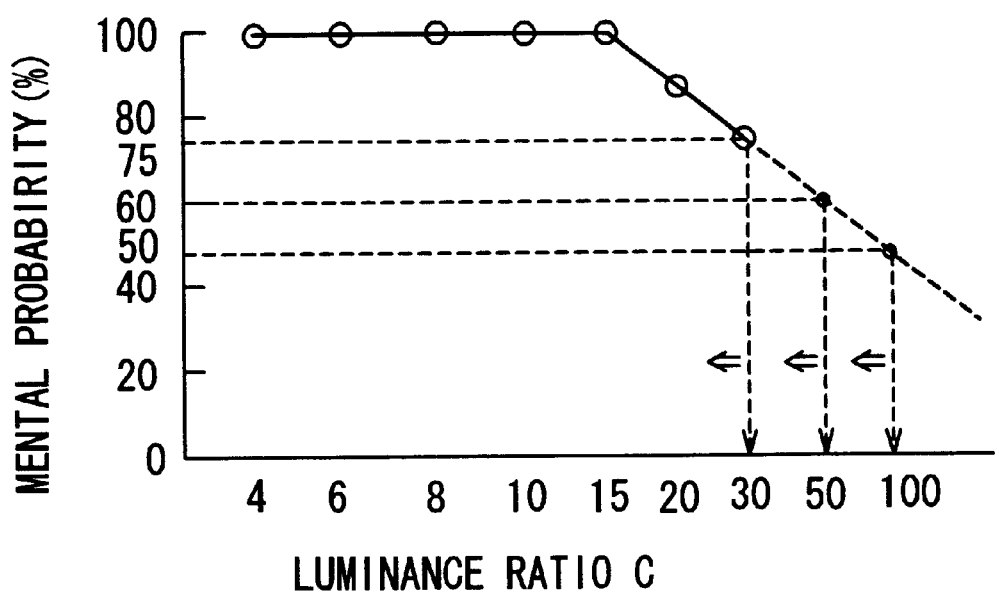
FIG. 22 is a graph showing the results of experiments with respect to a relation between the probability (%) that the observers did not feel uncomfortable and the luminance ratio of the illumination light in the second embodiment.

FIG. 22 shows the results of the experiments. In FIG. 22, the abscissa is a logarithmic scale designating the luminance ratios C1, and the ordinates designate the probability (%) that the observers did not feel uncomfortable. The experiments were executed under the experimental condition shown in FIG. 18. Seven subject persons were requested to reply alternative of "not uncomfortable" and "uncomfortable". The seven subject persons had normal visual perception and normal color sensation. Probabilities that the persons replied "not uncomfortable" were calculated with respect to both conditions. For example, when four persons were replied "not comfortable", the probability was $4/7 \times 100 \approx 57\%$.

As can be seen from FIG. 22, the observers closing the eyelids did not feel uncomfortable until the luminance ratio "C" reached to 15, even when the luminance ratio "C" had been increasing. When the luminance ratio "C" became larger than 15, the probability that the observer did not feel uncomfortable degreased. When the luminance ratio was 30, the probability that the observer did not feel uncomfortable was 75%. When the curve illustrated in FIG. 22 is extrapolated, the probability that the observer does not feel uncomfortable will be lower than 60% when the luminance ratio "C" becomes 50. Furthermore, when the luminance ratio "C" becomes 100, the probability that the observer does not feel uncomfortable will be lower than 50%. Thus, it is found that the probability that the observer does not feel uncomfortable becomes equal to or larger than 50% when the luminance ratio C≦100 in the introduction stage and in the relaxation stage.

From the above-mentioned results of the experiments, it is necessary that the constant value C1 of the luminance value "C" in the introduction stage and the constant value C2 of the luminance ratio "C" in the relaxation stage satisfy the conditions C1≦100 and C2≦100. Thus, it is necessary that the luminance ratio C1 in the introduction stage satisfies the condition 10<C1≦100, and the luminance ratio C2 in the relaxation stage satisfies the condition 6≦C2≦100.

Since the probability that the observer closing the eyelids does not feel uncomfortable will be 60% when the luminance ratio "C" is 50, it is preferable that the constant value C1 of the luminance ratio "C" in the introduction stage and the constant value C2 of the luminance ratio "C" in the relaxation stage satisfy the conditions C1≦50 and C2≦50, so as not to make uncomfortable on a larger number observers. Thus, it is necessary that the luminance ratio C1 in the introduction stage satisfies the condition 10<C1≦50, and the luminance ratio C2 in the relaxation stage satisfies the condition 6≦C2≦50.

Furthermore, since the probability that the observer closing the eyelids does not feel uncomfortable will be 75% when the luminance ratio C is 30, it is preferable that the constant value C1 of the luminance ratio "C" in the introduction stage and the constant value C2 of the luminance ratio "C" in the relaxation stage satisfy the conditions C1≦30 and C2≦30, so as not to make uncomfortable on a much larger number observers. Thus, it is necessary that the luminance ratio C1 in the introduction stage satisfies the condition 10<C1≦30, and the luminance ratio C2 in the relaxation stage satisfies the condition 6≦C2≦30.

Still furthermore, since the probability that the observer closing the eyelids does not feel uncomfortable will be 100% when the luminance ratio "C" is 15, it is preferable that the constant value C1 of the luminance ratio "C" in the introduction stage and the constant value C2 of the luminance ratio "C" in the relaxation stage satisfy the conditions C1≦15 and C2≦15, so as not to make uncomfortable on all the observers. Thus, it is necessary that the luminance ratio C1 in the introduction stage satisfies the condition 10<C1≦15, and the luminance ratio C2 in the relaxation stage satisfies the condition 6≦C2≦15.

Third Embodiment

A third embodiment of a lighting system, a lighting controller and a lighting control method in accordance with the present invention is described.

When the observer uses the lighting system or the lighting control method in accordance with the present invention, it is easily supposed that the observer wishes not only to open the eyelids but also to close the eyelids. The third embodiment realizes such the requests.

Figure 23:
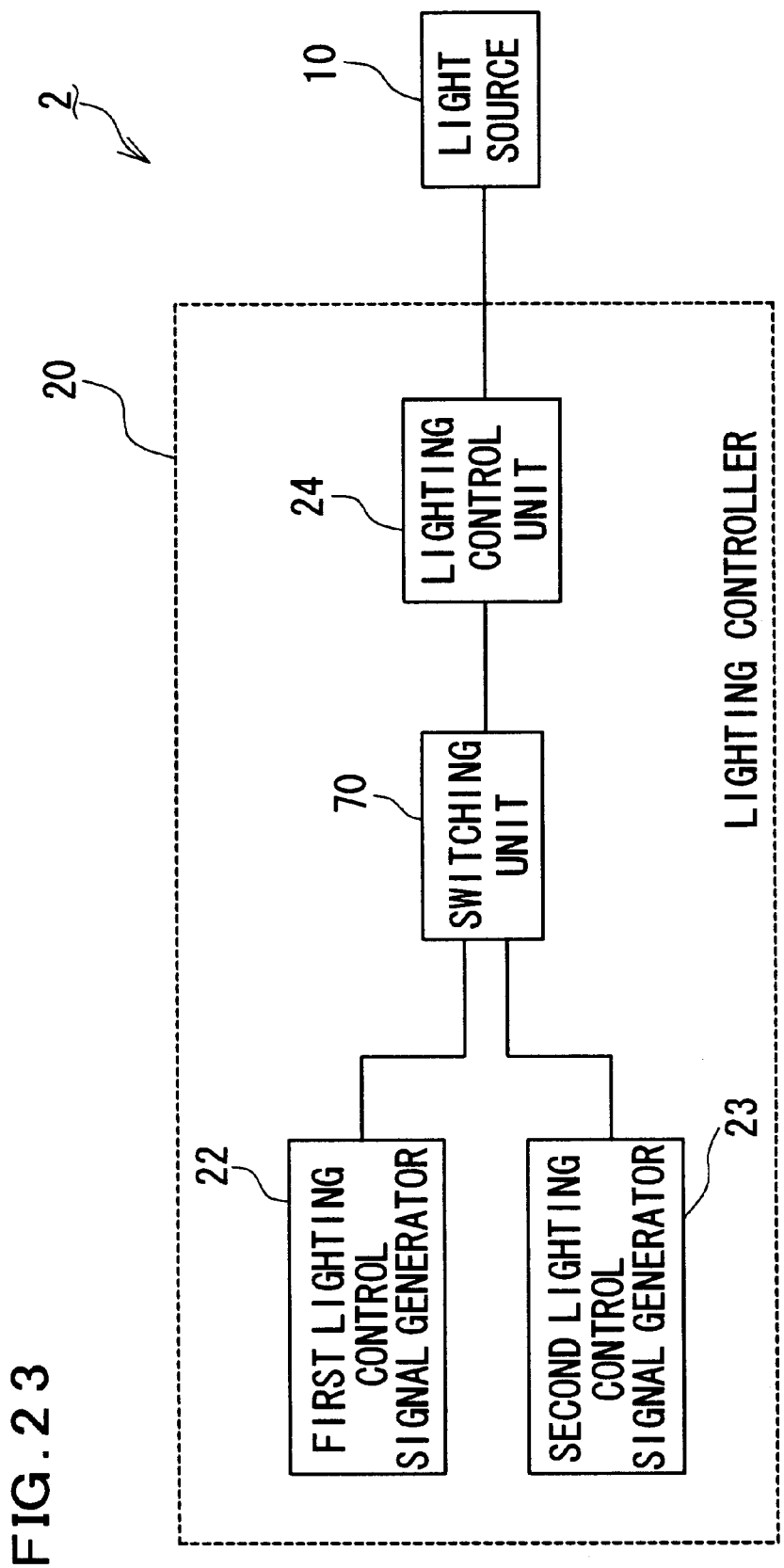
FIG. 23 is a block diagram showing a configuration of a lighting system in accordance with a third embodiment of the present invention.

FIG. 23 shows configuration of a lighting system 2. The lighting system 2 comprises a light source 10 and a lighting controller 20 for controlling light emission of the light source 10 in a manner so that luminance of a light emitting surface of the light source 10 periodically varies.

The lighting controller 20 comprises a first lighting control signal generator 22 for generating a first lighting control signal, a second lighting control signal generator 23 for generating a second lighting control signal, a switching unit 70 for switching alternative of the first lighting control signal generator 22 and the second lighting control signal generator 23 and a lighting control unit 24 for controlling the luminance of the light emitting surface of the light source 10 corresponding to the first or second lighting control signal. The functions of the first lighting control signal generator 22 and the second lighting control signal generator 23 can be realized, for example, by a computer system including a CPU (central processing unit).

The first lighting control signal generator 22 is used for generating the first lighting control signal when the observer observes the variation of the illumination light while he closes the eyelids. The second lighting control signal generator 23 is used for generating the second lighting control signal when the observer observes the variation of the luminance of the light emitting surface while he opens the eyelids. Thus, the luminance ratio $CT1(=L_{MAXT1}/L_{MINT1})$ of the maximum luminance value $L_{MAXT1}$ against the minimum luminance value $L_{MINT1}$ in one period of the variation of the luminance of the light emitting surface controlled by the first lighting control signal is controlled to be larger than the luminance ratio $CT2(L_{MAXT2}/L_{MINT2})$ of the maximum luminance value $L_{MAXT2}$ against the minimum luminance value $L_{MINT2}$ in one period of the variation of the luminance of the light emitting surface controlled by the second lighting control signal.

When the luminance ratio CT1 is controlled by the first lighting control signal generated by the first lighting control signal generator 22, the luminance ratio CT1 satisfies the condition 10<CT1≦100 in the introduction stage and the condition 6≦CT1≦100 in the relaxation stage. It is preferable that the luminance ratio CT1 further satisfies the condition 10<CT1≦50 in the introduction stage and the condition 6≦CT1≦50 in the relaxation stage. It is more preferable that the luminance ratio CT1 still further satisfies the condition 10<CT1≦30 in the introduction stage and the condition 6≦CT1≦30 in the relaxation stage.

The lighting control by the second lighting control signal realizes that the observer can adjust the rhythm of breathing to the variation of the luminance of the light emitting surface so as to be in the state of relaxation while he directly observes the illumination light with opening the eyelids. When the luminance ratio CT2 is controlled by the second lighting control signal generated by the second lighting control signal generator 23, the luminance ratio CT2 satisfies the condition 6≦CT2≦10 in the introduction stage and the condition 3≦CT2≦5 in the relaxation stage. These conditions were disclosed by the inventors in Japanese patent application No. 2000-375315 (which is not published).

The numerical limitation of the luminance ratio CT2 in the introduction stage is described.

The experiments for obtaining the upper limit of the luminance ratio $CT2(=L_{MAX}/L_{MIN})$ at which the observer did not feel uncomfortable were executed under the experimental circumference shown in FIG. 18. The symbol $L_{MAX}$ designates the maximum luminance value and the symbol $L_{MIN}$ designates the maximum luminance value on the light emitting surface 10a of the light source 10 in one period of the variation of the luminance.

Eight observers were requested to reply the upper limit of the luminance ratio CT2 at which they did not feel uncomfortable while the luminance ratio CT2 were varied in a predetermined range. The same experiment was repeated thrice with respect to each observer, and the mean value of the responses obtained in three experiments was accepted as the reply of the observer.

Figure 24:
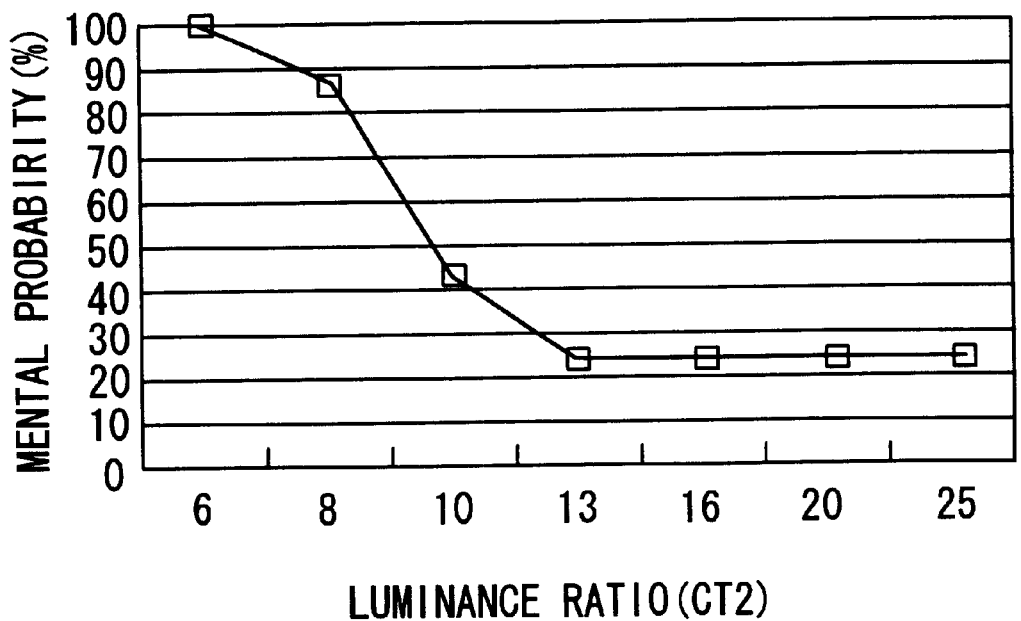
FIG. 24 is a graph showing a relation between the value of the luminance ratio CT2 and the mental probability that the observer did not feel uncomfortable.

FIG. 24 shows the result of experiments. In FIG. 24, the abscissa designates the value of the luminance ratio CT2 and the ordinate designates the mental probability that the observer did not feel uncomfortable. Probabilities that the persons felt not uncomfortable were calculated by multiplying 100 to the number of the observers replied "not uncomfortable" against the total number of the observers. For example, when four persons were replied "not comfortable", the probability was 4/8×100=50%.

As can be seen from FIG. 24, the probability that the observer did not feel uncomfortable (in other words, no one felt uncomfortable) was 100% when the luminance ratio CT2 was 6. While the luminance ratio CT2 had been increasing, the probability that the observer did not feel uncomfortable was monotonously decreased. When the luminance ratio CT2 was equal to or larger than 10, the probability that the observer did not feel uncomfortable became smaller than 50%. Thus, When the luminance ratio CT2 satisfied the condition 6≦CT2≦10, the probability that the observer did not feel uncomfortable became equal to or larger than 50%. It is preferable that the constant value CT2 in the introduction stage satisfies the condition 6≦CT2≦10.

Subsequently, the numerical limitation of the luminance ratio CT2 in the relaxation stage is described.

The experiments for obtaining the upper limit of the luminance ratio CT2(=$L_{MAX}/L_{MIN}$) at which the observer did not feel uncomfortable were executed under the experimental circumference shown in FIG. 18. The experiments, however, were executed under the conditions that the luminance of the light emitting surfaces were reduced than those in the introduction stage, and that the observer 30 could adjust the rhythm of breathing to the variation of the luminance of the light emitting surface while the observer was in semiconscious state.

Eight observers were requested to reply the upper limit of the luminance ratio CT2 at which they did not feel uncomfortable while the luminance ratio CT2 were varied in a predetermined range. The same experiment was repeated thrice with respect to each observer, and the mean value of the responses obtained in three experiments was accepted as the reply of the observer.

Figure 25:
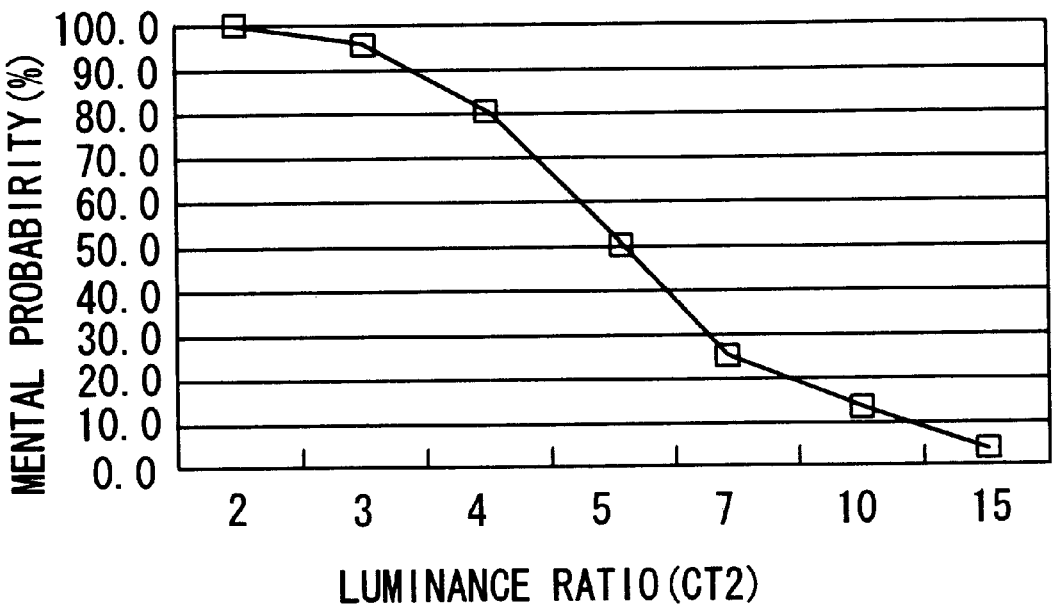
FIG. 25 is a graph showing a relation between the value of the luminance ratio CT2 and the mental probability that the observer did not feel uncomfortable.

FIG. 25 shows the result of experiments. In FIG. 25, the abscissa designates the value of the luminance ratio CT2 and the ordinate designates the mental probability that the observer did not feel uncomfortable.

As can be seen from FIG. 25, while the luminance ratio CT2 had been increasing, the probability that the observer did not feel uncomfortable was monotonously decreased. When the luminance ratio CT2 was larger than 5, the probability that the observer did not feel uncomfortable became smaller than 50%. Thus, when the luminance ratio CT2 satisfied the condition CT2≦5, the probability that the observer did not feel uncomfortable became equal to or larger than 50%. It is preferable that the constant value CT2 in the introduction stage satisfies the condition CT2≦5.

Subsequently, the experiments for obtaining the lower limit of the luminance ratio CT2(=$L_{MAX}/L_{MIN}$) at which the observer 30 could adjust the rhythm of breathing to the variation of the illumination light 50 were executed under the experimental circumference shown in FIG. 18.

Five observers were requested to reply when they felt the luminance of the light emitting surface became the largest. Differences between the times when the observers replied and the time when the luminance of the light emitting surface actually became the largest were measured for obtaining the lower limit of the luminance ratio at which the observer could adjust the rhythm of breathing. The same experiment was repeated five times with respect to each observer, and the mean value of the responses obtained in three experiments was accepted as the reply of the observer.

The operator 60 controlled the luminance ratio "C" of the light source 10, and the observer 30 switched on the switch at a moment when he felt the luminance of the light emitting surface became the largest. The times TS when the observers 30 switched on the switch were recorded. Furthermore, the time TL when the luminance of the light emitting surface takes the largest value was measured, and the differences ΔT=|TS−TL| were calculated.

Hereupon, the meanings of the times TS and the difference ΔT are described. The observer observes the variation of the illumination light and adjusts the rhythm of breathing corresponding to the result of observation. Thus, the time TS showing the time when the observer felt the largest luminance of the light emitting surface is considered substantially the same as the time when he started the swell of breathing. The difference ΔT is considered the delay time between the time when the observer started the swell of breathing and the time when the luminance of the light emitting surface became the largest. When the value of the difference ΔT becomes smaller, the difference ΔT between the time when the observer starts the swell of breathing and the time when the luminance of the light emitting surface becomes the largest also becomes smaller. Thus, it is considered that the rhythm of breathing of the observer is in synchronism with the variation of the illumination light.

Figure 26:
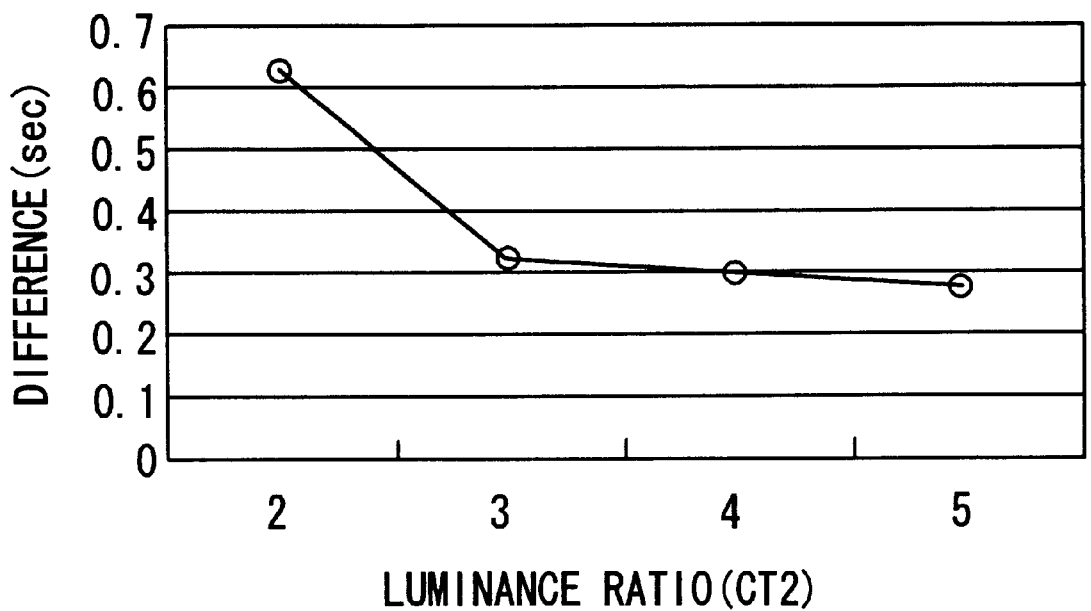
FIG. 26 is a graph showing the difference ΔT which is considered the delay time between a time when as observer started the swell of breathing and a time when the luminance of the light emitting surface became the largest.

FIG. 26 shows the results of experiments. In FIG. 26, the abscissa designates the luminance ratio CT2 of the illumination light, and the ordinate designates the difference ΔT (sec). As can be seen from FIG. 26, the difference ΔT monotonously degreased corresponding to the increase of the luminance ratio CT2. When the luminance ratio CT2 became equal to or larger than 3, the difference ΔT became substantially constant about 0.3. In other words, when the luminance ratio CT2 was equal to or larger than 3, the times when the observer judges the luminance of the light emitting surface became constant. Thus, it is preferable that the luminance ratio of the luminance of the light emitting surface CT2 in the relaxation stage satisfies the condition 3≦CT2.

From the results of experiments shown in FIGS. 25 and 26, it is preferable that the luminance ratio CT2 of the illumination light in the relaxation stage satisfies the condition 3≦CT2≦5.

The relation between the first lighting control signal generator 22 and the second lighting control signal generator 23 is described. The lower limit of the luminance ratio CT1 in the introduction stage which is realized by the first lighting control signal generator 22 is 10, and the lower limit of the luminance ratio CT2 in the introduction stage which is realized by the second lighting control signal generator 23 is 6. It is found that the luminance ratio CT1 is larger about time and a half than the luminance ratio CT2 in the introduction stage. The lower limit of the luminance ratio CT1 in the relaxation stage which is realized by the first lighting control signal generator 22 is 6, and the lower limit of the luminance ratio CT2 in the relaxation stage which is realized by the second lighting control signal generator 23 is 3. It is found that the luminance ratio CT1 is larger twofold than the luminance ratio CT2 in the relaxation stage. Thus, it is necessary to design the first lighting control signal generator 22 and the second lighting control signal generator 23 in a manner so that the luminance ratio CT1 at an optional time "t" for the observer closing the eyelids satisfies to be larger more than half as much again as the luminance ratio CT2 for the observer opening the eyelids.

When the lighting system or the lighting control method has only one set of the light source 10 and the lighting control unit 24, the maximum luminance of light source $L_{CMAX}$ and the minimum luminance of light source $L_{CMIN}$ are restricted.

Figure 27:
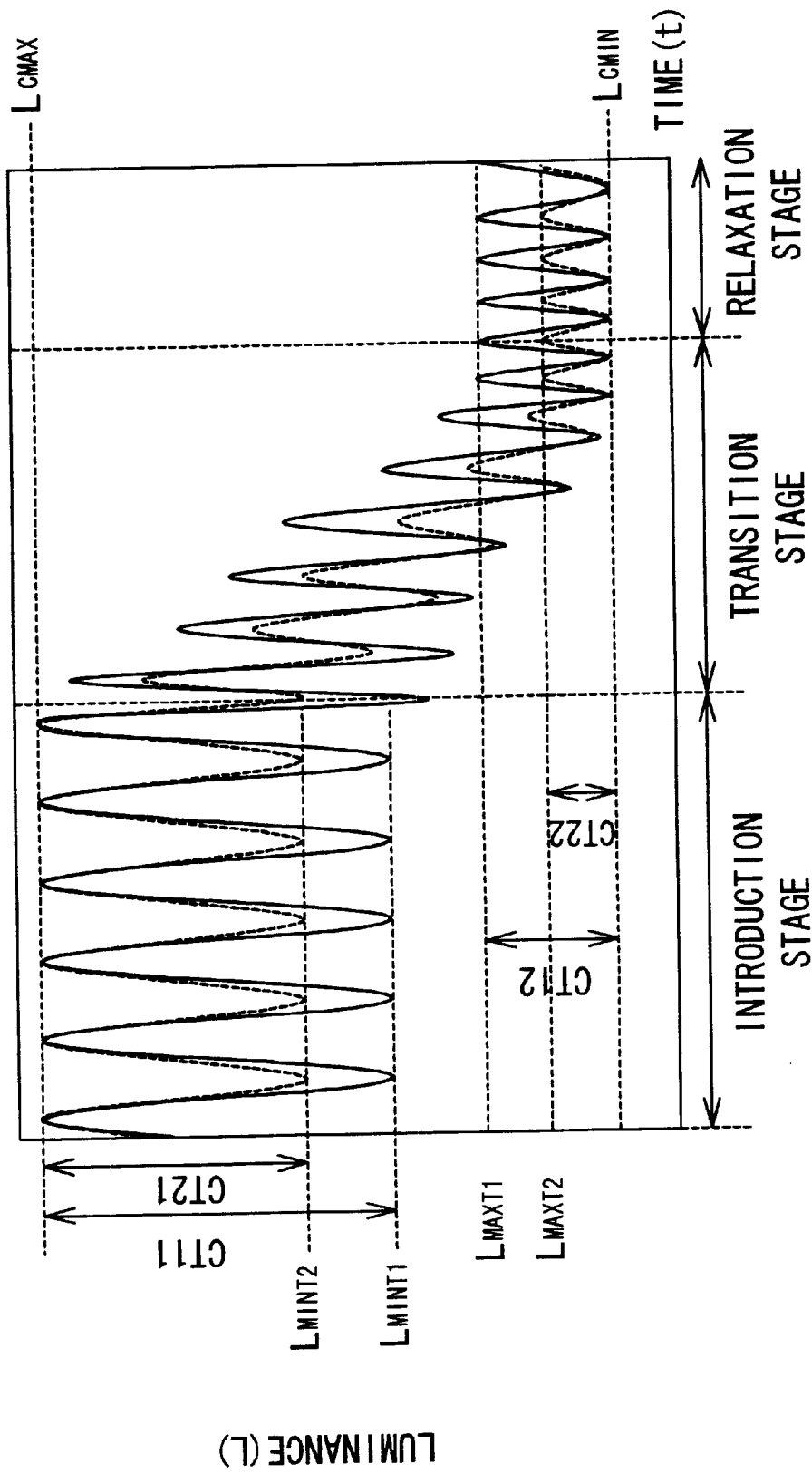
FIG. 27 is a graph showing an example of the variation of the luminance on the light emitting surface of the light source which is controlled by the lighting control method in the third embodiment.

FIG. 27 shows an example of the variation of the luminance on the light emitting surface of the light source 10 which is controlled by the lighting control method in the third embodiment. The light source 10 has the maximum luminance of light source $L_{CMAX}$ and the minimum luminance of light source $L_{CMIN}$.

In FIG. 27, the abscissa designates the time "t", and the ordinate designates the luminance "L" on the light emitting surface of the light source 10. The solid line designates the luminance on the light emitting surface of the light source 10 controlled by the first lighting control signal generated by the first lighting control signal generator 22 corresponding to the lighting control for the observer closing the eyelids. The dotted line designates the luminance on the light emitting surface of the light source 10 controlled by the second lighting control signal generated by the second lighting control signal generator 23 corresponding to the lighting control for the observer opening the eyelids.

In the introduction stage, the light source 10 is controlled by the first lighting control signal generator 22 for taking the maximum luminance value $L_{CMAX}$, the minimum luminance value $L_{MINT1}$, and the luminance ratio $CT11=L_{CMAX}/L_{MINT1}$. Alternatively, the light source 10 is controlled by the second lighting control signal generator 23 for taking the maximum luminance value $L_{CMAX}$, the minimum luminance value $L_{MINT2}$, and the luminance ratio $CT21=L_{CMAX}/L_{MINT2}$.

In the relaxation stage, the light source 10 is controlled by the first lighting control signal generator 22 for taking the maximum luminance value $L_{MAXT1}$, the minimum luminance value $L_{CMIN}$, and the luminance ratio $CT12=L_{MAXT1}/L_{CMIN}$. Alternatively, the light source 10 is controlled by the second lighting control signal generator 23 for taking the maximum luminance value $L_{MAXT2}$, the minimum luminance value $L_{CMIN}$, and the luminance ratio $CT22=L_{MAXT2}/L_{CMIN}$.

As can be seen from FIG. 27, for transiting from the introduction stage to the relaxation stage, the maximum luminance value (for example, $L_{CMAX}$ or $L_{MAXT1}$) on the light emitting surface of the light source 10 for the observer closing the eyelids is equal to or larger than the maximum luminance value (for example, $L_{CMAX}$ or $L_{MAXT2}$) on the light emitting surface of the light source 10 for the observer opening the eyelids. Since the maximum luminance value of light source $L_{CMAX}$ of the light source 10 is restricted by the lighting control unit 24, the luminance ratios CT11 and CT 12 for the observer closing the eyelids must be larger than the luminance ratios CT21 and CT22 for using the maximum luminance value of light source $L_{CMAX}$ in both cases of closing and opening the eyelids. If the luminance ratios CT11 and CT 12 for the observer closing the eyelids were smaller than the luminance ratios CT21 and CT22, the observer cannot adjust the rhythm of breathing.

Furthermore, as can be seen from FIG. 27, for transiting from the introduction stage to the relaxation stage, the minimum luminance value (for example, $L_{MINT1}$ or $L_{CMIN}$) on the light emitting surface of the light source 10 for the observer closing the eyelids is equal to or smaller than the minimum luminance value (for example, $L_{MINT2}$ or $L_{CMIN}$) on the light emitting surface of the light source 10 for the observer opening the eyelids. Since the minimum luminance value of light source $L_{CMIN}$ of the light source 10 is restricted by the lighting control unit 24, the luminance ratios CT11 and CT 12 for the observer closing the eyelids must be larger than the luminance ratios CT21 and CT22 for using the minimum luminance value of light source $L_{CMIN}$ in both cases of closing and opening the eyelids. If the luminance ratios CT11 and CT 12 for the observer closing the eyelids were smaller than the luminance ratios CT21 and CT22, the observer cannot adjust the rhythm of breathing.

A first modification of the lighting system and the lighting control method in the third embodiment is described. As mentioned above, the observer wishes not only to open the eyelids but also to close the eyelids when the observer uses the lighting system or the lighting control method. It, however, is very cumbersome to the observer for switching the switching unit 70 corresponding to the opening and closing the eyelids. The first modification realizes the switching of the switching unit 70 automatically.

Figure 28:
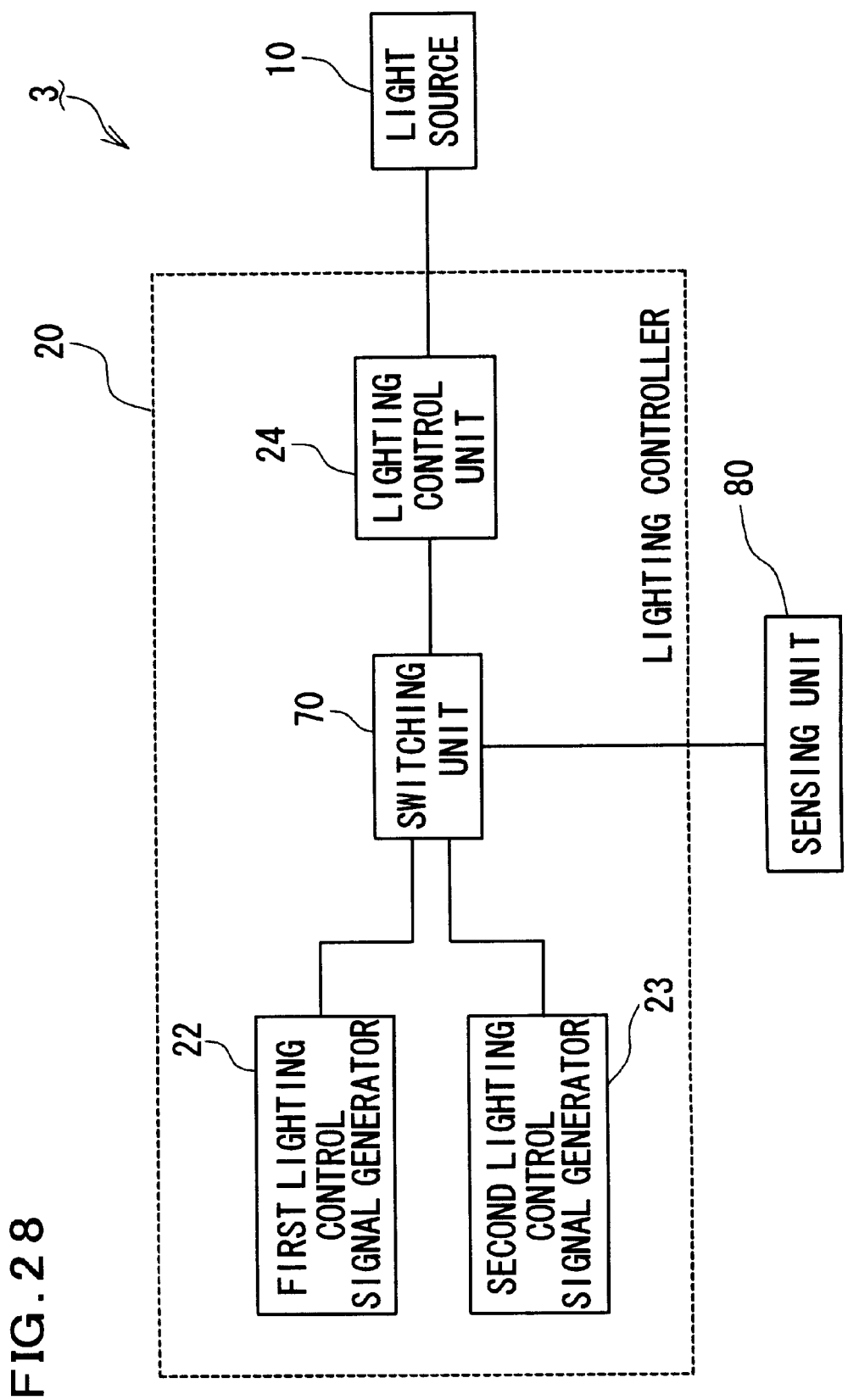
FIG. 28 is a block diagram showing a configuration of a lighting system in accordance with the first modification of the third embodiment.

FIG. 28 shows configuration of a lighting system 3 in accordance with the first modification. The lighting system 3 comprises a sensing unit 80 further to the configuration shown in FIG. 23. The sensing unit 80 senses whether the observer opens the eyelids or not, and controls the switching unit 7 corresponding to the sensing result. The sensing unit 80 has, for example, a CCD camera for taking a picture of face of the observer. The image data obtained by the camera is processed by a computer for judging whether the eyelids of the observer are opened or closed. A control signal corresponding to the result of the judgment is inputted to the switching unit 70 through, for example, a D/A converter.

A second modification of the lighting system and the lighting control method in the third embodiment is described. When the observer uses the lighting system or the lighting control method in accordance with the present invention, it is easily supposed that the observer wishes to adjust the luminance ratio "C" of the maximum luminance value $L_{MAX}$ against the minimum luminance value $L_{MIN}$ in one period of the variation of the luminance in his own way. The second modification realizes such the requests.

Figure 29:
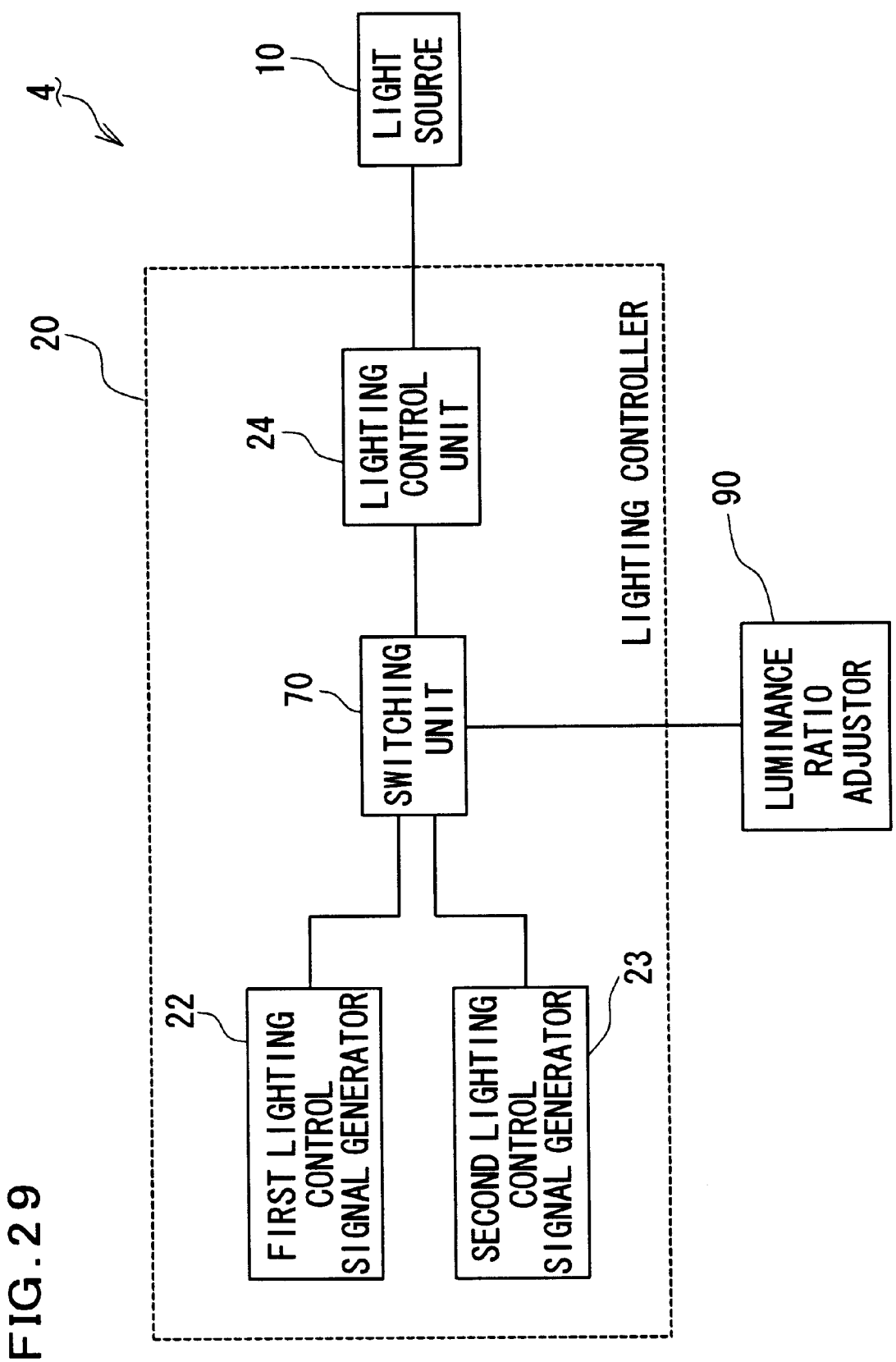
FIG. 29 is a block diagram showing a configuration of a lighting system in accordance with the second modification of the third embodiment.

FIG. 29 shows configuration of a lighting system 4 in accordance with the second modification. The lighting system 4 comprises a luminance ratio adjustor 90 further to the configuration shown in FIG. 23. The luminance ratio adjuster 90 adjusts the first lighting control signal generated by the first lighting control signal generator 22 or the second lighting control signal generated by the second lighting control signal generator 23. The luminance ratio adjuster 90 further has a function that an information used for adjusting one of the first lighting control signal generated by the first lighting control signal generator 22 and the second lighting control signal generated by the second lighting control signal generator 23 transmits to the other of the lighting control signal generators 22 and 23. By such the information, the other lighting control signal, which is not used for varying the luminance of the light emitting surface, is also adjusted. When the observer 30 switches the switching unit 70, for example, from the first lighting control signal generator 22 to the second lighting control signal generator 23, the luminance ratio "C" of the light source 10 will be automatically the same manner before and after the switching.

When the luminance ratio before the adjustment at an optional time "t" is designated by a symbol CTF, and the luminance ratio after the adjustment is designated by a symbol CTL, the information transmitted to the first lighting control signal generator 22 or the second lighting control signal generator 23 which is not used for varying the luminance of the light source 10 corresponds to a signal CTL/CTF. For example, the second lighting control signal generated by the second lighting control signal generator 23 is adjusted by the luminance ratio adjuster 90 in the introduction stage. When the luminance ratio CTF2 before the adjustment is 6, and the luminance ratio CTL2 after the adjustment is 8, the ratio CTL2/CTF2=8/6=1.33. Thus, the value of the information becomes 1.33. On the other hand, the luminance ratio CTF1 before the adjustment, which is controlled by the first lighting control signal generator 22, is 10, the luminance ratio CTL1 after the adjustment will be adjusted to 13.3 by multiplying the value of the information 1.33 to the luminance value 10(10×1.33=13.3). By such the function of the luminance ratio adjuster 90, the luminance ratio "C" of the light source 10 not only by the first lighting control signal generator 22 but also by the second lighting signal generator 23 will be the same manner by adjusting only one of the first lighting control signal generated by the first lighting control signal generator 22 and the second lighting control signal generated by the second lighting control signal generator 23.

Fourth Embodiment

A fourth embodiment of a lighting system, a lighting controller and a lighting control method in accordance with the present invention is described. Heard wares of the lighting system and the lighting controller in the second embodiment are substantially the same as those illustrated in FIGS. 1 and 2 in the first embodiment, so that the description of them is omitted. In FIG. 2, the observer 30 sits on the chair for observing the illumination light 50 emitted from the lighting system 1. In the fourth embodiment, it is preferable that the observer lies on a bed (not shown).

Figure 30:
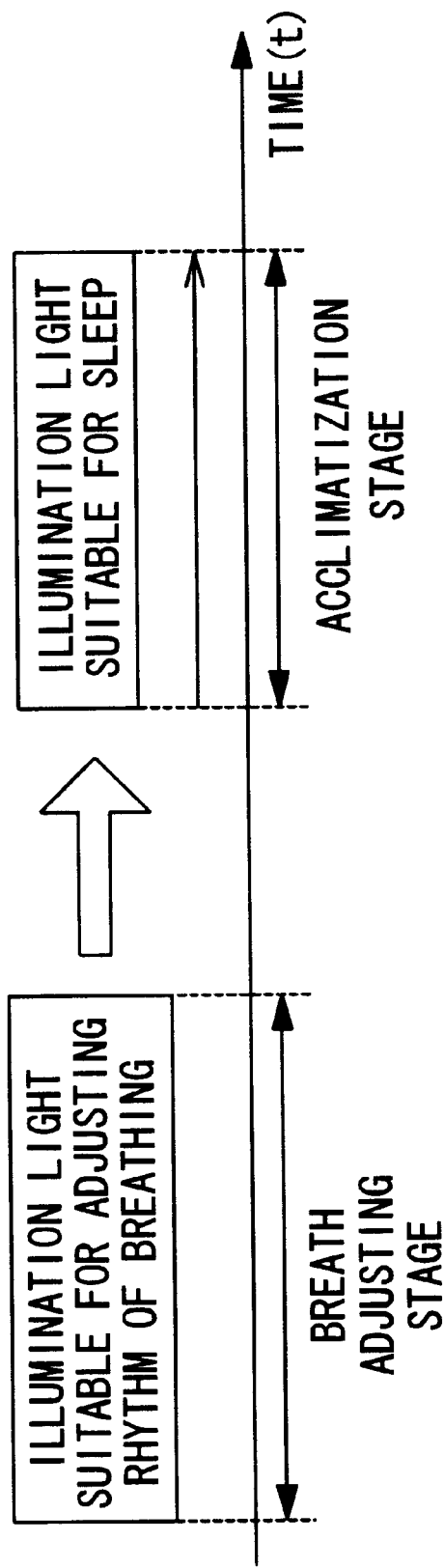
FIG. 30 is a schematic drawing showing a principle of lighting control in the fourth embodiment.

FIG. 30 schematically shows a principle of lighting control in the fourth embodiment. In the fourth embodiment, a lighting term is divided into at least a breath adjusting stage and an acclimatization stage.

In the breath adjusting stage, the luminance "L" on the light emitting surface of the light source 10 is controlled in a manner so that the illumination light 50 is suitable for adjusting the rhythm of breathing to the observer 30 closing the eyelids.

On the other hand, in the acclimatization stage, the luminance "L" on the light emitting surface of the light source 10 is controlled in a manner so that the illumination light 50 is suitable for falling the observer 30 asleep. When the observer 30 is illuminated by the same illumination light in a long time, the illumination light will not be suitable for falling asleep by dark adaptation of the human visual characteristics. Thus, the illumination light is gradually varied corresponding to the dark adaptation in the acclimatization stage for lighting the illumination light suitable for falling asleep.

By the lighting system and the lighting control method in the fourth embodiment, the observer 30 closing the eyelids can fall asleep in the acclimatization stage after adjusting the rhythm of breathing to the variation of the illumination light 50 in the breath adjusting stage.

The acclimatization stage is provided just after the breath adjusting stage. It, however, is preferable to provide the transition stage between the breath adjusting stage and the acclimatization stage. In the transition stage, the luminance on the light emitting surface of the light source 10 is controlled gradually transit from the illumination light suitable for adjusting the rhythm of breathing to the illumination light suitable for falling asleep.

As mentioned above, the judgment whether the illumination light 50 is suitable for adjusting the rhythm of breathing or not is based on psychological effect of the observer 30, so that it is shown by the probability. In this embodiment varying the luminance of the light emitting surface periodically, when a number of observers equal to or larger than 50% of the total number of the observers reply that an illumination light is suitable for adjusting the rhythm of breathing, the illumination light is defined suitable for adjusting the rhythm of breathing.

Similarly, when a number of observers equal to re larger than 50% of the total number of the observers reply that an illumination light is suitable for falling asleep, the illumination light is defined suitable for falling asleep.

Subsequently, the control of the luminance ratio in the fourth embodiment is described with the description of the human visual perception characteristics.

As can be seen from FIG. 3, when the human visual perception is stimulated by the light, the stimulation will be transmitted to the brain through the nerve. The intensity of the stimulation transmitted to the brain is not in proportion to the intensity of the light (luminance) but in proportion to the value of the logarithm of the intensity of the light.

Figure 31:
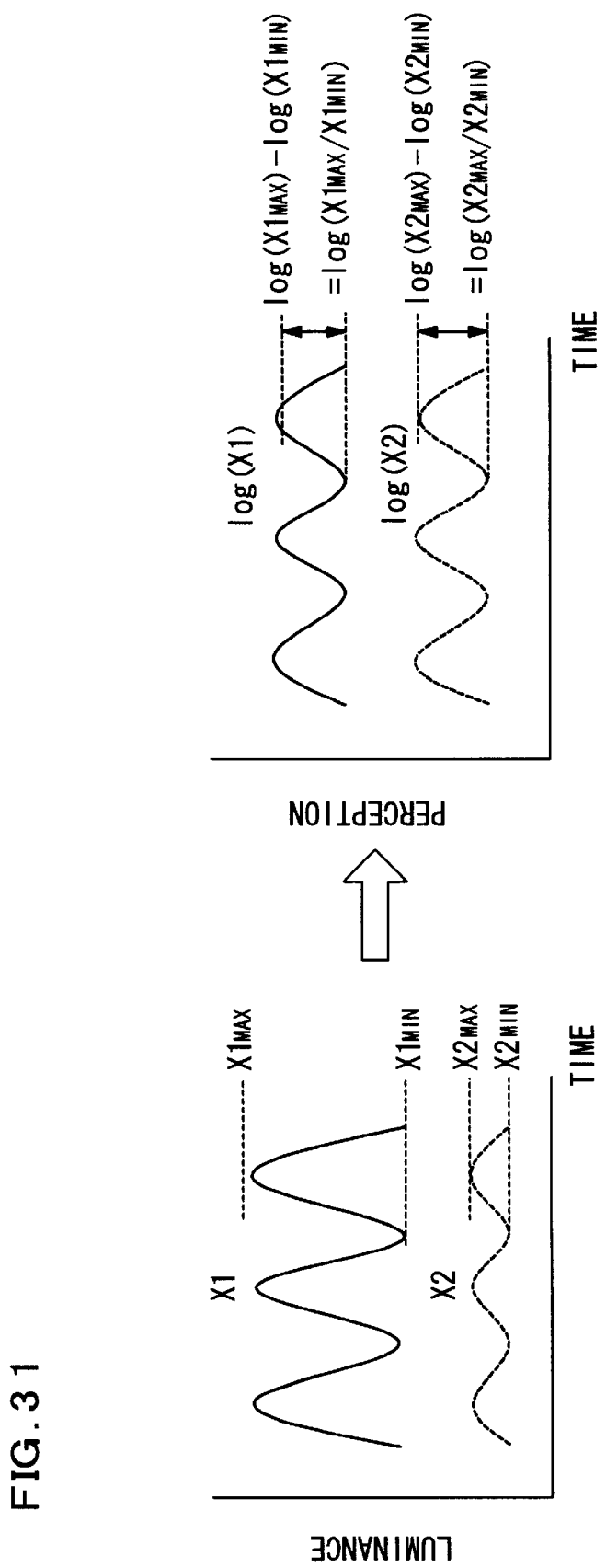
FIG. 31 is a schematic drawing showing processes of human visual perception of two illumination lights X1 and X2 which are periodically varied.

FIG. 31 shows the processes of the perception when the observer observes two illumination lights X1 and X2 which are periodically varied. Since the perception quantities are in proportion to the logarithm of the physical values, the amplitude of the periodic variation is decided by the maximum luminance value and the minimum luminance value in one period of the variation. When the ratio of the maximum luminance value against the minimum luminance value of the illumination light X1 is the same as that of the illumination light X2, both of the illumination lights X1 and X2 are perceived as the illumination lights having the same amplitude. Thus, it is necessary to consider the amplitude of the variation of the illumination light by the ratio of the maximum luminance value against the minimum luminance value instead of the difference between the maximum luminance value and the minimum luminance value.

The above-mentioned description relates to the observation when the observer 30 observes the illumination light 50 while he opens the eyes. The same, however, goes for the observation when the observer 30 observes the illumination light 50 while he closes the eyelids. When the observer closes the eyelids, the eyelids serve as filters for reducing the quantity of the light passing through the eyelids, so that the quantity of the illumination light passing through the eyelids is in proportion to the illuminance on the eyelids. Since the illuminance is in proportion to the luminance with respect to the same light source. Thus, the illuminance ratio on the eyelids coincides with the luminance ratio of the light source. The amplitude of the variation of the illumination light when the observer closes the eyelids can be considered as the luminance ratio of the light source.

When the amplitude of the variation of the illumination light perceived by the observer is larger, in other words, when the luminance ratio is larger, the illumination light becomes the burden for visual perception so as to interfere with sleep. It, however, is easy to perceive the periodic variation of the illumination light, so that the observer can adjust the rhythm of breathing to the variation of the illumination light. On the contrary, when the amplitude of the variation of the illumination light perceived by the observer is smaller, in other words, when the luminance ratio is smaller, it is difficult to adjust the rhythm of breathing to the variation of the illumination light, but the observer can easily fall asleep. Thus, it is important to control the luminance ratio of the light source properly for providing the illumination light suitable to the observer closing the eyelids for adjusting the rhythm of breathing in the breath adjusting stage, and to provide the illumination light suitable for falling asleep in the acclimatization stage.

In the lighting control in the fourth embodiment, in the breath adjusting stage, the luminance ratio $C4(=L_{MAX4}/L_{MIN4})$ of the maximum luminance value $L_{MAX4}$ against the minimum luminance value $L_{MIN4}$ in one period of the periodic variation of the luminance on the light emitting surface of the light source 10 is controlled to be substantially constant. In the acclimatization stage, the luminance ratio $C5(=L_{MAX5}/L_{MIN5})$ of the maximum luminance value $L_{MAX5}$ against the minimum luminance value $L_{MIN5}$ in one period of the periodic variation of the luminance on the light emitting surface of the light source 10 is controlled to be substantially constant which is smaller than the constant value of the luminance ratio C4. In this description, the "substantially constant" includes not only the case that the value of the luminance ratio C4 or C5 perfectly coincides with a predetermined constant value, but also the case that the value luminance ratio C4 or C5 is different by predetermined error factor from a predetermined constant value. When the transition stage is provided between the breath adjusting stage and the acclimatization stage, the luminance ratio $C6(=L_{MAX6}/L_{MIN6})$ of the maximum luminance value $L_{MAX6}$ against the minimum luminance value $L_{MIN6}$ in one period of the periodic variation of the luminance on the light emitting surface of the light source 10 is gradually decreases from the value of the luminance ratio C4 to the value of the luminance ratio C5.

Figure 32:
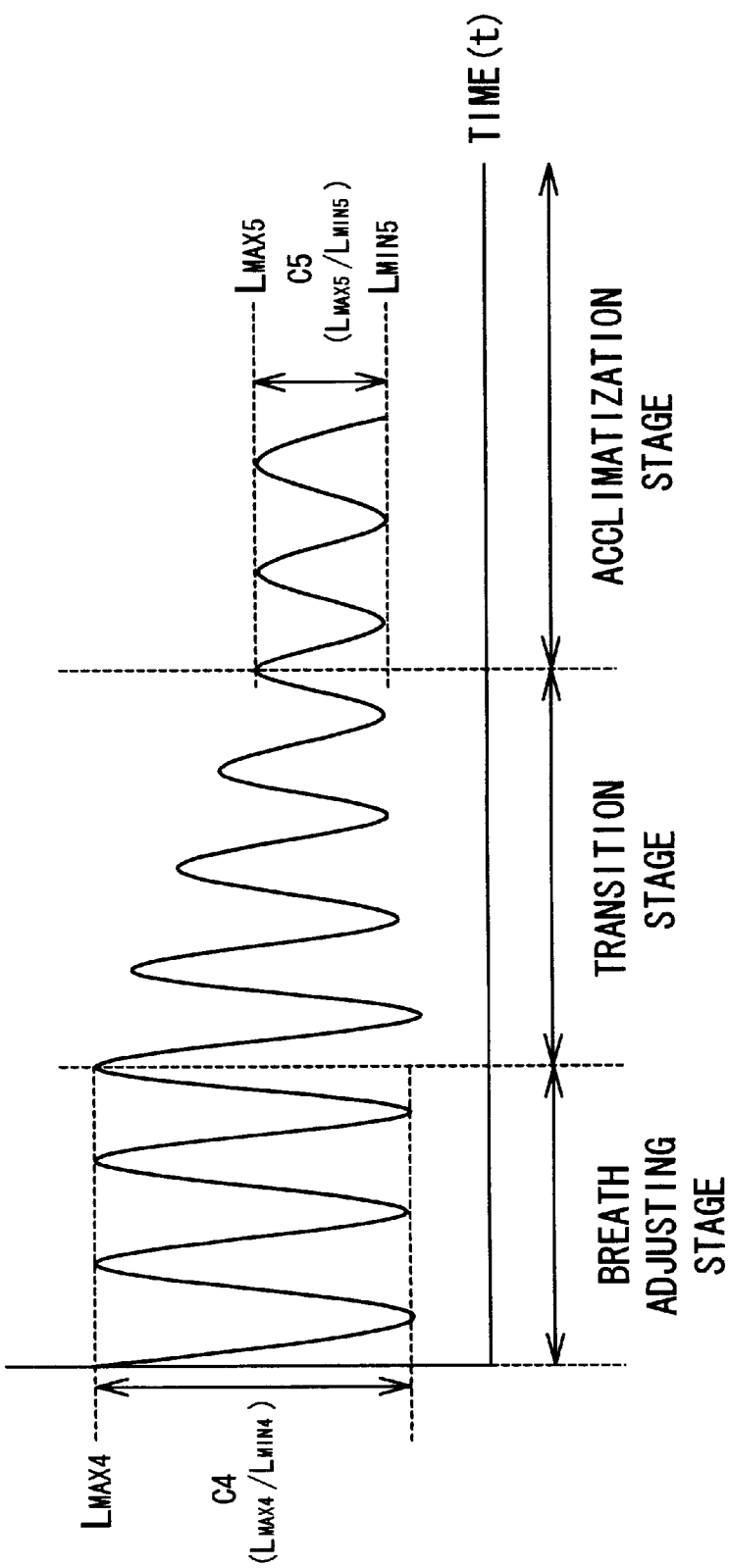
FIG. 32 is a graph showing an example of lighting control of luminance ratio in the fourth embodiment.

FIG. 32 shows an example of the control of the luminance ratio. In FIG. 32, the abscissa designates the time "t" and the ordinate designates the luminance of the light source. In this example, the luminance values $L_{MAX4}$, $L_{MIN4}$, $L_{MAX5}$ and $L_{MIN5}$ are constant. The luminance values, however, are not restricted to the constant values. It will be described below, the luminance values $L_{MAX5}$ and $L_{MIN5}$ have terms varied as time passes. Similarly, the luminance values $L_{MAX4}$ and $L_{MIN4}$ can be varied, under the condition that the luminance ratios C4 and C5 are constant.

In the fourth embodiment, the luminance ratio C4 and C5 are decided corresponding to the eyelid closing state for realizing the illumination light suitable for adjusting the rhythm of breathing to the observer 30 closing the eyelids and for realizing the illumination light suitable for falling asleep. The numerical limitations of the luminance values C4 and C5 are obtained substantially the same method in the above-mentioned second embodiment.

The luminance ratio C4 in the introduction stage satisfies the condition $10<C4\leq100$, and the luminance ratio C5 in the relaxation stage satisfies the condition $6\leq C5\leq100$.

Preferably, the luminance ratio C4 in the introduction stage satisfies the condition $10<C4\leq50$, and the luminance ratio C5 in the relaxation stage satisfies the condition $6\leq C5\leq50$.

More preferably, the luminance ratio C4 in the introduction stage satisfies the condition $10<C4\leq30$, and the luminance ratio C5 in the relaxation stage satisfies the condition $6\leq C5\leq30$.

Still more preferably, the luminance ratio C4 in the introduction stage satisfies the condition $10<C4\leq15$, and the luminance ratio C5 in the relaxation stage satisfies the condition $6\leq C5\leq15$.

Subsequently, the control of the maximum luminance in the fourth embodiment is described with the dark adaptation of human visual perception.

Figure 33:
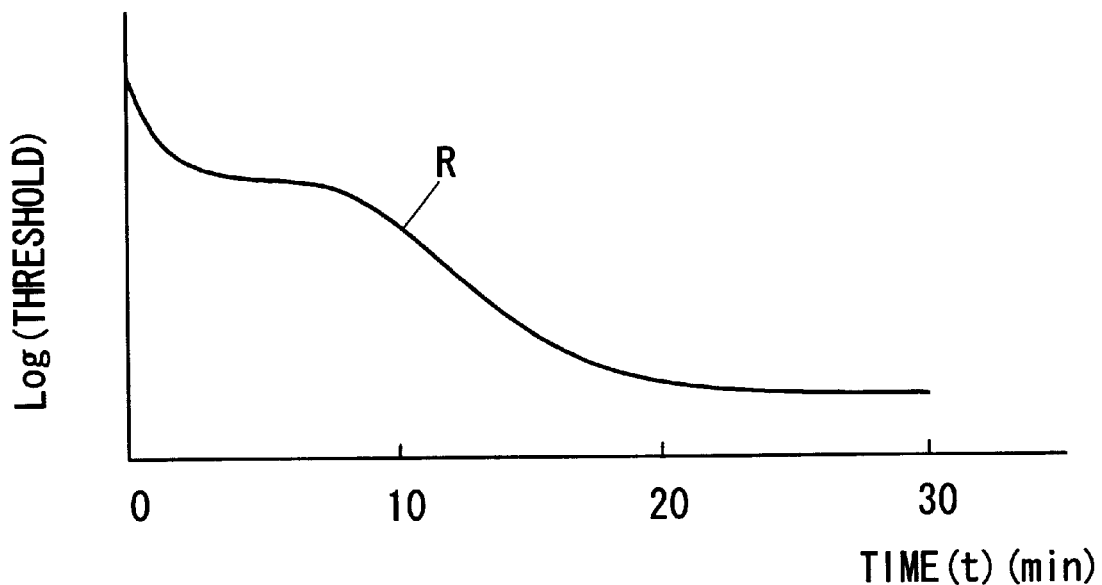
FIG. 33 is a graph showing an example of a typical dark adaptation curve "R"

Generally, the visual sensitivity due to the dark adaptation is shown by a dark adaptation curve. FIG. 33 shows an example of the dark adaptation curve "R". The human body cannot perceive the intensity of the light smaller than a predetermined lower limit value. The lower limit value is called "threshold". In FIG. 33, the abscissa designates the time passed from the start of the acclimatization, and the ordinate is the logarithmic scale designating the threshold. The lower the threshold value becomes, the higher the visual sensitivity increases. Thus, when the luminance of the light emitting surface is varied relatively corresponding to the same shape of the dark adaptation curve "R" of the observer, the observer perceives that the luminance of the light emitting surface has been constant. When the luminance of the light emitting surface is higher than the threshold, the same goes for the observer who closes his eyelids. As can be seen from FIG. 33, the dark adaptation suddenly proceeds in several minutes from the start of the dark adaptation. After taking a short break, the dark adaptation proceeds to 15 minutes to 30 minutes.

The dark adaptation curve "R" will be different to the same observer corresponding to the luminance of the light emitting surface which he observes. Furthermore, the dark adaptation curve "R" will be different corresponding to the time period while the observer is illuminated by the illumination light before the start of the dark adaptation. The dark adaptation, however, proceeds while at least 15 minutes to 30 minutes at the maximum has passed. Furthermore, when the observer acclimatizes a relatively low luminance, the visual sensitivity will increase to a value from a tenfold to a hundredfold higher, after the sudden proceeding.

In the fourth embodiment, the maximum luminance of the light emitting surface is gradually reduced corresponding to the dark adaptation curve "R" in the acclimatization stage so as not to make the observer feel dazzling. Since the dark adaptation curve "R" cannot be fixed uniquely, the dark adaptation curve is defined as the following.

Figure 34:
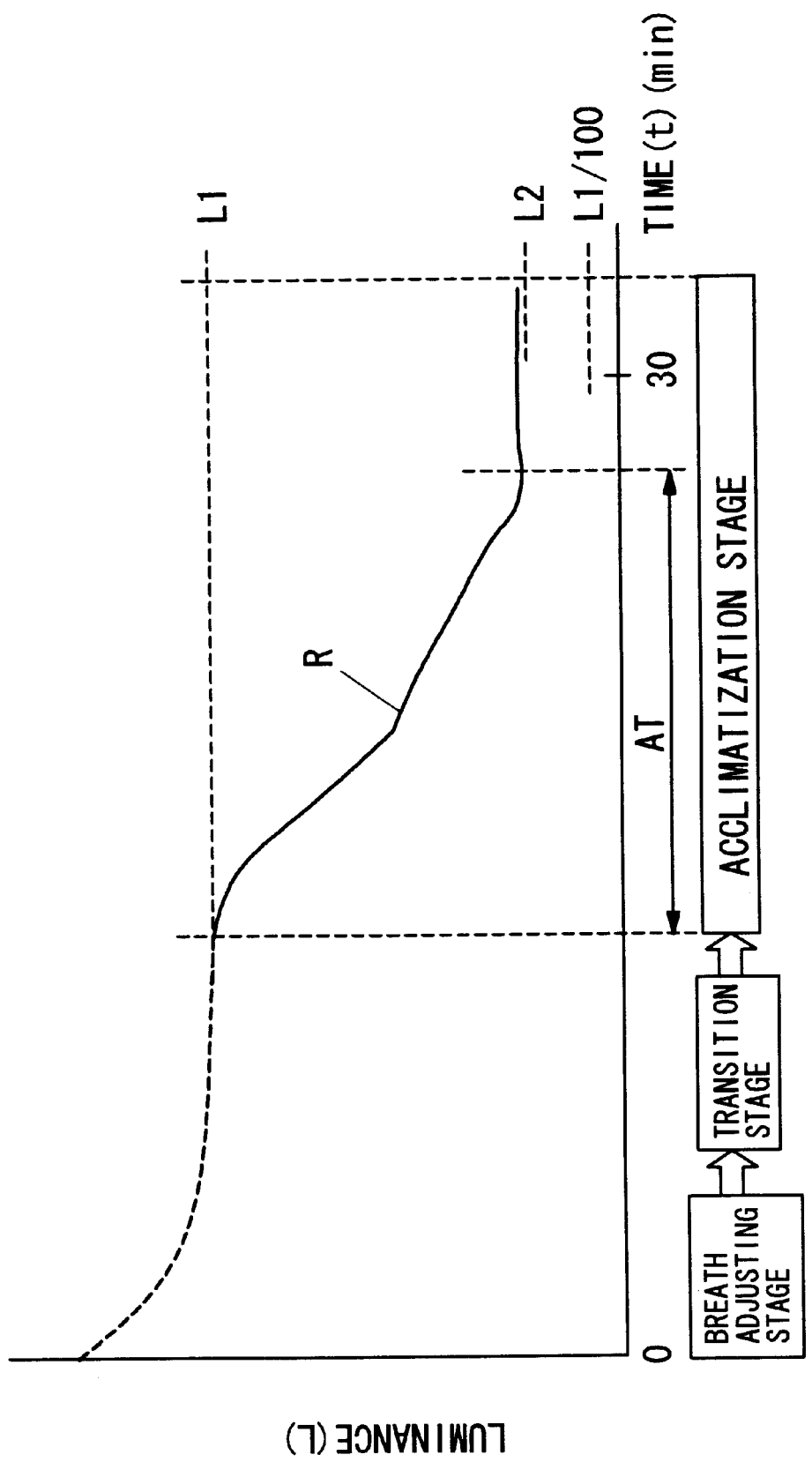
FIG. 34 is a graph showing an example of a dark adaptation curve "R" defined in the fourth embodiment.

In the fourth embodiment, the acclimatization stage in which the maximum luminance value of the illumination light is varied corresponding to the dark adaptation curve "R" is provided after the breath adjusting stage and the transition stage. It is regarded that the first sudden proceeding of the dark adaptation in the acclimatization stage has been completed. The increase of the visual sensitivity after the sudden proceeding of the dark adaptation will be a hundredfold at the maximum. The dark adaptation proceeds at most 30 minutes including the first sudden proceeding. After the proceeding of the dark adaptation, the visual sensitivity will become substantially constant. Accordingly, the dark adaptation curve "R" in the fourth embodiment is defined as a curve that the luminance "L" is monotonously decreased from an initial luminance value L1 at the start of the dark adaptation as time passes, and becomes a constant luminance value L2 which is smaller than the initial luminance value L1 and larger than a value of L1/100. The term "monotonously decreased" means that the luminance value continuously decreases as time passes or takes a constant value. Since the dark adaptation proceeds about 30 minutes at the maximum, the time when the dark adaptation curve "R" takes the luminance value L2 is before passing 30 minutes from the start of the dark adaptation. FIG. 34 shows an example of the dark adaptation curve "R" defined in this embodiment. The dark adaptation curve "R" illustrated in FIG. 34 does not necessarily show the visual sensitivity of the observer precisely. It, however, is preferable to vary the maximum luminance value of the illumination light corresponding to the dark adaptation curve shown in FIG. 34 so as to reduce the risk that the illumination light be felt dazzling by the observer in comparison with the case that the maximum luminance of the light emitting surface is not varied. The observer can easily be fallen asleep by using the illumination light varying corresponding to the dark adaptation curve "R".

When the maximum luminance value of the illumination light is suddenly reduced than the increasing of the actual visual sensitivity, the luminance of the light emitting surface will be smaller than the threshold which can be perceived by the observer closing the eyelids. There is a possibility that a part of or all of the illumination light cannot be perceived by the observer. Since the visual sensitivity increases at least about tenfold, it is preferable that the luminance value L2 is equal to or larger than L1/10.

Figure 35:
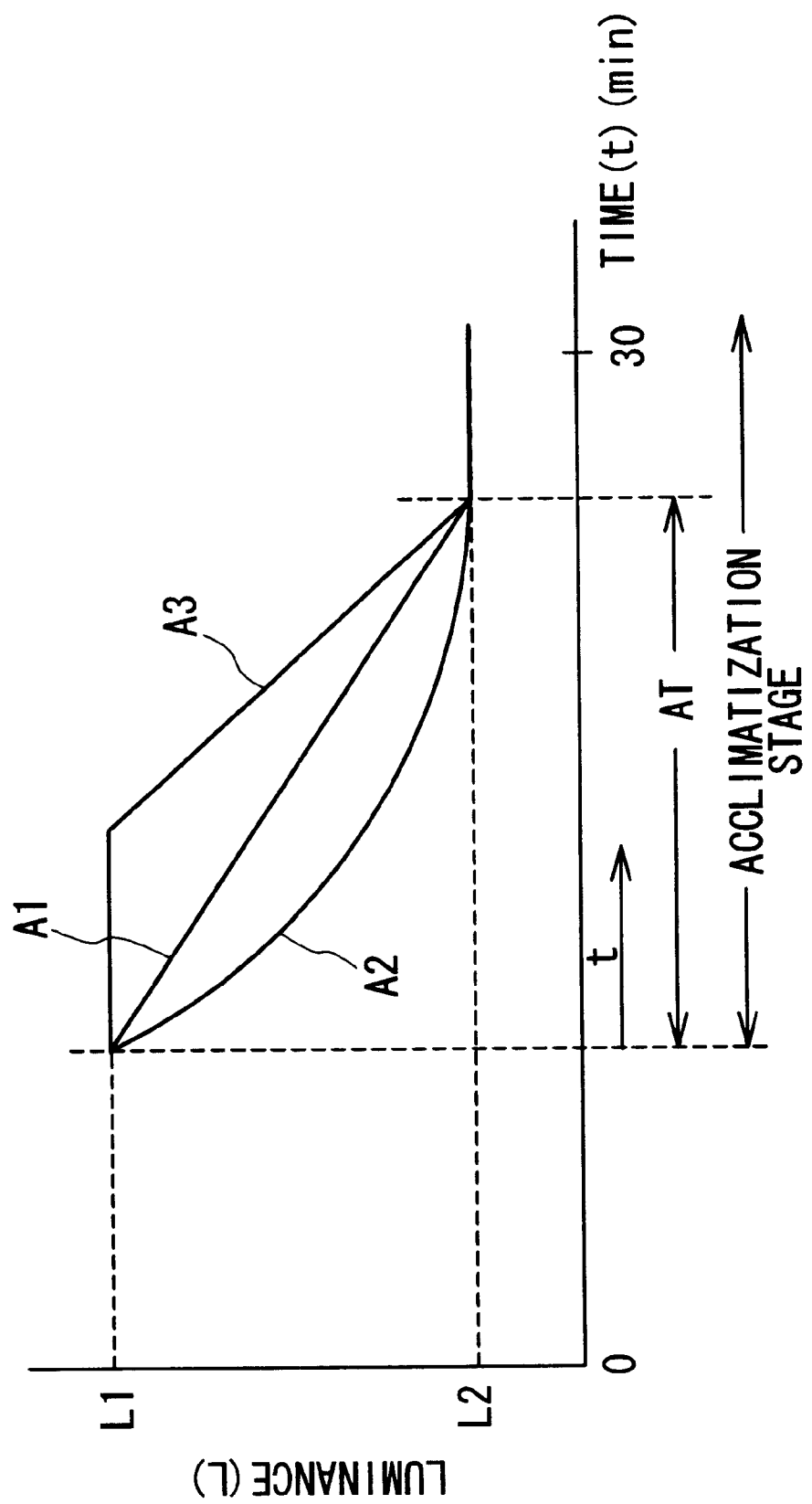
FIG. 35 is a graph showing examples of modified dark adaptation curves A1, A2 and A3 which can be used as the dark adaptation curve in the fourth embodiment.

FIG. 35 shows examples of modified dark adaptation curves A1, A2 and A3 which can be used in the fourth embodiment. As can be seen from FIG. 34, the form of the dark adaptation curve "R" from the point designating the luminance value L1 to the point designating the luminance value L2 is monotonously decreased. Thus, it is possible to bind the point designating the luminance value L1 and the point designating the luminance value L2 by a straight line, as shown by the curve A1 in FIG. 35. Since the luminance of the light emitting surface is perceived as the logarithm of the luminance of the light emitting surface, when the luminance of the light emitting surface is decreased corresponding to the exponential curve, the observer perceives as if the maximum luminance value of the illumination light were reduced at a constant rate. Thus, it is possible to bind the point designating the luminance value L1 and the point designating the luminance value L2 by an exponential curve, as shown by the curve A2. It is possible to emulate the dark adaptation curve shown in FIG. 34 by straight lines, as shown by the curve A3 in which the maximum luminance value takes a constant value in a predetermined term from 1 minute to 5 minutes and monotonously reduced corresponding to the straight line. It is further possible to reduce the maximum luminance value corresponding to an exponential curve instead of the straight line.

In FIG. 35, when the time period from the start of the acclimatization stage is designated by a symbol "t" (min), and the term from the time when the luminance takes the value L1 to the time when the luminance takes the value L2 is designated by a symbol AT, the curve A2 from the point designating L1 to the point designating L2 is shown by an equation $L = L1 \times (L2/L1)^{t/AT}$. When a dark adaptation curve taking a luminance value included in a region of ±10% of from the luminance value of the curve A2 in a part of or in all of the term, the variation of the illumination light varied corresponding to the dark adaptation curve can be perceived substantially the same as the variation corresponding to the curve A2. Thus, the dark adaptation curve can be used in this embodiment preferably.

Figure 36:
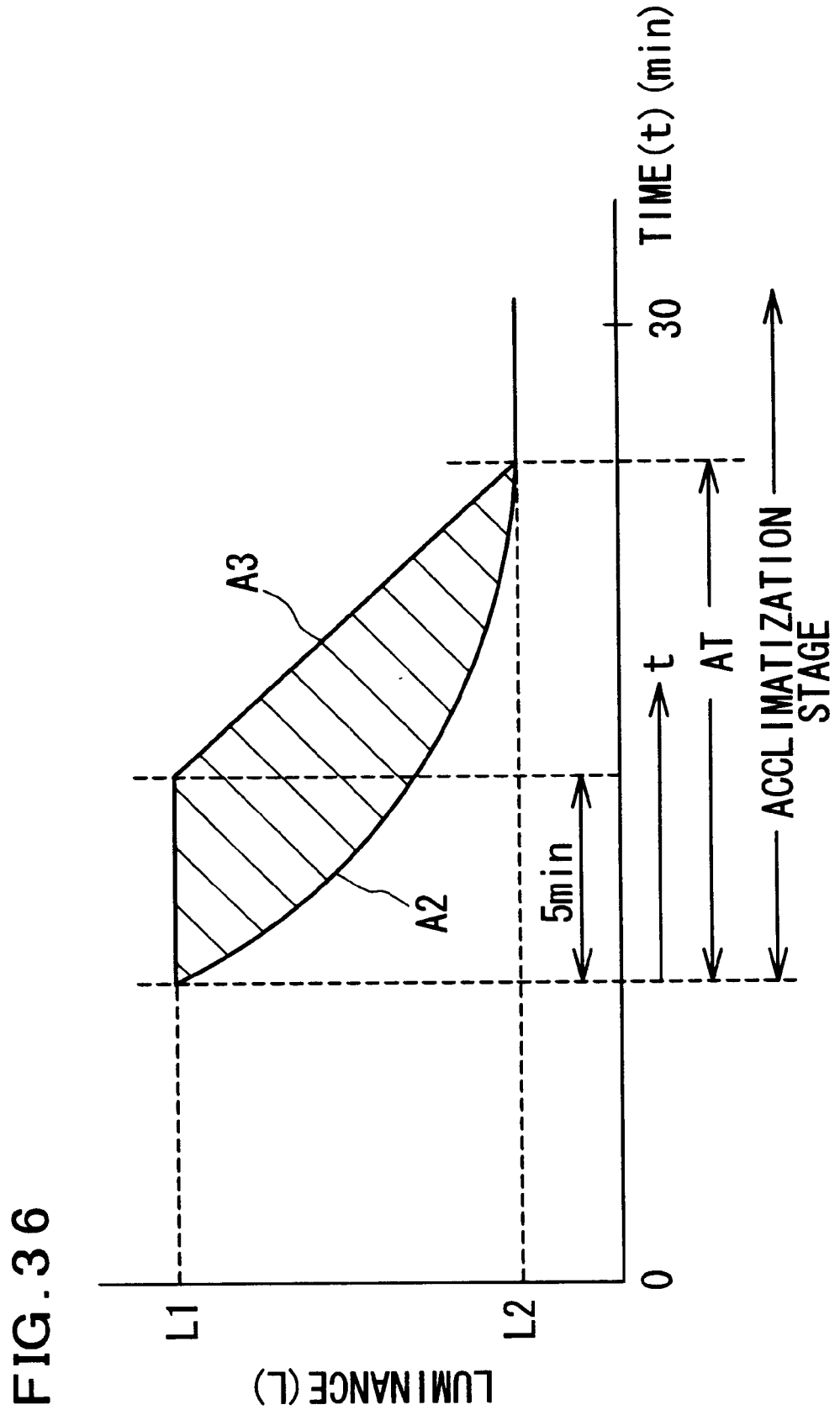
FIG. 36 is a graph showing a region enclosed by the curves A2 and A3 by hatching.

Furthermore, when a luminance of an illumination light is varied corresponding to a dark adaptation curve included in a region enclosed by the curves A2 and A3, the variation of the luminance of the light emitting surface can have few difference from the variation of the luminance of the light emitting surface corresponding to the curve A1, A2 or A3. FIG. 36 shows the region enclosed by the curves A2 and A3 which takes a constant value in 5 minutes by hatching. When the maximum luminance value $L_{MAX}$ of the illumination light is varied corresponding to a curve passing in the hatched region in FIG. 34, the effect of this embodiment can be obtained.

In the hatched region in FIG. 36, the luminance value "L" on a curve passing in the hatched region is shown by the following inequalities:
in the region $0 \leq t \leq 5$,
$L1 \times (L2/L1)^{t/AT} \leq L \leq L1$; and
in the region $5 \leq t \leq AT$,
$L1 \times (L2/L1)^{t/AT} \leq L \leq L1 - (L1-L2) \times (t-5)/(AT-5)$ Subsequently, an example of the lighting control method using the control of the luminance ratio and the luminance in the fourth embodiment is shown in FIG. 37. The luminance ratio taking a constant value C1 in the breath adjusting stage is gradually reduced to the value C5 smaller than C4 in the transition stage. In the acclimatization stage, the maximum luminance value $L_{MAX5}$ is varied corresponding to the dark adaptation curve "R", while the luminance ratio C5 is maintained to be constant. As mentioned above, the luminance ratio C4 satisfies the condition $10 < C4 \leq 100$, and the luminance ratio C5 satisfies the condition $6 < C5 \leq 100$.

Since the dark adaptation proceeds in the breath adjusting stage and the transition stage, it is preferable that the maximum luminance value $L_{MAX}$ is decreased before the acclimatization stage. In an example shown in FIG. 37, the maximum luminance value $L_{MAX}$ is decreased in the transition stage. For decreasing the maximum luminance value $L_{MAX}$ in the transition stage, it is possible to decrease the maximum luminance value corresponding to a straight line or an exponential curve similar to the dark adaptation curve. Instead of the straight line or the exponential curve, a quadratic function or a tertiary function can be used. Furthermore, it is possible to decrease the maximum luminance value not only in the transition stage but also in the breath adjusting stage. In this embodiment, the maximum luminance value is not necessarily reduced in the acclimatization stage.

Figure 38A:
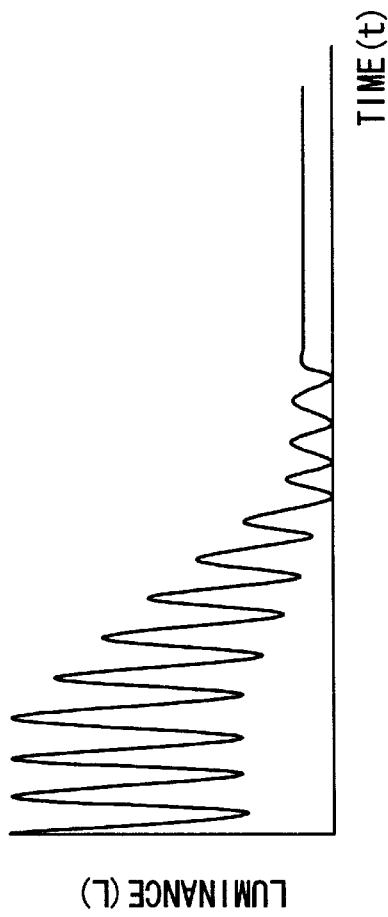
FIGS. 38A and 38B are graphs showing example of variations of illumination lights using fixed illumination light in the acclimatization stage.
Figure 38B:
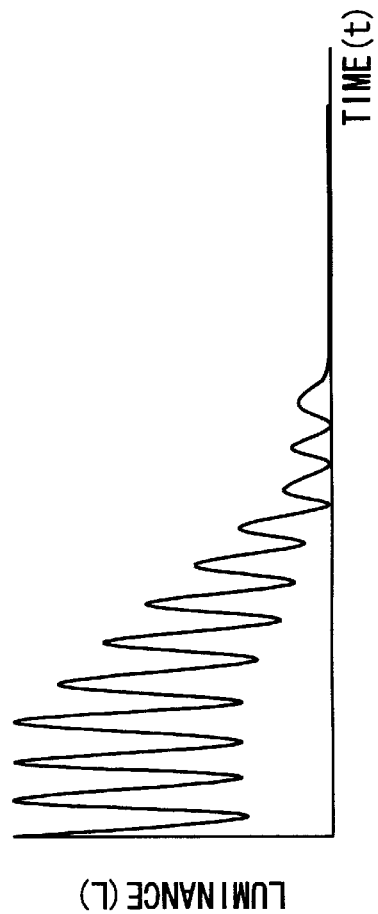

With consideration of actual asleep, after adjusting the rhythm of breathing for falling the state of relaxation in a predetermined term, it is possible to illuminate by a fixed illumination light. The term "fixed illumination light" includes the case that the luminance of the light emitting surface is "0", that is the extinction. FIGS. 38A and 38B show the examples that the fixed illumination light is used in the acclimatization stage. And especially, FIG. 38B shows that the illumination light is switched off in the acclimatization stage.

Experiments for confirming the effect of the lighting system and the lighting control method in the fourth embodiment were executed. In the description, the illuminance on the eyes of the observer is used for the illumination light. Variation of the illumination on the eyes can be achieved by controlling the luminance "L" on the light emitting surface of the light source relatively to be the same.

Experiments, which were similar to the above-mentioned experiments with respect to the uncomfortableness of the luminance ratio, were executed by varying the length of the acclimatization stage under a low luminance condition. Seven observers are requested to reply whether the luminance of the light emitting surface is uncomfortable or not. The illuminance ratio (corresponding to the luminance ratio) was fixed to 10, which was positioned at the center in a region of preferable luminance ratio and the representative value of the luminance ratio.

Figure 39:
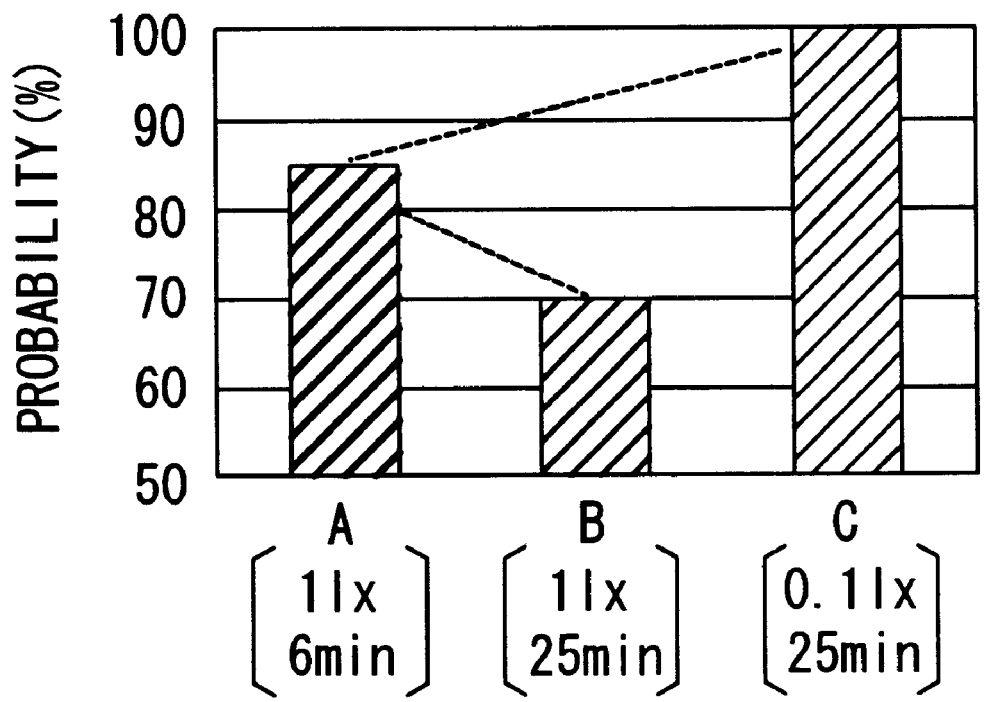
FIG. 39 is a graph showing probability (%) that observers did not feel uncomfortable with respect to the illuminance value and illumination time.

FIG. 39 shows the results of the experiments. In FIG. 39, the ordinate designates the probability (%) that the observers replied that they did not feel uncomfortable. A symbol "A" on the abscissa designates the condition of the experiment that the maximum illuminance value was 1 lx and the acclimatization stage was 5 minutes. A symbol "B" on the abscissa designates the condition of the experiment that the maximum illuminance value was 1 lx and the acclimatization stage was 25 minutes. A symbol "C" on the abscissa designates the condition of the experiment that the maximum illuminance value was 0.1 lx and the acclimatization stage was 25 minutes.

As can be seen from FIG. 39, the probabilities, that the observers replied "not uncomfortable" in the experiments with respect to the conditions "A", "B" and "C", were respectively about 85%, 70% and 100%. The observers were further asked whether they could adjust the rhythm of breathing to the variation of the illumination light or not. At least 85% of the number of the observers replied that they could be adjusted the rhythm of breathing with respect to all the conditions "A", "B" and "C".

As can be seen from the bar designated by the symbol "A" in FIG. 39, the illumination light having the maximum luminance value 1 lx was the illumination light by which 85% of the observers did not feel uncomfortable during the acclimatization stage of 5 minutes. It is considered that most of the user will actually use the lighting system in accordance with the present invention with the illumination light having such the maximum luminance value. Thus, it is effective that about 85% of the observers do not feel uncomfortable by the illumination light having the maximum luminance value of 1 lx.

In comparison with the bars designated by the symbols "A" and "B" in FIG. 39, when the acclimatization stage was not provided, that is, the observers gad been illuminated by the same illumination light, the probability that the observer do not feel uncomfortable was reduced from 85% to 70%.

In comparison with the bars designated by the symbols "A" and "C" in FIG. 39, when the acclimatization stage was provided, and the maximum luminance value was decreased from 1 lx to 0.1 lx after the acclimatization stage of 25 minutes, the probability that the observer do not feel uncomfortable was reduced from 85% to 100%.

From the above-mentioned results of the experiments, it is effective to provide the acclimatization stage to increase the probability that the observers do not feel uncomfortable. If the illuminance of the light emitting surface at the start of the acclimatization stage were extremely lower, it could not be perceived by the observer whose dark adaptation did not proceed. From the experiments, the maximum illuminance value of the illumination light on the eyes of the observer at the start of the acclimatization stage is selected to be about 1 lx, the probability that the observers do not feel uncomfortable becomes sufficiently higher, and the observer can easily adjust the rhythm of breathing to the variation of the illumination light.

Since the illuminance depends on the distance between the light source and the observer, it is impossible strictly to design the illumination light by using the illuminance on the eyes of the observer. The illuminance, however, can be calculated with respect to a predetermined normal distance corresponding to the type of lighting apparatus. For example, when the lighting apparatus such as a ceiling light is bused, the luminance L1 of the light source can be designed with respect to a distance (for example, 2 m to 2.5 m) from the ceiling to the floor or to the bed in a typical house so as to make the illuminance 1 lx on the floor or the bed. In the normal lighting apparatus, the illumination light is generally designed in such a manner. Thus, in the lighting system in the fourth embodiment, it is preferable to design the luminance of the light emitting surface so as to make the illuminance on the eyes of the observer be 1 lx. When the observer can adjust the distance from the light source, for example, by using the stand type lighting apparatus, it is supposed that the user places the lighting apparatus in a manner so that the maximum illuminance value on the eyes at the start of the acclimatization stage will be 1 lx.

As mentioned above, it is preferable that the maximum illuminance value on the eyes of the observer at the start of the acclimatization stage is 1 lx. It is supposed that most of the user will select the maximum illuminance value to be 1 lx. When the time has passed sufficiently for proceeding the dark adaptation, it is necessary to design the illumination light in a manner so that most of the observers do not feel uncomfortable at least at the start of the acclimatization stage.

An illumination light, by which the probability that the observers do not feel uncomfortable after passing 25 minutes in the acclimatization stage becomes 85%, is supposed. As can be seen from the bars designated by the symbols "B" and "C" in FIG. 39, the probability was 70% when the maximum illuminance value was 1 lx, and the probability was 100% when the maximum illuminance value was 0.1 lx. Thus, it is supposed that the maximum illuminance value of the illumination light will be 0.5 lx, by which the probability becomes 85%.

When the maximum illuminance value of the illumination light at the start of acclimatization stage is selected to be 1 lx, it is preferable to select the maximum luminance value L2 on the dark adaptation curve equal to or smaller than L1/2, and to vary the maximum illuminance value equal to or smaller than 0.5 lx. By using such the illumination light, the probability that the observers do not feel uncomfortable will not be reduced from the probability at the start of the acclimatization stage. For designing the illumination light in the fourth embodiment, it is preferable that the maximum luminance value L2 is equal to or smaller than L1. As mentioned above, it is preferable that the maximum luminance value L2 is equal to or larger than L1/10, so that the maximum luminance value L2 satisfies the condition L1/10≦L2≦L1/2.

Figure 40:
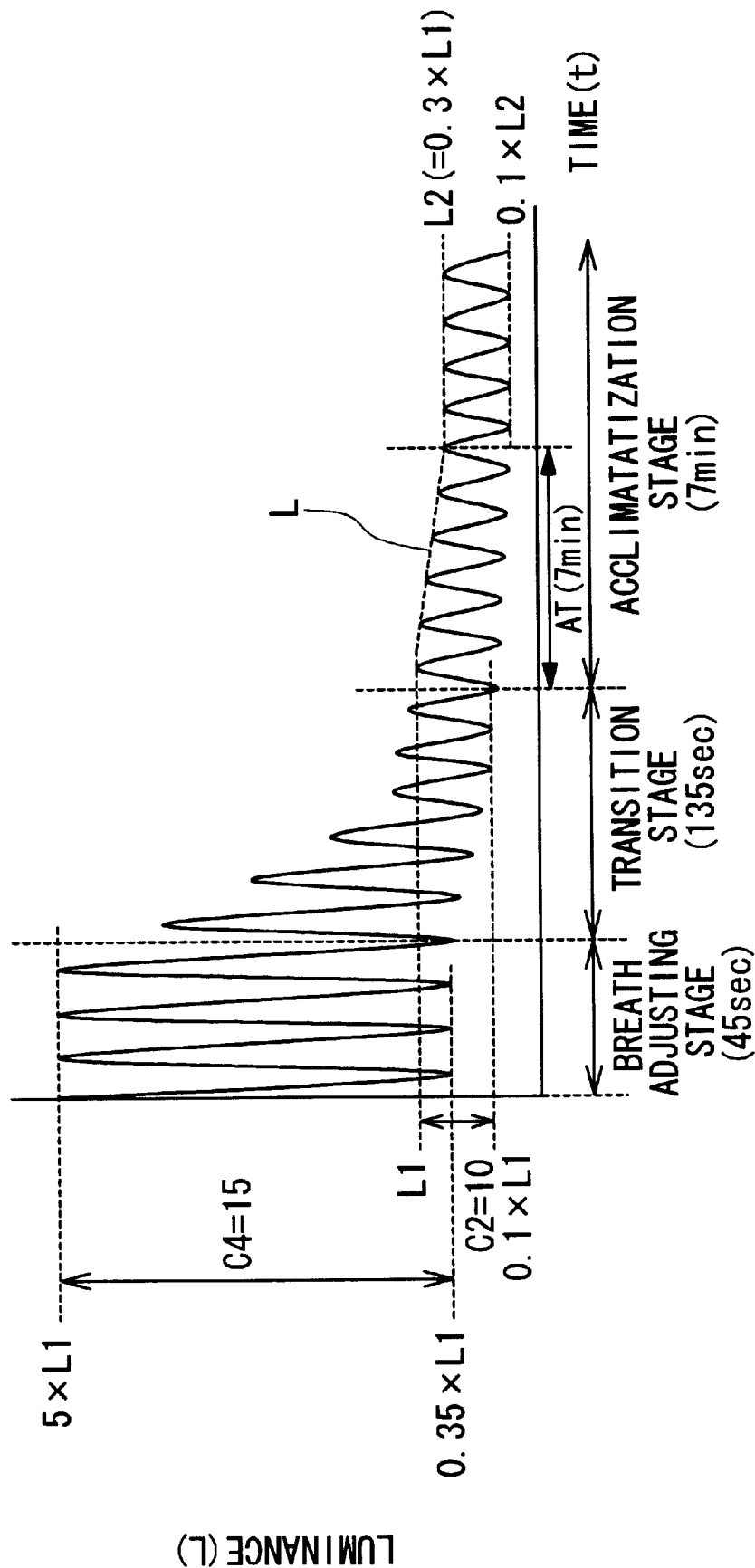
FIG. 40 is a graph showing waveform of variation of luminance on a light emitting surface of a light source used in experiments for confirming the effect of the lighting control method in the fourth embodiment.

Subsequently, experiments for confirming the hypnagogic effect by the lighting control method in the fourth embodiment were executed. FIG. 40 shows the waveform of the variation of the luminance on the light emitting surface of the light source used in the experiment. The luminance value L1 is adjusted that the illuminance on the eyes of the observer be 1 lx.

In FIG. 40, the luminance ratio C4 in the breath adjusting stage was selected to be 15 (C4=15), and the luminance ratio C5 in the acclimatization stage was selected to be 10 (C5=10). The curve A2 in FIG. 35 was used as the dark adaptation curve "R" in the experiments. The period AT was selected to be 7 minutes. The term of the breath adjusting stage was selected to be 45 sec and the term of the transition stage was selected to be 135 sec. When the maximum luminance at the start of the acclimatization stage was designated by a symbol "L1", the luminance L2 was selected to be 0.3×L1, the maximum luminance value in the breath adjusting stage was selected to be 5×L1, and the minimum luminance value in the breath adjusting stage was selected to be 0.35×L1. In the transition stage, the maximum luminance value was decreased corresponding to tertiary function.

The KSS method was used for evaluating the hypnagogic effect. The KSS method evaluates the drowsiness by making the observers declare the items applicable to their conditions among 22 items showing the conditions of the observer such as "slow down of thinking", and so on. The evaluation points 0 to 7 were respectively applied to the evaluation gradations of the drowsiness. When the evaluation point was nearer to "0", the degree of drowsiness was smaller. When the evaluation point was nearer to "7", the degree of drowsiness was larger. The KSS method was the subjective evaluation, but it was verified to have strong interlink to the physiologic characteristics for evaluating the drowsiness. In the experiments, the observers were evaluated the drowsiness twice before and after the observation of the illumination light. The differences between the evaluations were examined.

From the result of the experiments, the evaluation points before the observation of the illumination light were larger than the evaluation points after the observation with respect all the observers. The mean value of the evaluation points before the observation was 3.14, and the mean value of the evaluation points after the observation was 5.04. Thus, it was found that the degrees of drowsiness of the observers were increased by the lighting control method in the fourth embodiment. The evaluation item "not dull" had the evaluation point 3.03 which was near to the mean value 3.14 of the evaluation points before the observation. The evaluation item "muzzy" had the evaluation point 5.10 which was near to the mean value 5.04 of the evaluation points after the observation. From these evaluation results, conditions of many observers were shifted from "not dull" to "muzzy" by the lighting control method in the fourth embodiment. It was confirmed that the lighting control method in the fourth embodiment was effective to the hypnogenesis.

Other Embodiments

Figure 41:
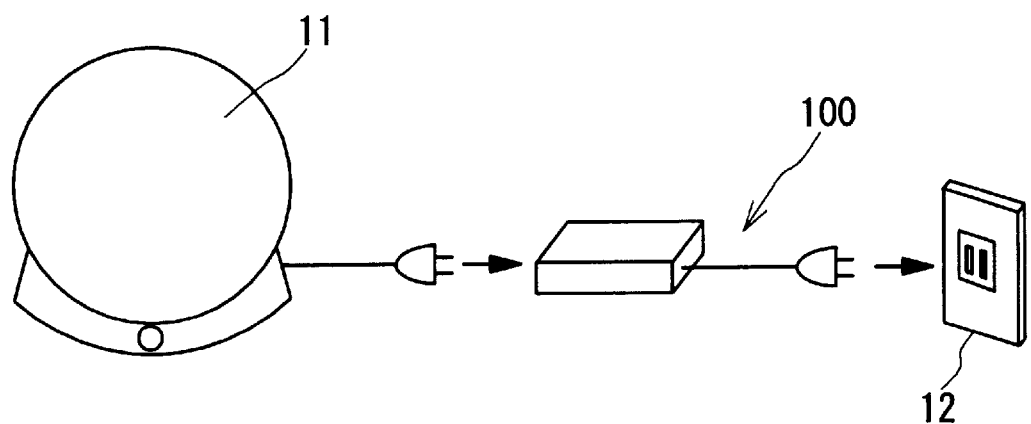
FIG. 41 is a perspective figure showing an embodiment of a lighting controller in accordance with the present invention.

FIG. 41 shows an embodiment of a lighting controller 100, which is independently used periodically for varying the luminance of the conventional lighting equipment 11 with no function of periodical variation of the luminance. The lighting controller 100 comprises the function of one of the lighting controllers 20 of the lighting systems 1, 2, 3 and 4 in the above-mentioned embodiments. By connecting the lighting controller 100 between the conventional lighting equipment 11 and a plug outlet 12, the function of the conventional lighting equipment 11 can be upgraded to substantially the same function as the above-mentioned lighting system in accordance with the present invention.

Figure 42:
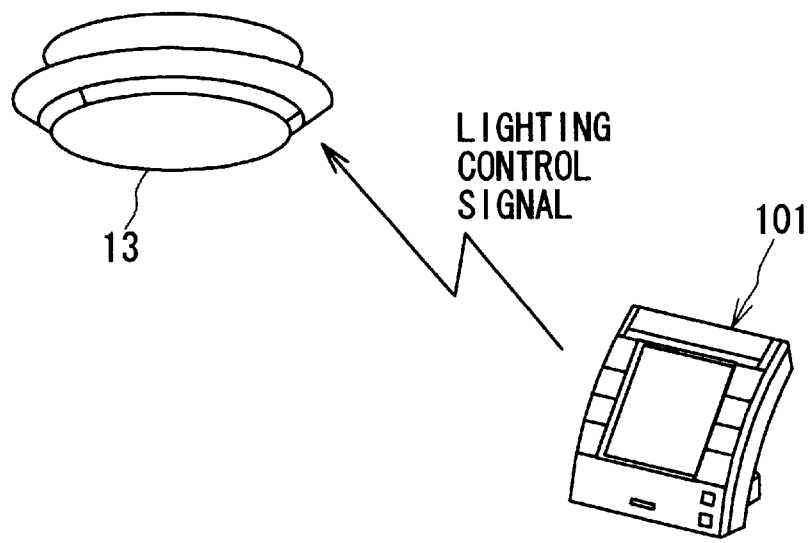
FIG. 42 is a perspective figure showing another embodiment the lighting system in accordance with the present invention.

FIG. 42 shows another embodiment of the lighting system in accordance with the present invention that the lighting control unit 24 of the lighting controller 20 is departed from the other elements such as the lighting control signal generator 22 of the lighting controller, and the lighting control unit 24 is integrated with the light source 10 for forming a lighting equipment 13. The remainder of the elements of the lighting controller 20 is configured as a remote control unit 101. By such a configuration, the lighting control signal is transmitted from the remote control unit 101 to the lighting equipment 12 by air. With reference to FIG. 2, the observer 30 at a position distant from the light source 10 can easily adjust the luminance ratio C or switch the lighting control signal between the first lighting control signal and the second lighting control signal by using the remote control unit 101 at hand.

In the above-mentioned embodiments, the lighting control systems for varying the luminance of the light emitting surface in consideration with the characteristics of human visual perception are described. Other senses except the vision perceive the physical values as the logarithm values thereof, similar to the vision. Thus, the principle of the present invention can be applies to another control system appealing other human senses except the vision.

It is possible to generate a sound having a periodic variation, to generate an air flow having a periodic variation by an air conditioner, or to generate a tactile stimulus having a periodic variation by a massaging tool, and the rhythm of breathing be adjusted to the periodic variation of the physical values.

This application is based on patent applications 2000-399625, 2001-383825, 2001-301702 and 2001-375554 filed in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A lighting system comprising: a light source having a light emitting surface; and
    a lighting controller for controlling the light source periodically for varying luminance on the light emitting surface of the light source,
    wherein the lighting controller controls the light source such that the luminance has changes with respect to time which are larger in the vicinity at $t_{MAX}$ than in the vicinity at $t_{MIN}$, where $t_{MAX}$ is a time when the luminance takes the largest value during one period and $t_{MIN}$ is a time when the luminance takes the smallest value during the one period.

2. The lighting system in accordance with claim 1, wherein:
    the lighting controller controls the light source such that the luminance on the light emitting surface of the light source is varied corresponding to a predetermined curve;
    the luminance has a constant base value at $t=0$, $t=T/2$ and $t=T$ where T is the one period;
    the luminance is larger than the constant base value when $0<t<T/2$;
    the luminance is smaller than the constant base value when $T/2<t<T$;
    the luminance is smaller than a luminance varying based on a standard sinusoidal waveform when $0<t<T$, except a maximum luminance value at $t_{MAX}$ and a minimum luminance value at $t_{MIN}$; and
    the standard sinusoidal curve in the one period has the maximum luminance value at $t_{MAX}$, and the minimum luminance value at $t_{MIN}$.

3. The lighting system in accordance with claim 2, wherein the luminance is varied with a frequency equal to or larger than 0.1 Hz and equal to or smaller than 0.4 Hz.

4. The lighting system in accordance with claim 2, wherein the luminance is varied in a range between a value equal to or larger than $L_C/(1-r_C\times\sin(t))$ and a value equal to or smaller than $L_B \times r_B^{\sin(t)}$, where the maximum luminance value is $L_{MAX}$, the minimum luminance value $L_{MIN}$, $L_B=(L_{MAX}\times L_{MIN})^{1/2}$, $r_B=(L_{MAX}/L_{MIN})^{1/2}$, $L_C=2\times(L_{MAX}\times L_{MIN})/(L_{MAX}+L_{MIN})$, and $r_C=(L_{MAX}-L_{MIN})/(L_{MAX}+L_{MIN})$.

5. The lighting system in accordance with claim 2, wherein the luminance is varied according to $L_{BASE}\times r^{\sin(t)}$, where $L_{BASE}$ is the constant base value and r is a constant value.

6. The lighting system in accordance with claim 2, wherein the luminance is varied in a range larger than 0 cd/m$^2$ and equal to or smaller than 5000 cd/m$^2$.

7. The lighting system in accordance with claim 2, wherein a frequency of the luminance is varied as time passes.

8. The lighting system in accordance with claim 1, wherein:
    the lighting controller has a first lighting control signal generator for generating a first lighting control signal and a lighting control unit for controlling lighting of the light source based on the first lighting control signal outputted from the first lighting control signal generator;
    a lighting term of the light source is divided into at least an introduction stage and a relaxation stage provided after the introduction stage temporally;

in the introduction stage, the first lighting control signal generator generates the first lighting control signal by which the luminance is varied such that a luminance ratio of a maximum luminance value against a minimum luminance value in the one period becomes substantially constant in a range $10<C1\leq 100$, where the luminance ratio is C1, the maximum luminance value is $L_{MAX1}$, the minimum luminance value is $L_{MIN1}$, and $C1=L_{MAX1}/L_{MIN1}$ in the introduction stage; and in the relaxation stage, the first lighting control signal generator generates the first lighting control signal by which the luminance is varied such that a luminance ratio of a maximum luminance value against a minimum luminance value in the one period becomes substantially constant in a range $6<C2\leq 100$, where the luminance ratio is C2, the maximum luminance value is $L_{MAX2}$, the minimum luminance value is $L_{MIN2}$, and $C2=L_{MAX2}/L_{MIN2}$ in the relaxation stage.

9. The lighting system in accordance with claim 8, wherein:

the lighting term of the light source is divided into the introduction stage, a transition stage and the relaxation stage; and in the transition stage, the first lighting control signal generator generates the first lighting control signal by which the luminance is varied such that a luminance ratio of a maximum luminance value against a minimum luminance value in the one period gradually decreases from C1 to C2, where the luminance ratio is C3, the maximum luminance value is $L_{MAX3}$, the minimum luminance value is $L_{MIN3}$, and $C3=L_{MAX3}/L_{MIN3}$ in the transition stage.

10. The lighting system in accordance with claim 8, wherein the first lighting control signal generator generates the first lighting control signal by which the luminance is varied such that the maximum luminance value in the introduction stage is larger than the maximum luminance value in the relaxation stage.

11. The lighting system in accordance with claim 10, wherein the first lighting control signal generator generates the first lighting control signal by which the luminance is varied such that the minimum luminance value in the introduction stage is larger than the minimum luminance value in the relaxation stage.

12. The lighting system in accordance with claim 8, wherein:

the lighting controller further has a second lighting control signal generator for generating a second lighting control signal and a switching unit for switching the first lighting control signal outputted from the first lighting control signal generator and the second lighting control signal outputted from the second lighting control signal generator and inputs alternative of the first lighting control signal and the second lighting control signal to the lighting control unit; and a first luminance ratio of a first maximum luminance value against a first minimum luminance value in the one period is controlled by the first lighting control signal, a second luminance ratio of a second maximum luminance value against a second minimum luminance value in the one period is controlled by the second lighting control signal, and the first luminance ratio is larger than the second luminance ratio, where the first luminance ratio is CT 1, the first maximum luminance value is $L_{MAXT1}$, the first minimum luminance value is $L_{MINT1}$, $CT1=L_{MAXT1}/L_{MINT1}$, the second luminance ratio is CT2, the second maximum luminance value is $L_{MAXT2}$, the second minimum luminance value is $L_{MINT2}$, and $CT2=L_{MAXT2}/L_{MINT2}$.

13. The lighting system in accordance with claim 12, wherein $CT1 \geq 1.5 \times CT2$.

14. The lighting system in accordance with claim 12, wherein $L_{MAXT1} \geq L_{MAXT2}$.

15. The lighting system in accordance with claim 12, wherein $L_{MINT1} \geq L_{MINT2}$.

16. The lighting system in accordance with claim 12, further comprising a luminance ratio adjuster for adjusting the first and second luminance ratios when one of the first lighting control signal generator and the second lighting control signal generator outputs the first lighting control signal or the second lighting control signal; wherein:

when at least one of the first and second luminance ratios is adjusted, the luminance ratio adjuster transmits a signal showing the at least one of the first and second luminance ratios is adjusted to the first lighting control signal generator and the second lighting control signal generator, the lighting control signal of which is not used for controlling the luminance; and the at least one of the first and second luminance ratios to be controlled by the lighting control signal not used for controlling the luminance is adjusted.

17. The lighting system in accordance with claim 12, further comprising a sensor for sensing whether an observer has eyes opened or not, and outputting an information with respect to open and close of the eyes of the observer to the switching unit; wherein the switching unit selects one of the first lighting control signal and the second lighting control signal in controlling the lighting control unit corresponding to the information from the sensor.

18. The lighting system in accordance with claim 17, further comprising a luminance ratio adjuster for adjusting the first and second luminance ratios when one of the first lighting control signal generator and the second lighting control signal generator outputs the first lighting control signal or the second lighting control signal; wherein:

when at least one of the first and second luminance ratios is adjusted, the luminance ratio adjuster transmits a signal showing at least one of the first and second luminance ratios is adjusted to the first lighting control signal generator and the second lighting control signal generator, the lighting control signal of which is not used for controlling the luminance; and the at least one of the first and second luminance ratios to be controlled by the lighting control signal not used for controlling the luminance is adjusted.

19. The lighting system in accordance with claim 1, wherein:

the lighting controller divides a lighting term of the light source into at least a breath adjusting stage and an acclimatization stage;

in the breath adjusting stage, the luminance is varied such that a luminance ratio of a maximum luminance value against a minimum luminance value in the one period becomes substantially constant, where the luminance ratio is C4, the maximum luminance value is $L_{MAX4}$, the minimum luminance value is $L_{MIN4}$, and $C4=L_{MAX4}/L_{MIN4}$ in the breath adjusting stage; and in the acclimatization stage, the luminance is varied such that a luminance ratio of a maximum luminance value against a minimum luminance value in the one period becomes substantially constant, where the luminance ratio is C5, the maximum luminance value is $L_{MAX5}$, the minimum luminance value is $L_{MIN5}$, $C5=L_{MAX5}/L_{MIN5}$, and $L_{MAX5}$ is varied corresponding to a predetermined dark adaptation curve.

20. The lighting system in accordance with claim 19, wherein $10<C4\leq100$, and $6<C5\leq100$.

21. The lighting system in accordance with claim 19, wherein:

the lighting controller divides the lighting term of the light source into the breath adjusting stage, an transition stage and the acclimatization stage; and in the transition stage, the first lighting control signal generator generates the first lighting control signal by which the luminance is varied in such that a luminance ratio of a maximum luminance value against a minimum luminance value in the one period gradually decreases from the luminance ratio in the breath adjusting stage to the luminance ratio in the acclimatization stage, where the luminance ratio is C6, the maximum luminance value is $L_{MAX6}$, the minimum luminance value is $L_{MIN3}$, and $C6=L_{MAX6}/L_{MIN6}$ in the transition stage.

22. The lighting system in accordance with claim 21, wherein $10<C4\leq100$, and $6<C5\leq100$.

23. The lighting system in accordance with claim 21, wherein the dark adaptation curve is a curve showing a relation between the luminance with respect to time, on which the luminance is monotonously decreased from a start of the acclimatization stage and becomes a constant which is smaller than the luminance at the start of the acclimatization stage but larger than one hundredth of the luminance at the start of the acclimatization stage; where a period from the start of the acclimatization stage is t in min., a term from the luminance at the start of the acclimatization stage to the luminance at the constant is AT, the luminance at the start of the acclimatization stage is L1, and the luminance at the constant is L2, $L1\times(L2/L1)^{t/AT}\leq L\leq L1$ in $0\leq t\leq 5$, and $L1\times(L2/L1)^{t/AT}\leq L\leq L1-(L1-L2)\times(t-5)/(AT-5)$ in $5\leq t\leq AT$ are satisfied.

24. The lighting system in accordance with claim 23, wherein L2 is in a range between a value equal to or larger than L1/10 and a value equal to or smaller than L1/2.

25. A lighting controller for controlling a light source periodically, comprising:

controlling means for controlling luminance on a light emitting surface of the light source such that the luminance has changes with respect to time which are larger in the vicinity at $t_{MAX}$ than in the vicinity at $t_{MIN}$, where $t_{MAX}$ is a time when the luminance takes the largest value during one period and $t_{MIN}$ is a time when the luminance takes the smallest value during the one period;

a first lighting control signal generator for generating a first lighting control signal; and a lighting control unit for controlling lighting of the light source based on the first lighting control signal outputted from the first lighting control signal generator; wherein:

a lighting term of the light source is divided into at least an introduction stage and a relaxation stage provided after the introduction stage temporally;

in the introduction stage, the first lighting control signal generator generates the first lighting control signal by which the luminance is varied such that a luminance ratio of a maximum luminance value against a minimum luminance value in the one period becomes substantially constant in a range $10<C1\leq100$, where the luminance ratio is C1, the maximum luminance value is $L_{MAX1}$, the minimum luminance value is $L_{MIN1}$, and $C1=L_{MAX1}/L_{MIN1}$ in the introduction stage; and in the relaxation stage, the first lighting control signal generator generates the first lighting control signal by which the luminance is varied such that a luminance ratio of a maximum luminance value against a minimum luminance value in the one period becomes substantially constant in a range $6<C2\leq100$, where the luminance ratio is C2, the maximum luminance value is $L_{MAX2}$, the minimum luminance value is $L_{MIN2}$, and $C2=L_{MAX2}/L_{MIN2}$ in the relaxation stage.

26. A lighting controller for controlling a light source periodically, comprising:

first controlling means for controlling luminance on a light emitting surface of the light source such that the luminance has changes with respect to time which are larger in the vicinity at $t_{MAX}$ than in the vicinity at $t_{MIN}$, where $t_{MAX}$ is a time when the luminance takes the largest value during one period and $t_{MIN}$ is a time when the luminance takes the smallest value during the one period;

second controlling means for controlling the luminance such that a luminance ratio of a maximum luminance value against a minimum luminance value in the one period becomes substantially constant in a breath adjusting stage of a lighting term of the light source, where the luminance ratio is C4, the maximum luminance value is $L_{MAX4}$, the minimum luminance value is $L_{MIN4}$, and $C4=L_{MAX4}/L_{MIN4}$ in the breath adjusting stage; and third controlling means for controlling the luminance such that a luminance ratio of a maximum luminance value against a minimum luminance value in the one period becomes substantially constant in an acclimatization stage of the lighting term of the light source, where the luminance ratio is C5, the maximum luminance value is $L_{MAX5}$, the minimum luminance value is $L_{MIN5}$, and $C5=L_{MAX5}/L_{MIN5}$ in the acclimatization stage, and the maximum luminance value in the acclimatization stage is varied corresponding to a predetermined dark adaptation curve.

27. A lighting control method for controlling a light source periodically, comprising controlling the light source such that luminance on a light emitting surface of the light source has changes with respect to time which are larger in the vicinity at $t_{MAX}$ than in the vicinity at $t_{MIN}$, where $t_{MAX}$ is a time when the luminance takes the largest value during one period and $t_{MIN}$ is a time when the luminance takes the smallest value during the one period.

28. The lighting control method in accordance with claim 27, wherein:

a lighting term of the light source is divided into at least an introduction stage and a relaxation stage provided after the introduction stage temporally;

in the introduction stage, the luminance is varied such that a luminance ratio of a maximum luminance value against a minimum luminance value in the one period becomes substantially constant in a range $10<C1\leq100$, where the luminance ratio is C1, the maximum luminance value is $L_{MAX1}$, the minimum luminance value is $L_{MIN1}$, and $C1=L_{MAX1}/L_{MIN1}$ in the introduction stage; and in the relaxation stage, the luminance is varied such that a luminance ratio of a maximum luminance value against a minimum luminance value in the one period becomes substantially constant in a range $6 < C2 \leq 100$, where the luminance ratio is C2, the maximum luminance value is $L_{MAX2}$, the minimum luminance value is $L_{MIN2}$, and $C2 = L_{MAX2}/L_{MIN2}$ in the relaxation stage.

29. The lighting control method in accordance with claim 27, wherein:

a lighting term of the light source is divided into at least a breath adjusting stage and an acclimatization stage provided;

in the breath adjusting stage, the luminance is varied such that a luminance ratio of a maximum luminance value against a minimum luminance value in the one period becomes substantially constant, where the luminance ratio is C4, the maximum luminance value is $L_{MAX4}$, the minimum luminance value is $L_{MIN4}$, and $C4 = L_{MAX4}/L_{MIN4}$ in the breath adjusting stage; and in the acclimatization stage, the luminance is varied such that a luminance ratio of a maximum luminance value against a minimum luminance value in the one period becomes substantially constant, where the luminance ratio is C5, the maximum luminance value is $L_{MAX5}$, the minimum luminance value is $L_{MIN5}$, and $C5 = L_{MAX1}/L_{MIN5}$ in the acclimatization stage, and the maximum luminance value in the acclimatization stage is varied corresponding to a predetermined dark adaptation curve.

* * * * *

UNITED STATES PATENT AND TRADEMARK OFFICE
CERTIFICATE OF CORRECTION

PATENT NO. : 6,720,743 B2
DATED : April 13, 2004
INVENTOR(S) : Yano et al.

It is certified that error appears in the above-identified patent and that said Letters Patent is hereby corrected as shown below:

Column 6,
Line 41, change "method-in" to -- method in --.

Column 14,
Line 56, change "≦ T x=" to -- ≦ T, x= --.

Column 25,
Lines 19 and 22, change "6≦CT2≦10" to -- 6≦CT2<10 --.

Column 39,
Line 66, change "CT 1" to -- CT1 --.

Column 41,
Line 6, change "6<C5 ≦ 100" to -- 6<C5≦100 --.

Column 42,
Line 14, change "C2=$L_{MAx2}$ is" to -- C2=$L_{MAX2}$ --.
Line 22, change "$t_{MAX}$is" to -- $t_{MAX}$ is --.

Signed and Sealed this

Twenty-eighth Day of December, 2004

JON W. DUDAS
*Director of the United States Patent and Trademark Office*